(12) United States Patent
Schneider et al.

(10) Patent No.: US 12,478,513 B2
(45) Date of Patent: Nov. 25, 2025

(54) ABSORBENT ARTICLES AND METHODS AND APPARATUSES FOR MAKING ABSORBENT ARTICLES WITH FRANGIBLE PATHWAYS

(71) Applicant: The Procter & Gamble Company, Cincinnati, OH (US)

(72) Inventors: Uwe Schneider, Cincinnati, OH (US); Jeromy Thomas Raycheck, South Lebanon, OH (US); Michael Devin Long, Harrison Township, OH (US); Jeffry Rosiak, Loveland, OH (US); Jason Edward Naylor, Loveland, OH (US); Keith Richard Willhaus, Cincinnati, OH (US); Nicholas Alexander Taylor, Woodlawn, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 378 days.

(21) Appl. No.: 18/214,564

(22) Filed: Jun. 27, 2023

(65) Prior Publication Data

US 2024/0000619 A1   Jan. 4, 2024

Related U.S. Application Data

(60) Provisional application No. 63/357,043, filed on Jun. 30, 2022, provisional application No. 63/432,400,
(Continued)

(51) Int. Cl.
*A61F 13/49* (2006.01)
*A61F 13/56* (2006.01)
(Continued)

(52) U.S. Cl.
CPC .... *A61F 13/49011* (2013.01); *A61F 13/5622* (2013.01); *A61F 13/5644* (2013.01);
(Continued)

(58) Field of Classification Search
None
See application file for complete search history.

(56) References Cited

U.S. PATENT DOCUMENTS 4,610,680 A   9/1986 Lafleur
4,872,871 A   10/1989 Proxmire et al.
(Continued)

FOREIGN PATENT DOCUMENTS

DE   19813334 A1   9/1999
DE   20220237 U1   3/2003
(Continued)

OTHER PUBLICATIONS

All Office Actions; U.S. Appl. No. 18/214,548, filed Jun. 27, 2023.
(Continued)

*Primary Examiner* — Gloria R Weeks
(74) *Attorney, Agent, or Firm* — Charles R. Matson

(57) ABSTRACT

The present disclosure relates to absorbent articles including elastic laminates, and more particularly, to methods and apparatuses for making absorbent articles having elastic laminates in front and/or back waist regions with frangible pathways.

26 Claims, 53 Drawing Sheets

Related U.S. Application Data filed on Dec. 14, 2022, provisional application No. 63/432,401, filed on Dec. 14, 2022, provisional application No. 63/432,402, filed on Dec. 14, 2022, provisional application No. 63/432,403, filed on Dec. 14, 2022, provisional application No. 63/432,404, filed on Dec. 14, 2022, provisional application No. 63/432,406, filed on Dec. 14, 2022, provisional application No. 63/432,410, filed on Dec. 14, 2022, provisional application No. 63/432,413, filed on Dec. 14, 2022.

(51) Int. Cl.
*A61F 13/551* (2006.01)
*A61F 13/84* (2006.01)

(52) U.S. Cl.
CPC ............... *A61F 13/5655* (2013.01); *A61F 2013/49087* (2013.01); *A61F 13/5512* (2013.01); *A61F 2013/8497* (2013.01)

(56) References Cited

U.S. PATENT DOCUMENTS

| | | | |
|---|---|---|---|
| 5,074,854 A | 12/1991 | Davis | |
| H1420 H | 2/1995 | Richardson | |
| 5,575,784 A | 11/1996 | Ames-Ooten et al. | |
| 5,624,420 A | 4/1997 | Bridges et al. | |
| 5,766,389 A | 6/1998 | Brandon et al. | |
| 5,897,546 A | 4/1999 | Kido et al. | |
| 6,027,484 A | 2/2000 | Romare | |
| 6,113,717 A | 9/2000 | Vogt et al. | |
| 6,287,287 B1 | 9/2001 | Elsberg | |
| 6,497,695 B1 | 12/2002 | Bruemmer-Prestley et al. | |
| 6,508,797 B1 | 1/2003 | Pozniak et al. | |
| 6,508,799 B1 | 1/2003 | Freiburger et al. | |
| 6,524,294 B1 | 2/2003 | Hilston et al. | |
| 6,575,949 B1 | 6/2003 | Waksmundzki et al. | |
| 6,579,275 B1 | 6/2003 | Pozniak et al. | |
| 6,585,855 B2 | 7/2003 | Drew et al. | |
| 6,685,613 B1 * | 2/2004 | Stopher ............. A61F 13/15747 493/422 |
| 6,712,922 B2 | 3/2004 | Sorenson et al. | |
| 6,743,321 B2 | 6/2004 | Guralski | |
| 6,752,796 B2 | 6/2004 | Karami | |
| 6,783,487 B2 | 8/2004 | Duhm et al. | |
| 6,838,040 B2 | 1/2005 | Mlinar et al. | |
| 6,976,978 B2 | 12/2005 | Ruman et al. | |
| 6,991,696 B2 | 1/2006 | Wagner et al. | |
| 7,077,834 B2 | 7/2006 | Bishop et al. | |
| 7,150,730 B2 | 12/2006 | Hasler et al. | |
| 7,156,833 B2 | 1/2007 | Couture-Dorschner | |
| 7,250,549 B2 | 7/2007 | Richlen et al. | |
| 7,297,139 B2 | 11/2007 | Price et al. | |
| 7,393,429 B2 | 7/2008 | Tachibana | |
| 7,431,791 B2 * | 10/2008 | Heller ............... A61F 13/15756 156/301 |
| 7,473,818 B2 | 1/2009 | Datta et al. | |
| 7,497,852 B2 | 3/2009 | Kawakami | |
| 7,527,617 B2 | 5/2009 | Shimada et al. | |
| 7,608,068 B2 | 10/2009 | Fujioka | |
| 7,621,900 B2 * | 11/2009 | Van Gompel ..... A61F 13/15723 604/385.24 |
| 7,621,901 B2 | 11/2009 | Karami | |
| 7,637,898 B2 | 12/2009 | Kuen et al. | |
| 7,641,641 B2 | 1/2010 | Ramshak | |
| 7,686,795 B2 | 3/2010 | Ichikawa et al. | |
| 7,708,857 B2 | 5/2010 | Ukegawa | |
| 7,789,868 B2 | 9/2010 | Tachibana | |
| 8,002,761 B2 | 8/2011 | Utsunomiya et al. | |
| 8,007,622 B2 | 8/2011 | Heller | |
| 8,034,039 B2 | 10/2011 | Nakaoka et al. | |
| 8,043,274 B2 | 10/2011 | Mlinar et al. | |
| 8,066,684 B2 | 11/2011 | Fujioka | |
| 8,066,687 B2 | 11/2011 | Ashton et al. | |
| 8,118,799 B2 | 2/2012 | Datta et al. | |
| 8,162,912 B2 | 4/2012 | Schlinz et al. | |
| 8,192,417 B2 | 6/2012 | Kusumi et al. | |
| 8,216,200 B2 | 7/2012 | Meetz et al. | |
| 8,277,430 B2 | 10/2012 | Tabor et al. | |
| 8,361,048 B2 | 1/2013 | Kuen | |
| 8,388,595 B2 | 3/2013 | Van Gompel et al. | |
| 8,557,068 B2 | 10/2013 | Ito et al. | |
| 8,569,571 B2 | 10/2013 | Kline et al. | |
| 8,657,802 B2 | 2/2014 | Roe et al. | |
| 8,663,184 B2 | 3/2014 | Liu et al. | |
| 8,753,466 B2 | 6/2014 | Thorson | |
| 8,771,449 B2 | 7/2014 | Takino et al. | |
| 8,945,324 B2 | 2/2015 | Hahn et al. | |
| 9,011,406 B2 | 4/2015 | Torigoshi et al. | |
| 9,028,462 B2 | 5/2015 | Poole et al. | |
| 9,050,217 B2 | 6/2015 | Gassner et al. | |
| 9,060,905 B2 | 6/2015 | Wang et al. | |
| 9,066,832 B2 | 6/2015 | Gassner et al. | |
| 9,066,833 B2 | 6/2015 | Gassner | |
| 9,072,632 B2 | 7/2015 | Lavon | |
| 9,089,458 B2 | 7/2015 | Faulks et al. | |
| 9,138,361 B2 | 9/2015 | Faulks et al. | |
| 9,173,781 B2 | 11/2015 | Otsubo et al. | |
| 9,226,861 B2 | 1/2016 | Lavon | |
| 9,561,138 B2 | 2/2017 | Mukai et al. | |
| 9,668,925 B2 | 6/2017 | Mukai et al. | |
| 9,750,647 B2 | 9/2017 | Umebayashi | |
| 9,789,010 B2 | 10/2017 | Long et al. | |
| 9,820,536 B2 | 11/2017 | Sakaguchi et al. | |
| 10,034,801 B2 | 7/2018 | Seitz et al. | |
| 10,123,914 B2 | 11/2018 | Kobayashi et al. | |
| 10,188,560 B2 | 1/2019 | Mueller et al. | |
| 10,292,874 B2 | 5/2019 | Wade et al. | |
| 10,687,988 B2 | 6/2020 | Morimoto et al. | |
| 10,736,795 B2 | 8/2020 | Bianchi et al. | |
| 10,799,398 B2 | 10/2020 | Eimann et al. | |
| 10,807,263 B2 * | 10/2020 | Busch ................. B26D 1/0006 |
| 10,905,602 B2 | 2/2021 | Olsson | |
| 10,993,844 B2 | 5/2021 | Olsson et al. | |
| 11,246,767 B2 | 2/2022 | Roszkowiak et al. | |
| 11,304,859 B2 | 4/2022 | Jeon et al. | |
| 11,426,312 B2 | 8/2022 | Collins et al. | |
| 11,648,155 B2 * | 5/2023 | Schneider ......... A61F 13/15756 493/374 |
| 11,672,708 B2 | 6/2023 | Johnson et al. | |
| 11,752,045 B2 | 9/2023 | Johnson et al. | |
| 11,883,268 B2 | 1/2024 | Johnson et al. | |
| 12,310,827 B2 | 5/2025 | Johnson et al. | |
| 2002/0032427 A1 | 3/2002 | Schmitz et al. | |
| 2002/0065503 A1 | 5/2002 | Guidotti | |
| 2002/0148557 A1 * | 10/2002 | Heller ................. A61F 13/496 156/267 |
| 2003/0055389 A1 | 3/2003 | Sanders et al. | |
| 2003/0088223 A1 | 5/2003 | Vogt et al. | |
| 2003/0130641 A1 | 7/2003 | Richlen et al. | |
| 2003/0220626 A1 | 11/2003 | Karami | |
| 2004/0182502 A1 | 9/2004 | Wagner et al. | |
| 2004/0186451 A1 | 9/2004 | Bishop et al. | |
| 2004/0193135 A1 | 9/2004 | Van Gompel | |
| 2005/0148974 A1 | 7/2005 | Datta et al. | |
| 2005/0177125 A1 | 8/2005 | Kondo | |
| 2005/0192553 A1 * | 9/2005 | Hasler ................. A61F 13/5655 604/385.11 |
| 2006/0129119 A1 | 6/2006 | Kistler | |
| 2006/0135936 A1 | 6/2006 | Markovich et al. | |
| 2006/0293639 A1 | 12/2006 | Van Gompel | |
| 2008/0015534 A1 | 1/2008 | Kusumi et al. | |
| 2008/0103470 A1 | 5/2008 | Samuelsson et al. | |
| 2008/0114322 A1 | 5/2008 | Schmoker et al. | |
| 2008/0134487 A1 | 6/2008 | Hartono | |
| 2008/0154223 A1 | 6/2008 | Fujioka | |
| 2008/0249493 A1 | 10/2008 | Kobayashi et al. | |
| 2009/0149827 A1 | 6/2009 | Mlinar et al. | |
| 2009/0312734 A1 | 12/2009 | Lavon et al. | |
| 2011/0098668 A1 | 4/2011 | Thorson | |
| 2011/0155304 A1 | 6/2011 | Sakaguchi | |
| 2013/0012905 A1 | 1/2013 | Katsuragawa et al. | |

(56) References Cited

U.S. PATENT DOCUMENTS

| | | |
|---|---|---|
| 2013/0231625 A1 | 9/2013 | Ellefson et al. |
| 2013/0306226 A1 | 11/2013 | Zink |
| 2014/0110037 A1 | 4/2014 | Verboomen |
| 2014/0113792 A1 | 4/2014 | Verboomen et al. |
| 2014/0114272 A1 | 4/2014 | Schoon et al. |
| 2014/0135730 A1* | 5/2014 | Mlinar .............. A61F 13/5633 604/386 |
| 2014/0155855 A1 | 6/2014 | Romzek et al. |
| 2014/0187405 A1 | 7/2014 | Volp et al. |
| 2016/0175161 A1* | 6/2016 | Zink, II ........... A61F 13/15747 493/345 |
| 2017/0105883 A1 | 4/2017 | Nishikawa et al. |
| 2017/0266941 A1 | 9/2017 | Eimann |
| 2018/0168885 A1* | 6/2018 | Zink, II ........... A61F 13/15739 |
| 2019/0099304 A1 | 4/2019 | Berry |
| 2019/0209392 A1 | 7/2019 | Johnson et al. |
| 2020/0163810 A1 | 5/2020 | Johnson et al. |
| 2021/0093485 A1 | 4/2021 | Ljungberg et al. |
| 2021/0369510 A1 | 12/2021 | Ljungberg et al. |
| 2023/0127980 A1 | 4/2023 | Umebayashi |
| 2023/0146261 A1 | 5/2023 | Seitz et al. |
| 2024/0173175 A1 | 5/2024 | Johnson et al. |

FOREIGN PATENT DOCUMENTS

| | | |
|---|---|---|
| EP | 0570980 B1 | 7/1997 |
| EP | 0705088 B1 | 5/1999 |
| EP | 1027874 A2 | 8/2000 |
| EP | 0955976 B1 | 3/2002 |
| EP | 1128790 B1 | 5/2003 |
| EP | 1779827 A1 | 5/2007 |
| EP | 2486905 B1 | 4/2017 |
| EP | 3053562 B1 | 3/2022 |
| JP | 3209377 B2 | 9/2001 |
| JP | 2001258938 A | 9/2001 |
| JP | 2002017778 A | 1/2002 |
| JP | 3429383 B2 | 7/2003 |
| JP | 2003290286 A | 10/2003 |
| JP | 3578802 B2 | 7/2004 |
| JP | 2004329590 A | 11/2004 |
| JP | 3737709 B2 | 11/2005 |
| JP | 2006034402 A | 2/2006 |
| JP | 2006055343 A | 3/2006 |
| JP | 2006068211 A | 3/2006 |
| JP | 2006204385 A | 8/2006 |
| JP | 4037216 B2 | 11/2007 |
| JP | 4090913 B2 | 3/2008 |
| JP | 4131683 B2 | 6/2008 |
| JP | 2008142345 A | 6/2008 |
| JP | 4163144 B2 | 8/2008 |
| JP | 2008302138 A | 12/2008 |
| JP | 4240464 B2 | 1/2009 |
| JP | 4260711 B2 | 2/2009 |
| JP | 4276556 B2 | 3/2009 |
| JP | 4280187 B2 | 3/2009 |
| JP | 4312084 B2 | 5/2009 |
| JP | 4444078 B2 | 1/2010 |
| JP | 4444079 B2 | 1/2010 |
| JP | 4502882 B2 | 4/2010 |
| JP | 4508892 B2 | 5/2010 |
| JP | 4511284 B2 | 5/2010 |
| JP | 2010136787 A | 6/2010 |
| JP | 2010246901 A | 11/2010 |
| JP | 4672651 B2 | 1/2011 |
| JP | 4682085 B2 | 2/2011 |
| JP | 4745119 B2 | 5/2011 |
| JP | 4758821 B2 | 6/2011 |
| JP | 4801498 B2 | 8/2011 |
| JP | 4908255 B2 | 1/2012 |
| JP | 4926742 B2 | 2/2012 |
| JP | 5009040 B2 | 6/2012 |
| JP | 5014452 B2 | 8/2012 |
| JP | 5106253 B2 | 10/2012 |
| JP | 5107447 B2 | 10/2012 |
| JP | 5241457 B2 | 4/2013 |
| JP | 5244226 B2 | 4/2013 |
| JP | 5352408 B2 | 8/2013 |
| JP | 5438952 B2 | 12/2013 |
| JP | 5568369 B2 | 6/2014 |
| JP | 5572822 B2 | 7/2014 |
| JP | 5632346 B2 | 10/2014 |
| JP | 5632521 B2 | 10/2014 |
| JP | 5638305 B2 | 10/2014 |
| JP | 5728907 B2 | 4/2015 |
| JP | 5868105 B2 | 1/2016 |
| JP | 6024486 B2 | 11/2016 |
| JP | 6159109 B2 | 6/2017 |
| JP | 6176958 B2 | 7/2017 |
| JP | 6180025 B2 | 7/2017 |
| JP | 6298274 B2 | 3/2018 |
| JP | 2018139718 A | 9/2018 |
| JP | 6429710 B2 | 11/2018 |
| JP | 2018187217 A | 11/2018 |
| JP | 6913131 B2 | 7/2021 |
| JP | 6941026 B2 | 9/2021 |
| JP | 2023042747 A | 3/2023 |
| JP | 7315360 B2 | 7/2023 |
| WO | 2009084643 A1 | 7/2009 |
| WO | 2014080795 A1 | 5/2014 |
| WO | 2014196215 A1 | 12/2014 |
| WO | 2015046632 A1 | 4/2015 |
| WO | 2016013662 A1 | 1/2016 |
| WO | 2016104753 A1 | 6/2016 |
| WO | 2016121236 A1 | 8/2016 |
| WO | 2018207512 A1 | 11/2018 |
| WO | 2020062132 A1 | 4/2020 |
| WO | 2020195099 A1 | 10/2020 |
| WO | 2021241553 A1 | 12/2021 |
| WO | 2022004727 A1 | 1/2022 |

OTHER PUBLICATIONS

All Office Actions; U.S. Appl. No. 18/214,569, filed Jun. 27, 2023.
All Office Actions; U.S. Appl. No. 18/214,573, filed Jun. 27, 2023.
All Office Actions; U.S. Appl. No. 18/214,586, filed Jun. 27, 2023.
All Office Actions; U.S. Appl. No. 18/214,603, filed Jun. 27, 2023.
All Office Actions; U.S. Appl. No. 18/214,680, filed Jun. 27, 2023.
All Office Actions; U.S. Appl. No. 18/214,691, filed Jun. 27, 2023.
All Office Actions; U.S. Appl. No. 18/214,718, filed Jun. 27, 2023.
All Office Actions; U.S. Appl. No. 18/214,750, filed Jun. 27, 2023.
All Office Actions; U.S. Appl. No. 18/342,054, filed Jun. 27, 2023.
All Office Actions; U.S. Appl. No. 18/342,058, filed Jun. 27, 2023.
All Office Actions; U.S. Appl. No. 18/214,626, filed Jun. 27, 2023.
Unpublished U.S. Appl. No. 18/214,548, filed Jun. 27, 2023, to Jeromy Thomas Raycheck et al.
Unpublished U.S. Appl. No. 18/214,569, filed Jun. 27, 2023, to Keith Richard Willhaus et al.
Unpublished U.S. Appl. No. 18/214,573, filed Jun. 27, 2023, to Jeromy Thomas Raycheck et al.
Unpublished U.S. Appl. No. 18/214,586, filed Jun. 27, 2023, to Keith Richard Willhaus et al.
Unpublished U.S. Appl. No. 18/214,603, filed Jun. 27, 2023, to Keith Richard Willhaus et al.
Unpublished U.S. Appl. No. 18/214,626, filed Jun. 27, 2023, to Keith Richard Willhaus et al.
Unpublished U.S. Appl. No. 18/214,680, filed Jun. 27, 2023, to Jeromy Thomas Raycheck et al.
Unpublished U.S. Appl. No. 18/214,691, filed Jun. 27, 2023, to Uwe Schneider et al.
Unpublished U.S. Appl. No. 18/214,718, filed Jun. 27, 2023, to Keith Richard Willhaus et al.
Unpublished U.S. Appl. No. 18/214,750, filed Jun. 27, 2023, to Jeffry Rosiak et al.
Unpublished U.S. Appl. No. 18/342,054, filed Jun. 27, 2023, to Nicholas Alexander Taylor et al.
Unpublished U.S. Appl. No. 18/342,058, filed Jun. 27, 2023, to Han Xu et al.
PCT Search Report and Written Opinion for PCT/US2023/069112 dated Sep. 21, 2023, 13 pages.

(56) References Cited

OTHER PUBLICATIONS

All Office Actions; U.S. Appl. No. 18/967,797, filed Dec. 4, 2024.
All Office Actions; U.S. Appl. No. 18/967,768, filed Dec. 4, 2024.
All Office Actions; U.S. Appl. No. 18/967,824, filed Dec. 4, 2024.
All Office Actions; U.S. Appl. No. 18/968,031, filed Dec. 4, 2024.
All Office Actions; U.S. Appl. No. 18/978,059, filed Dec. 12, 2024.
Unpublished U.S. Appl. No. 18/967,797, filed Dec. 4, 2024, Kaitlyn Nicole Taylor et al.
Unpublished U.S. Appl. No. 18/967,768, filed Dec. 4, 2024, Keith Richard Willhaus et al.
Unpublished U.S. Appl. No. 18/967,824, filed Dec. 4, 2024, Jeffry Rosiak et al.
Unpublished U.S. Appl. No. 18/968,031, filed Dec. 4, 2024, Keith Richard Willhaus et al.
Unpublished U.S. Appl. No. 18/978,059, filed Dec. 12, 2024, Jeromy Thomas Raycheck et al.

* cited by examiner

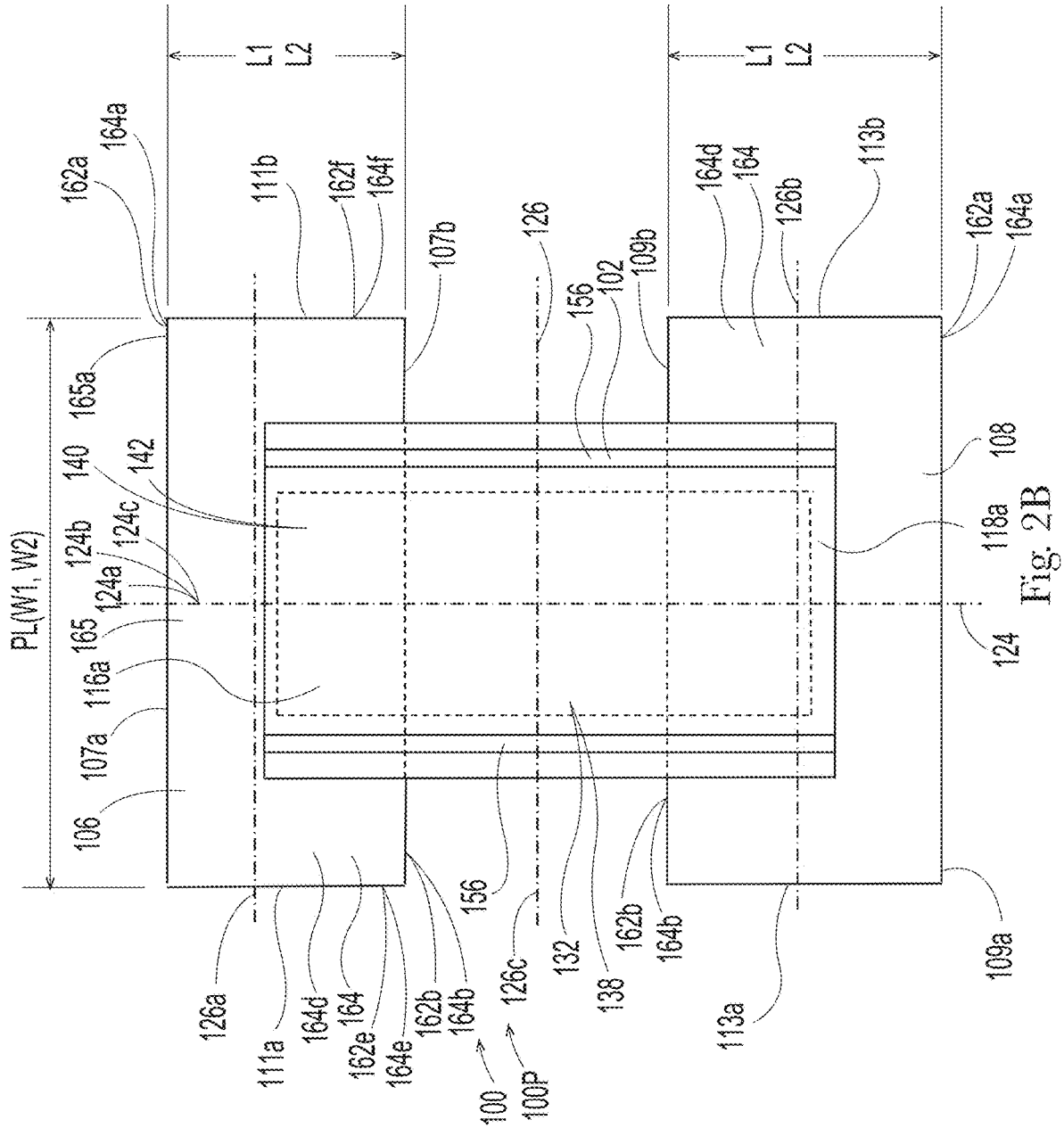

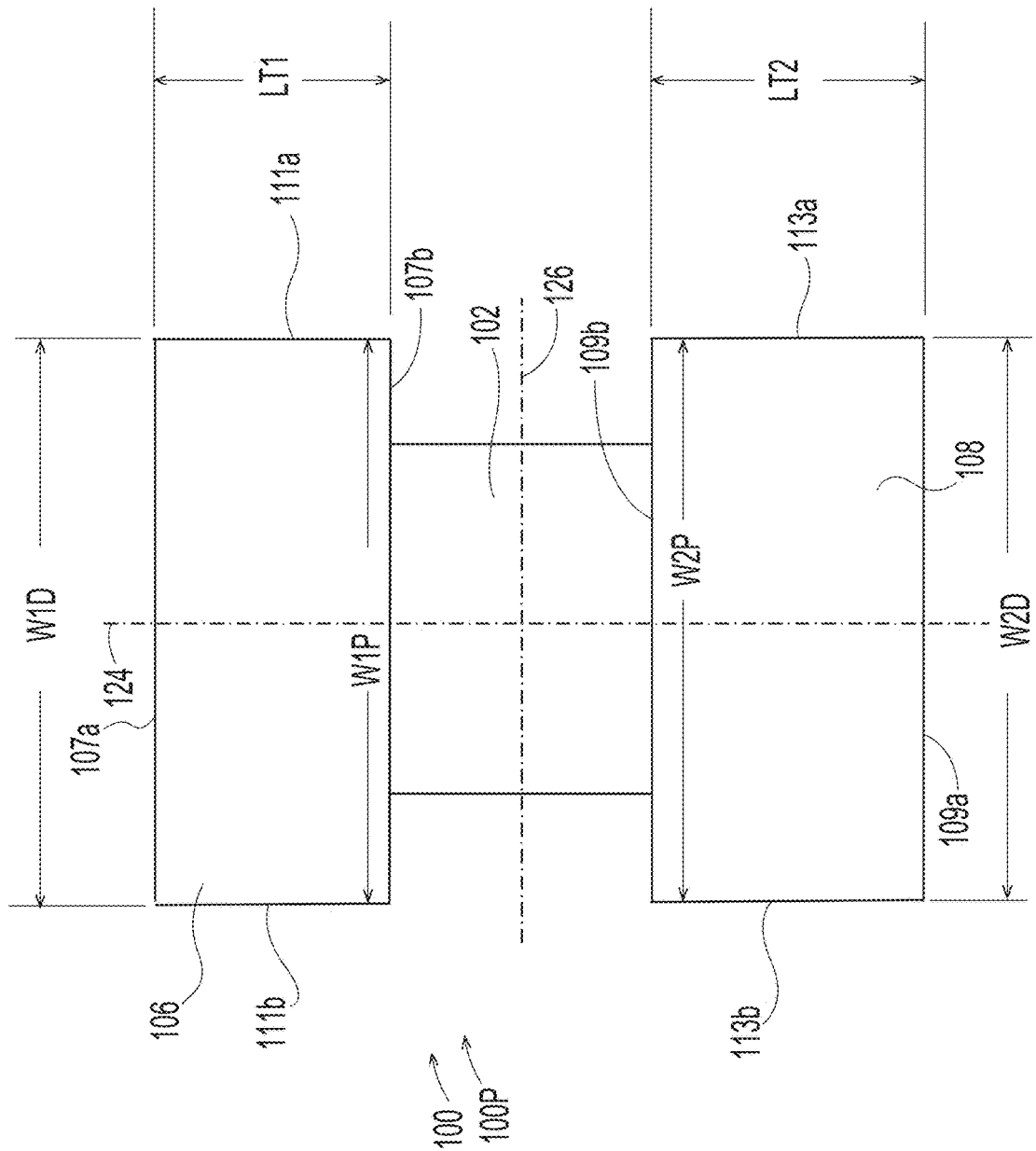

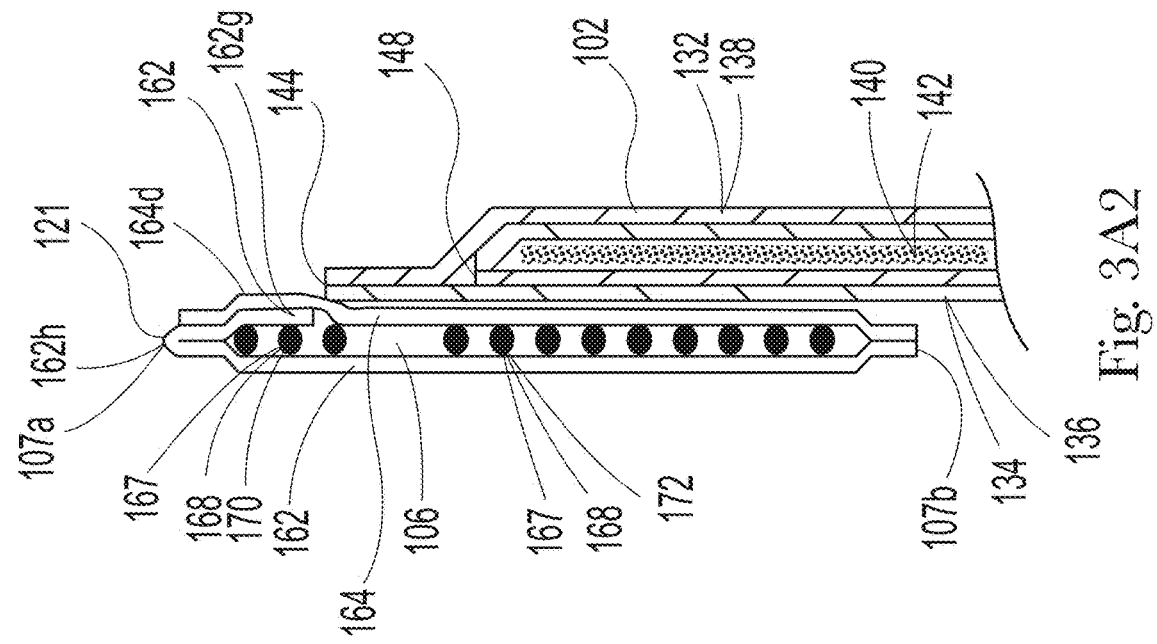
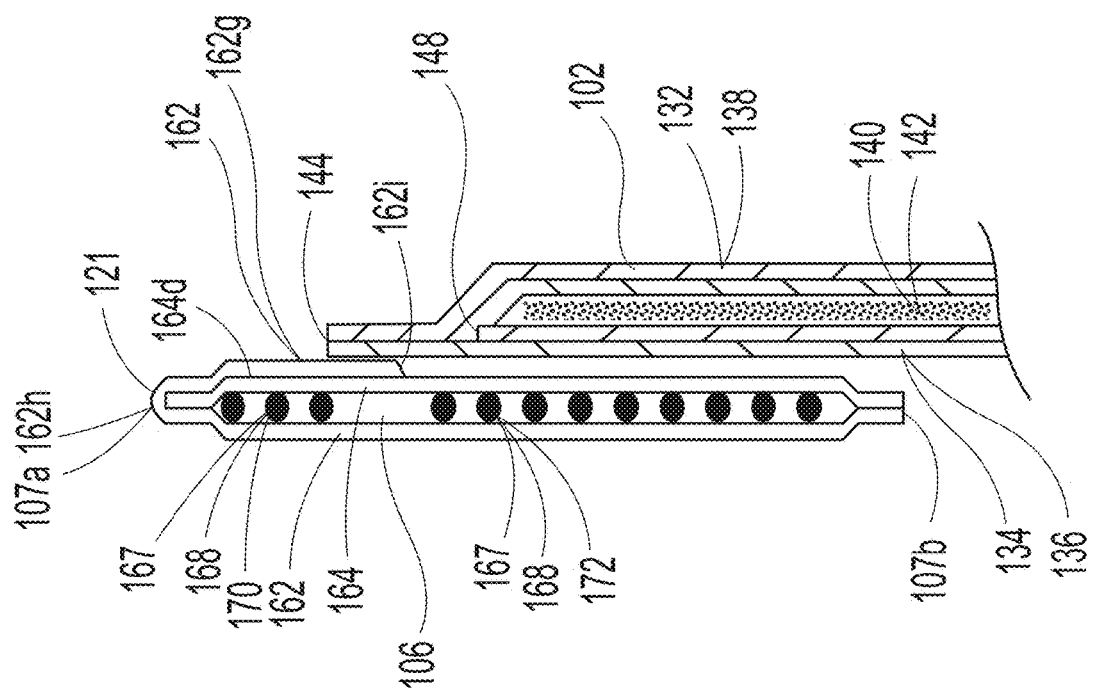

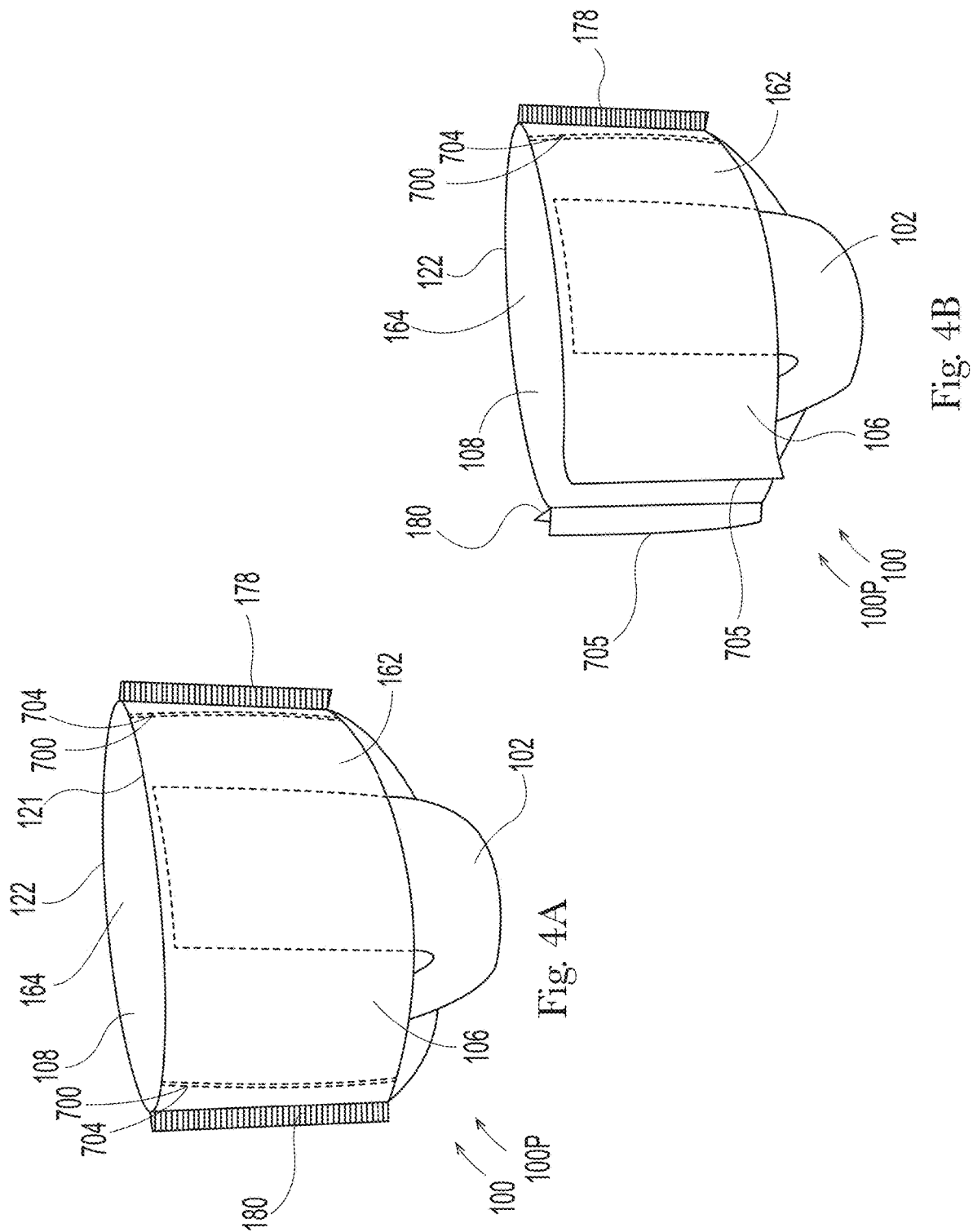

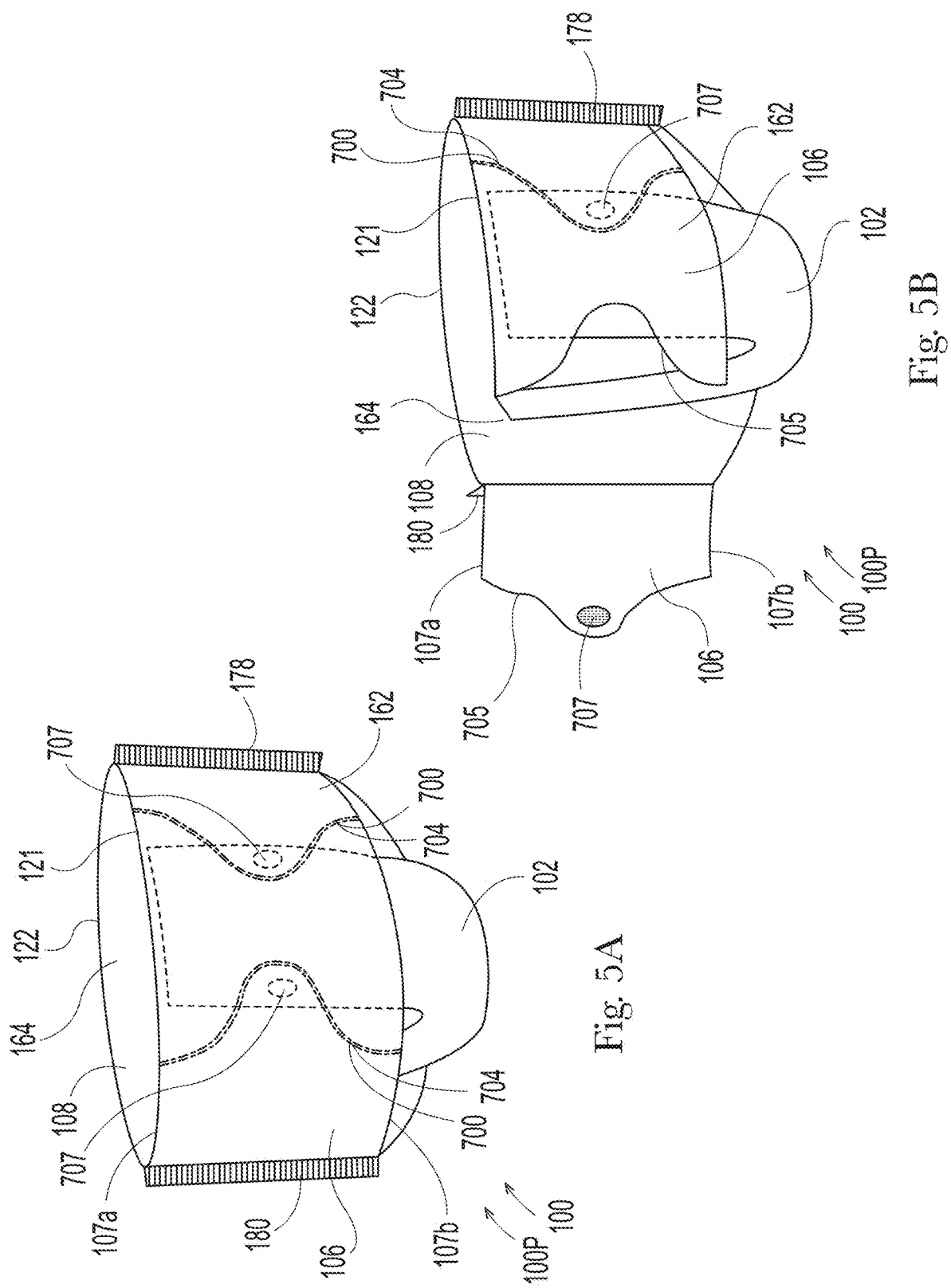

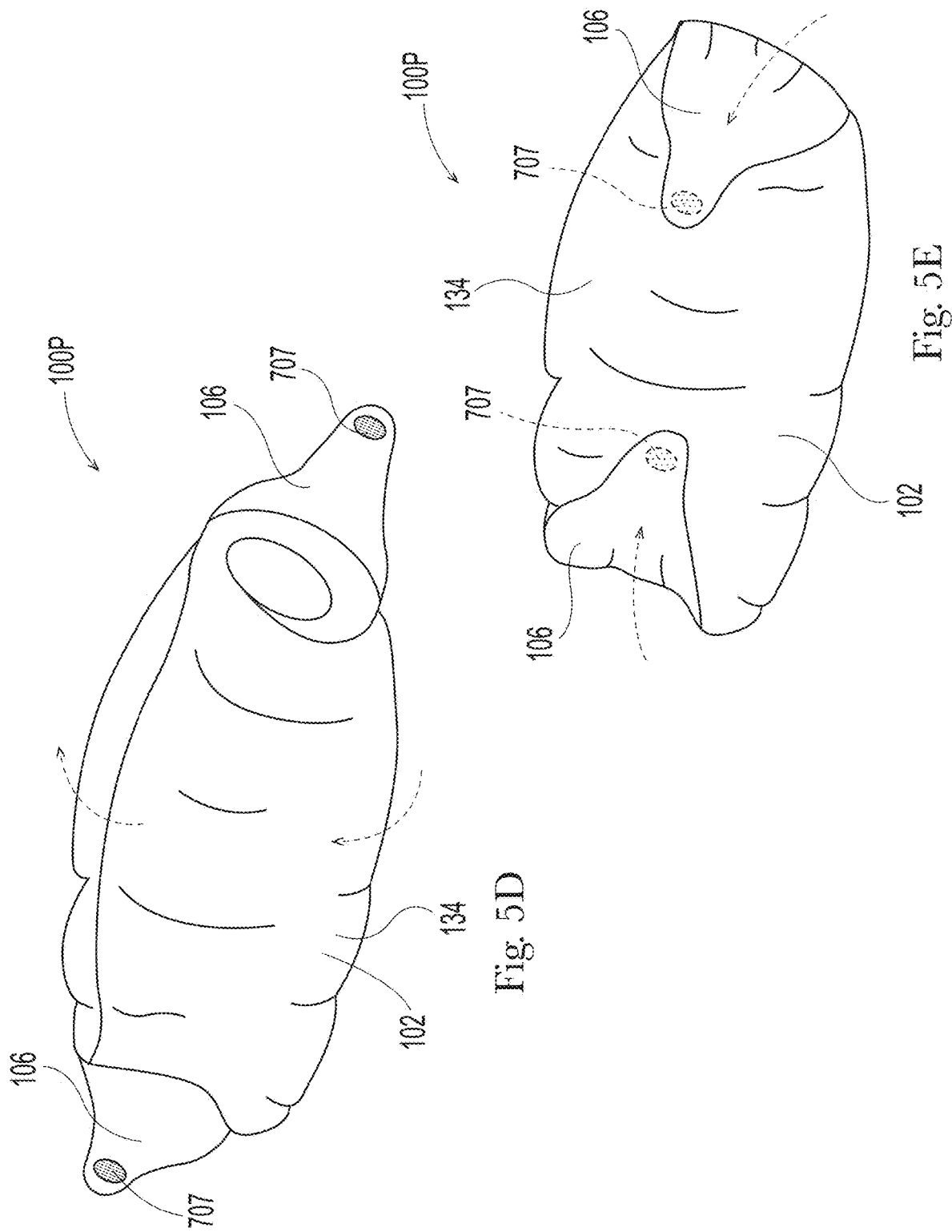

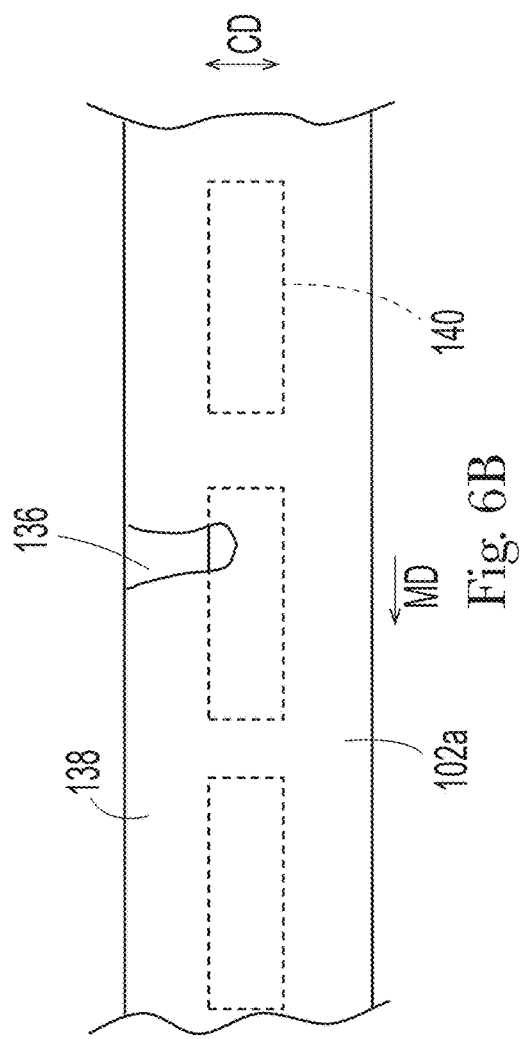
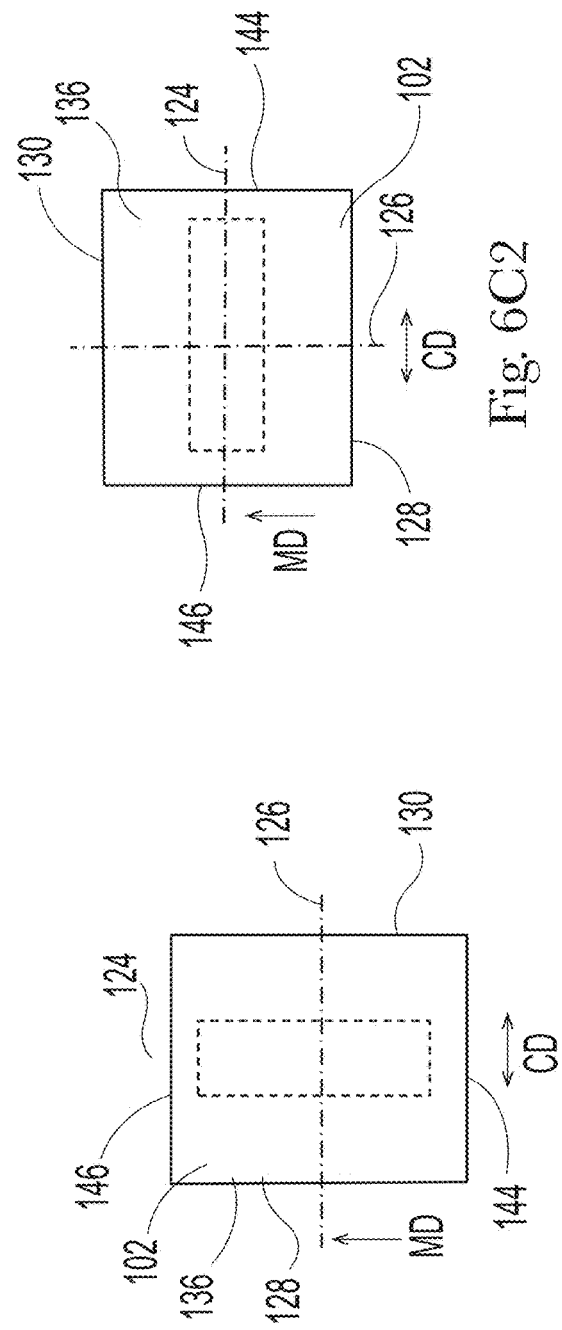

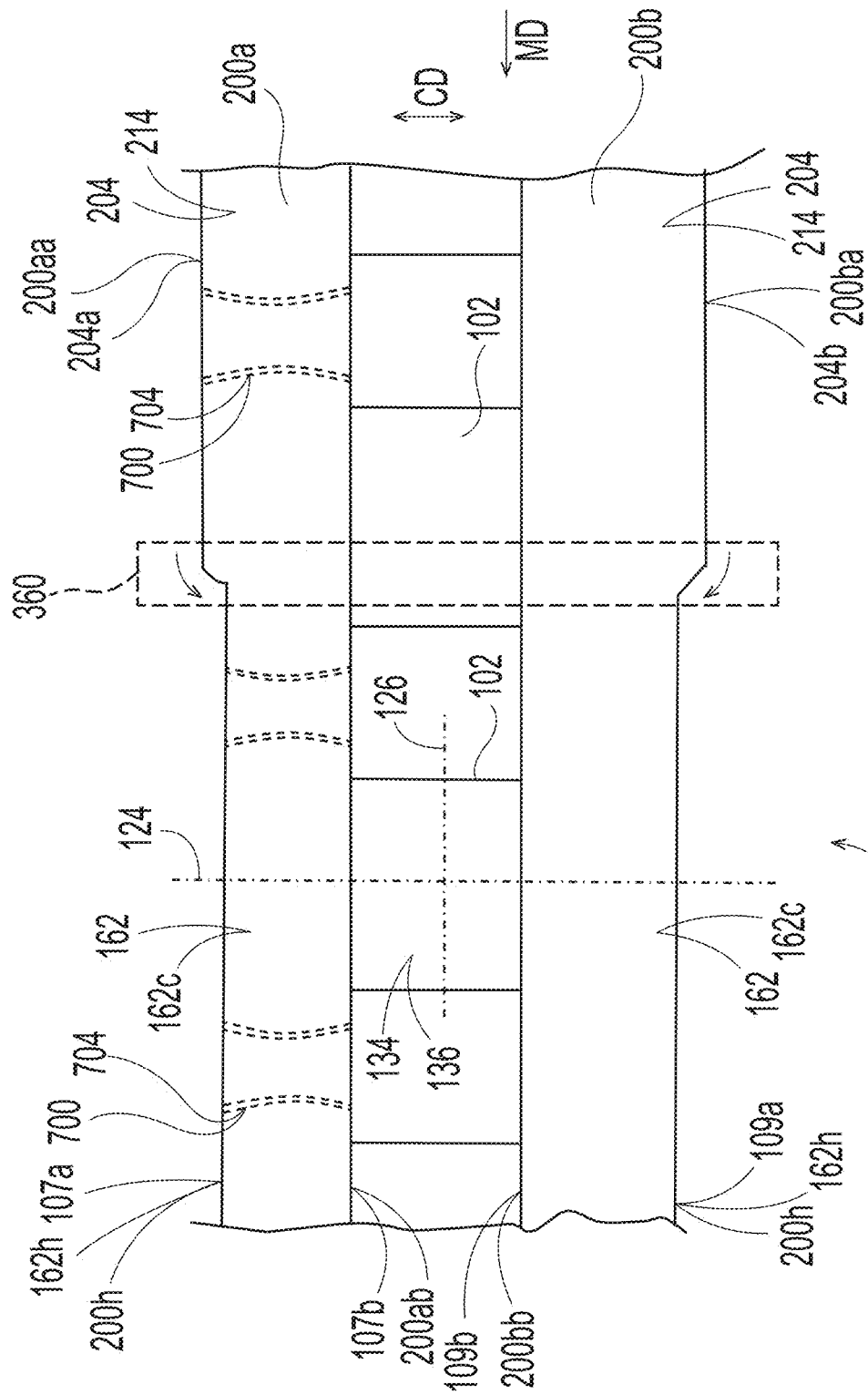
Fig. 6D1

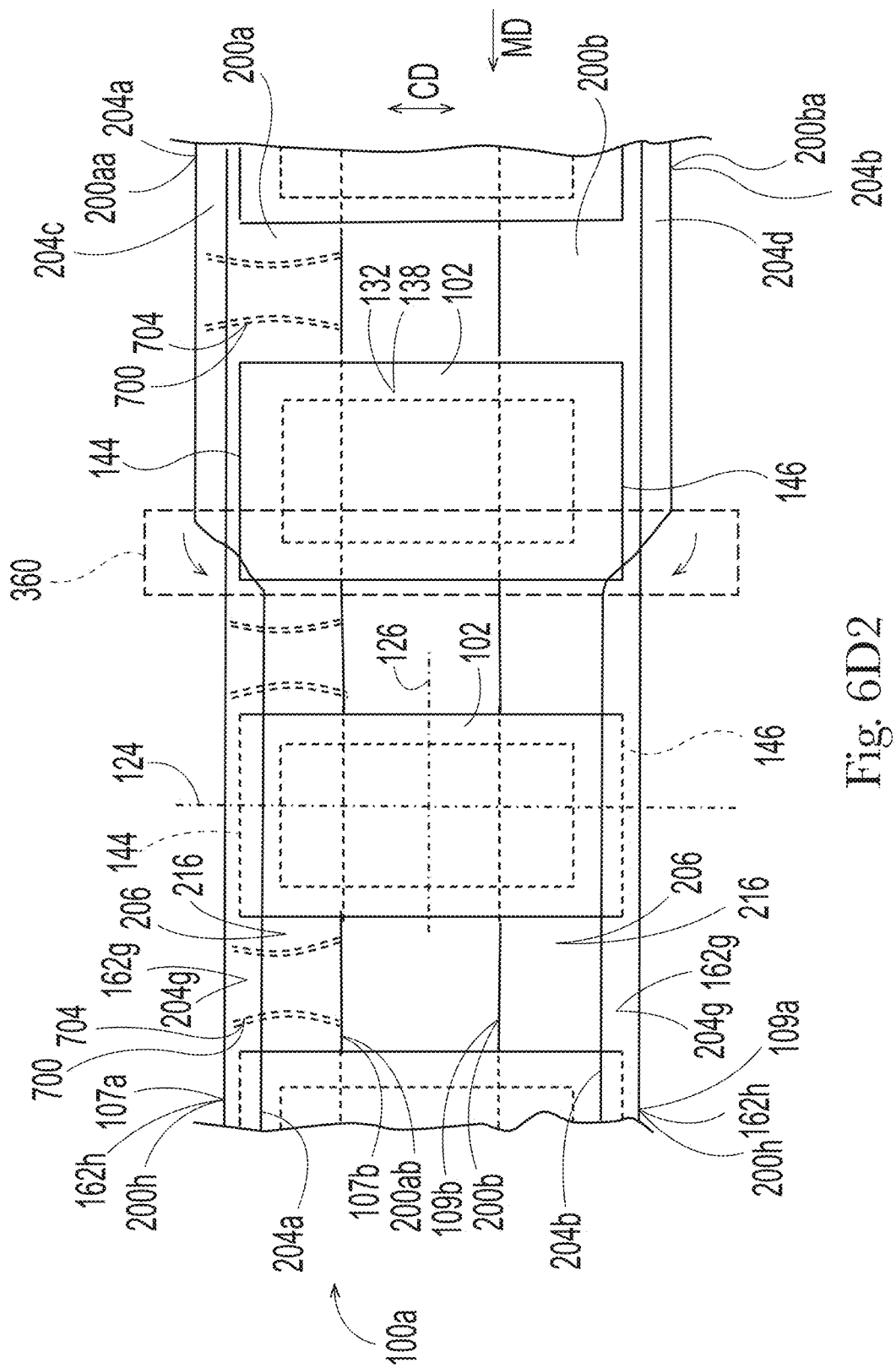

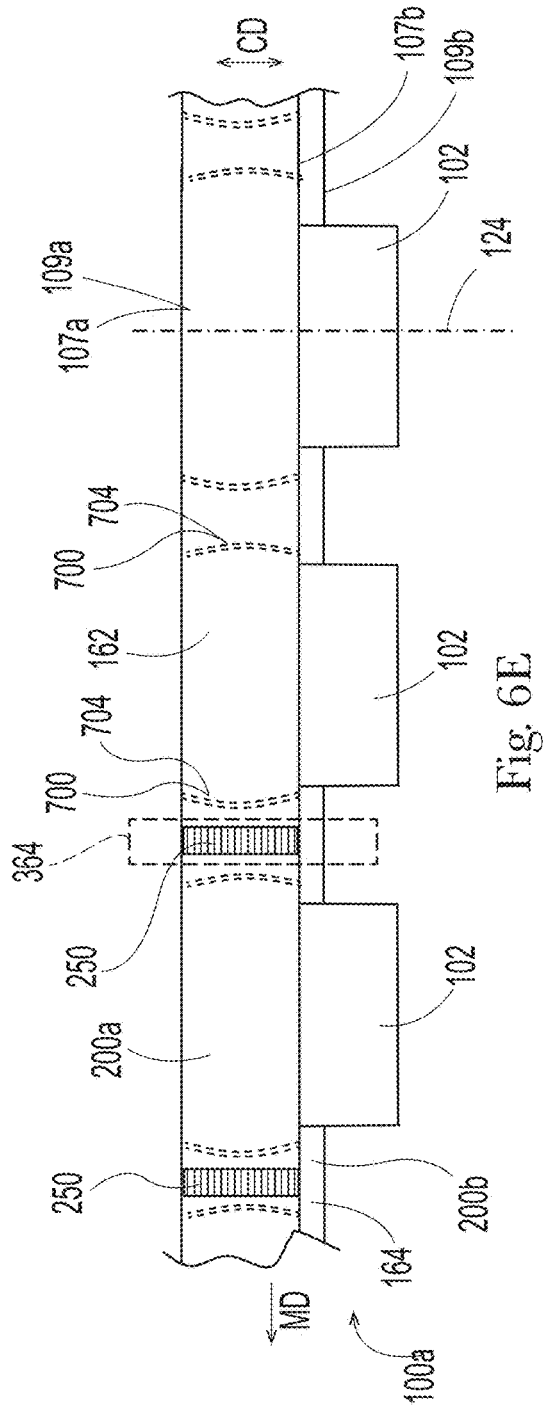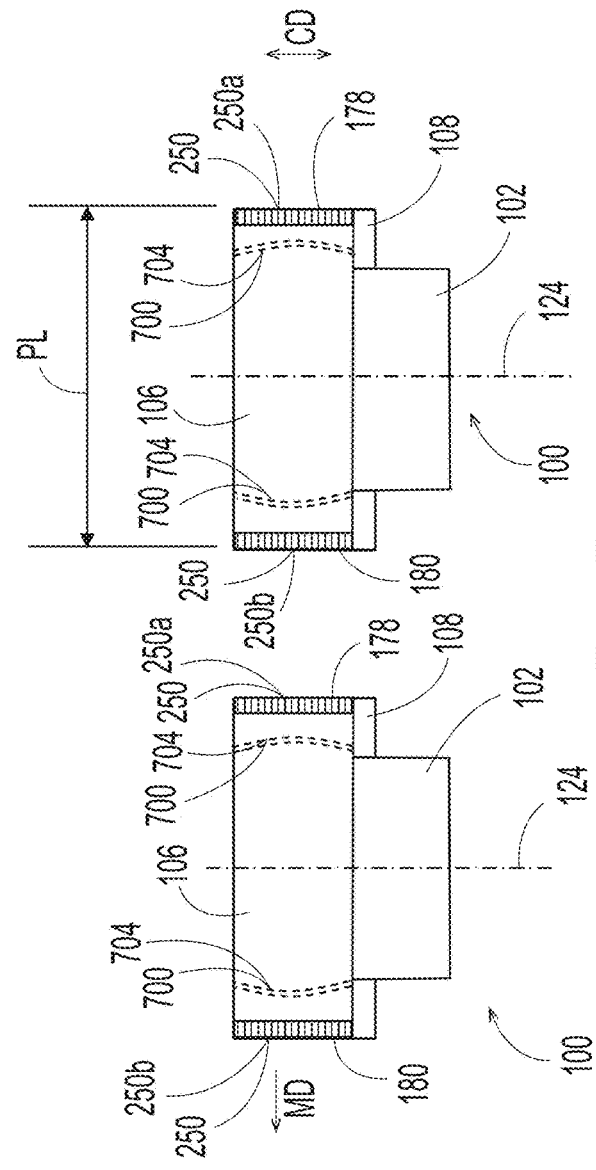

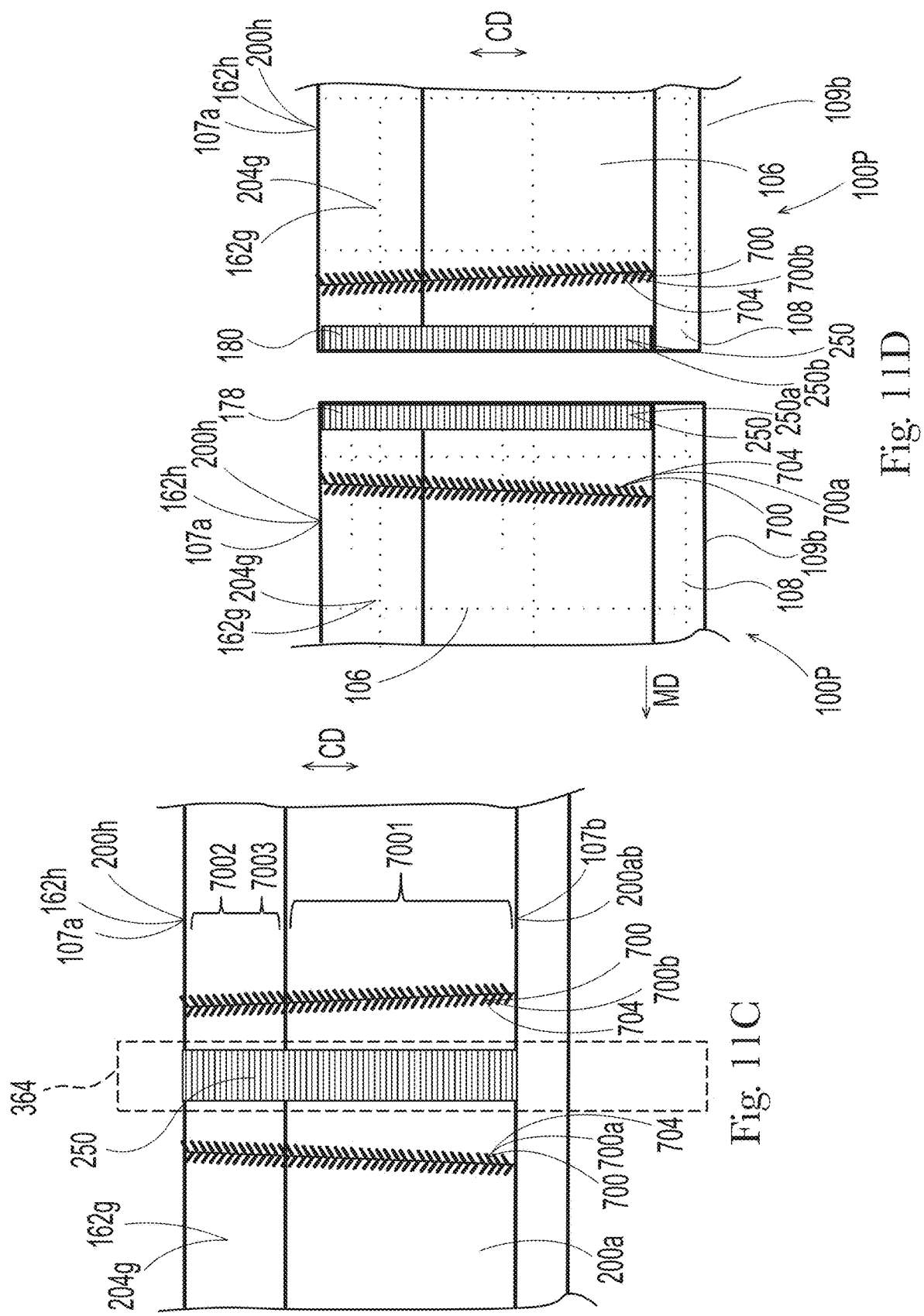

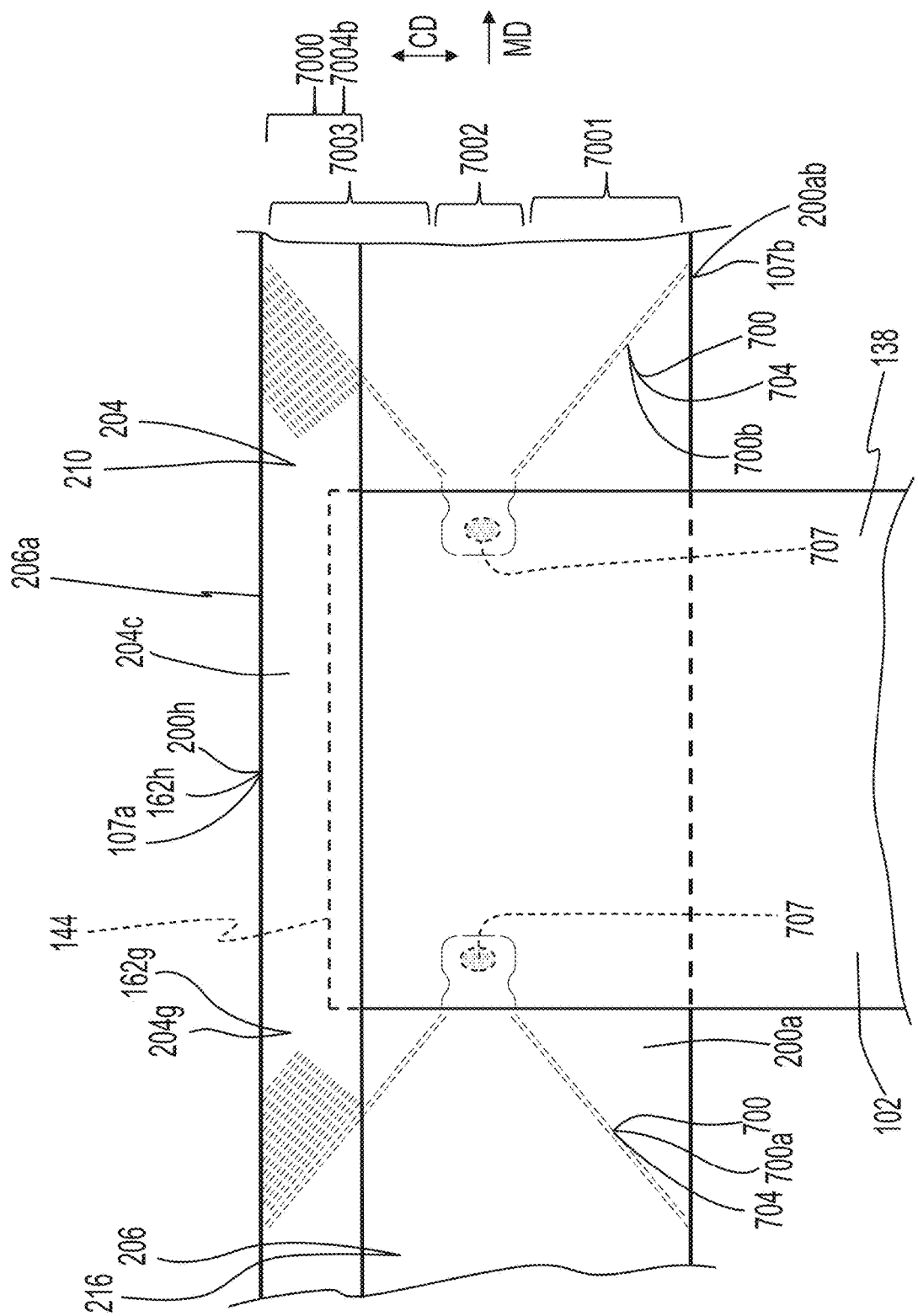
Fig. 14D1

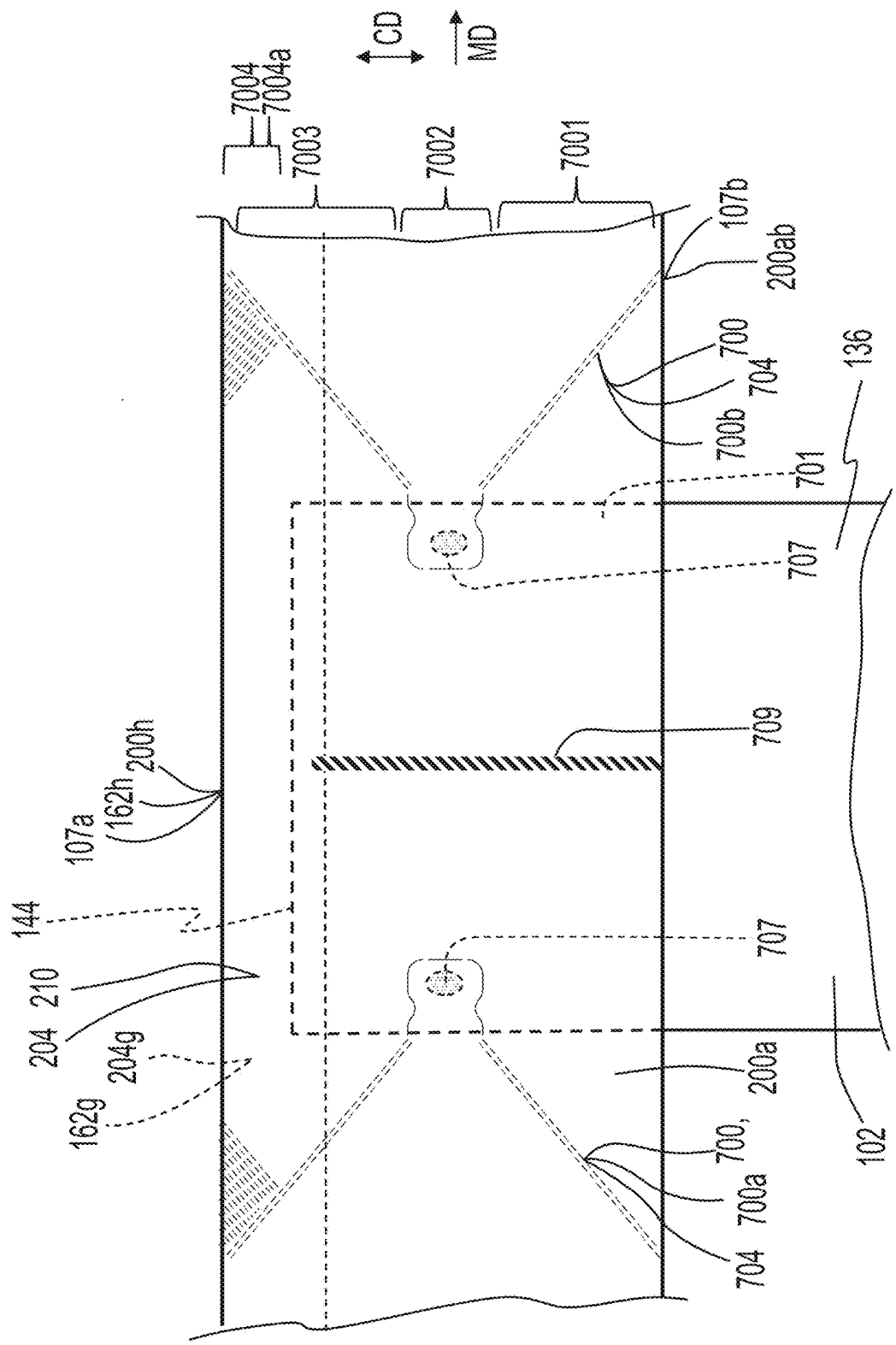
Fig. 14D2

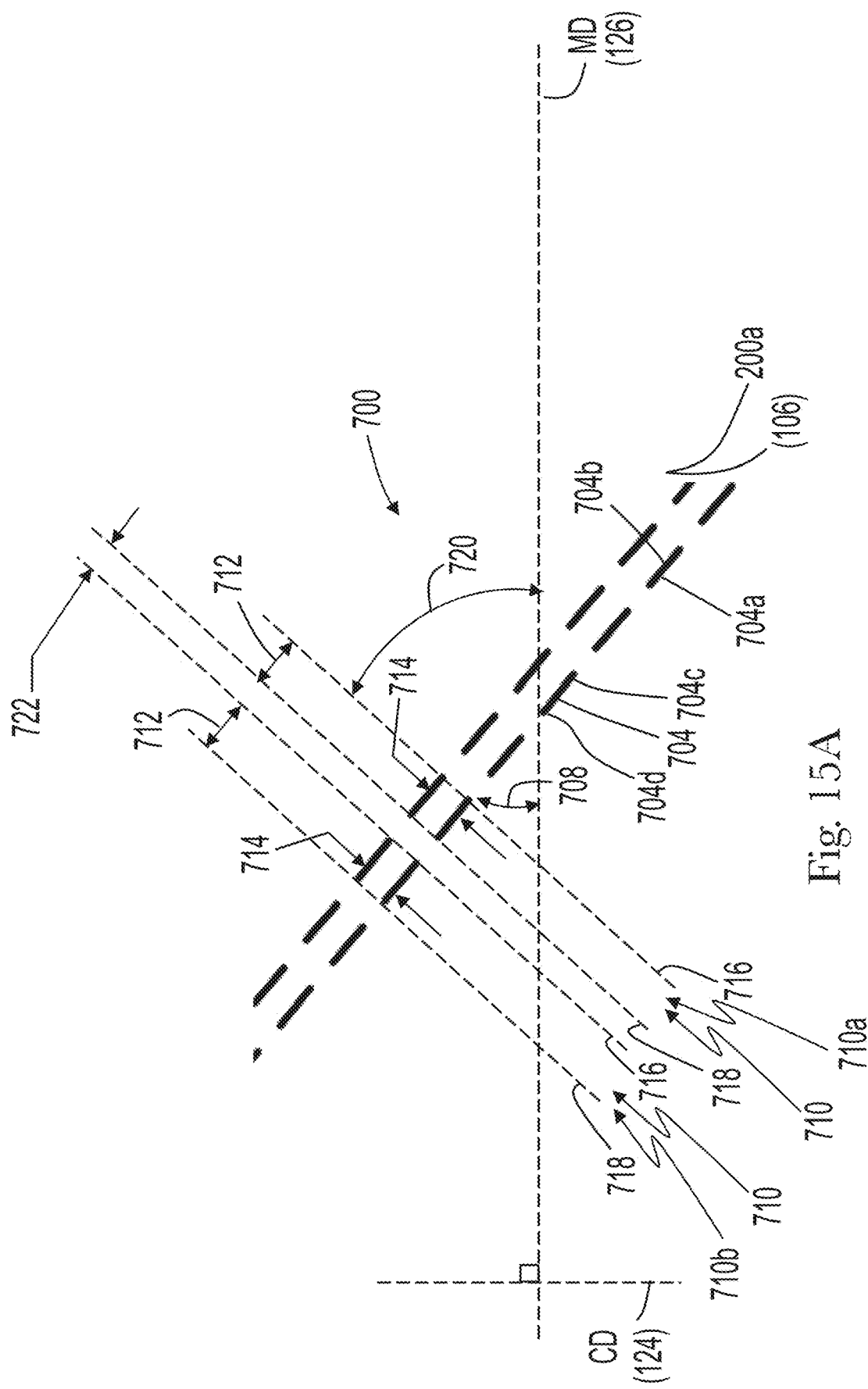

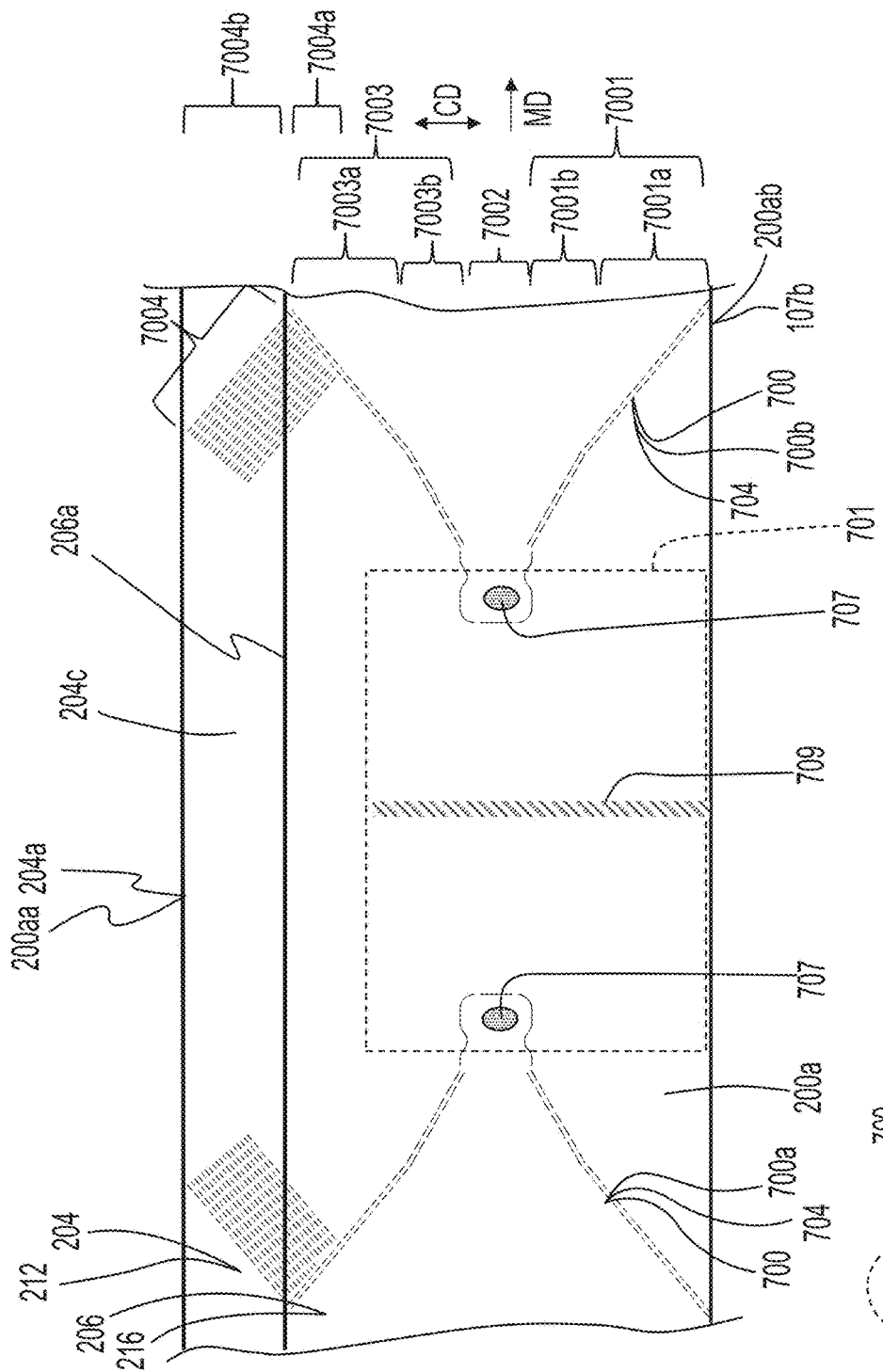
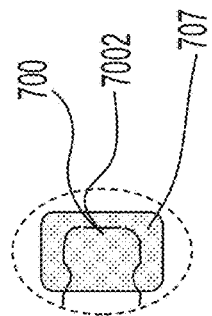
Fig. 17A
Fig. 17B

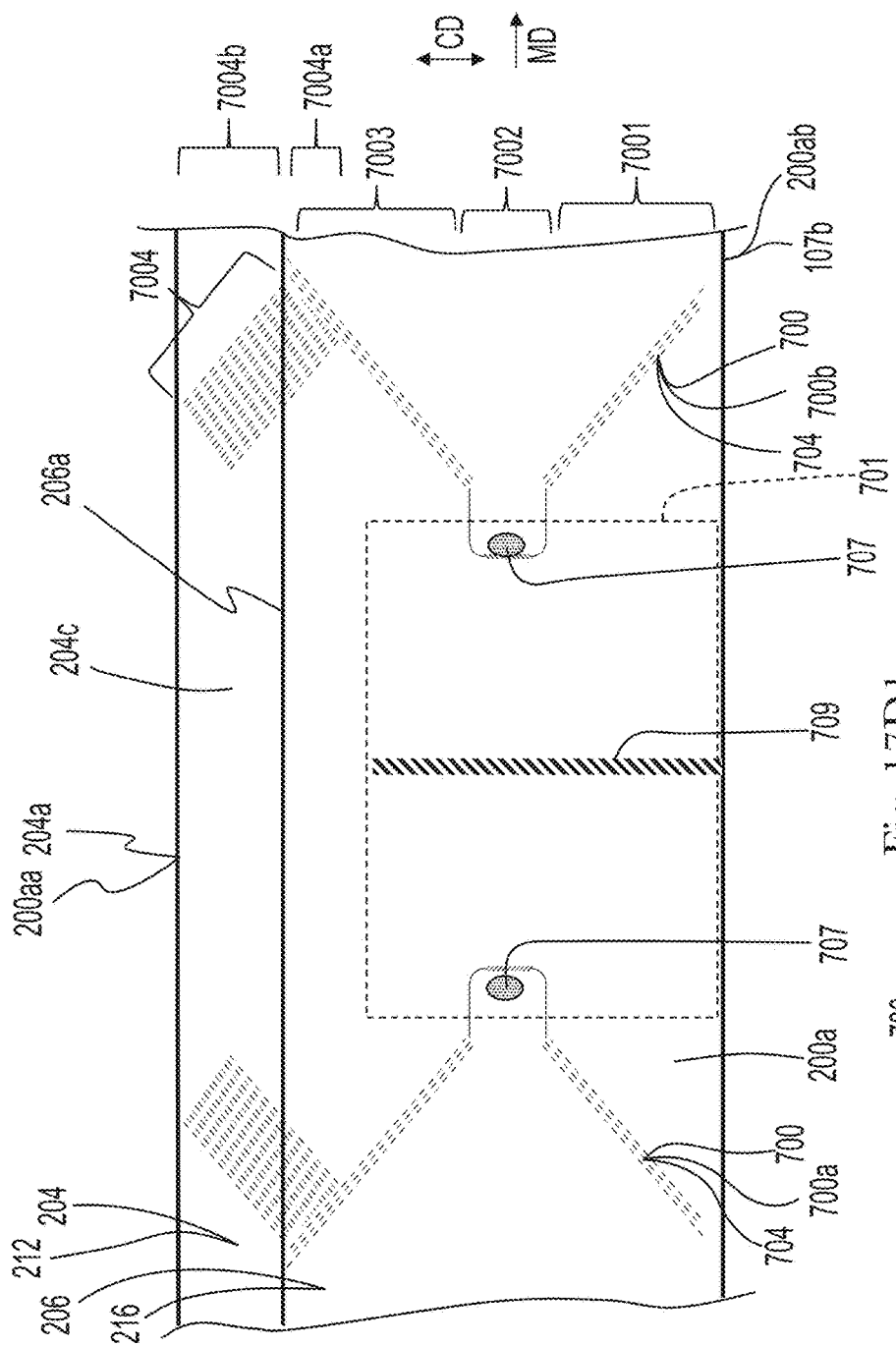
Fig. 17D1
Fig. 17D2

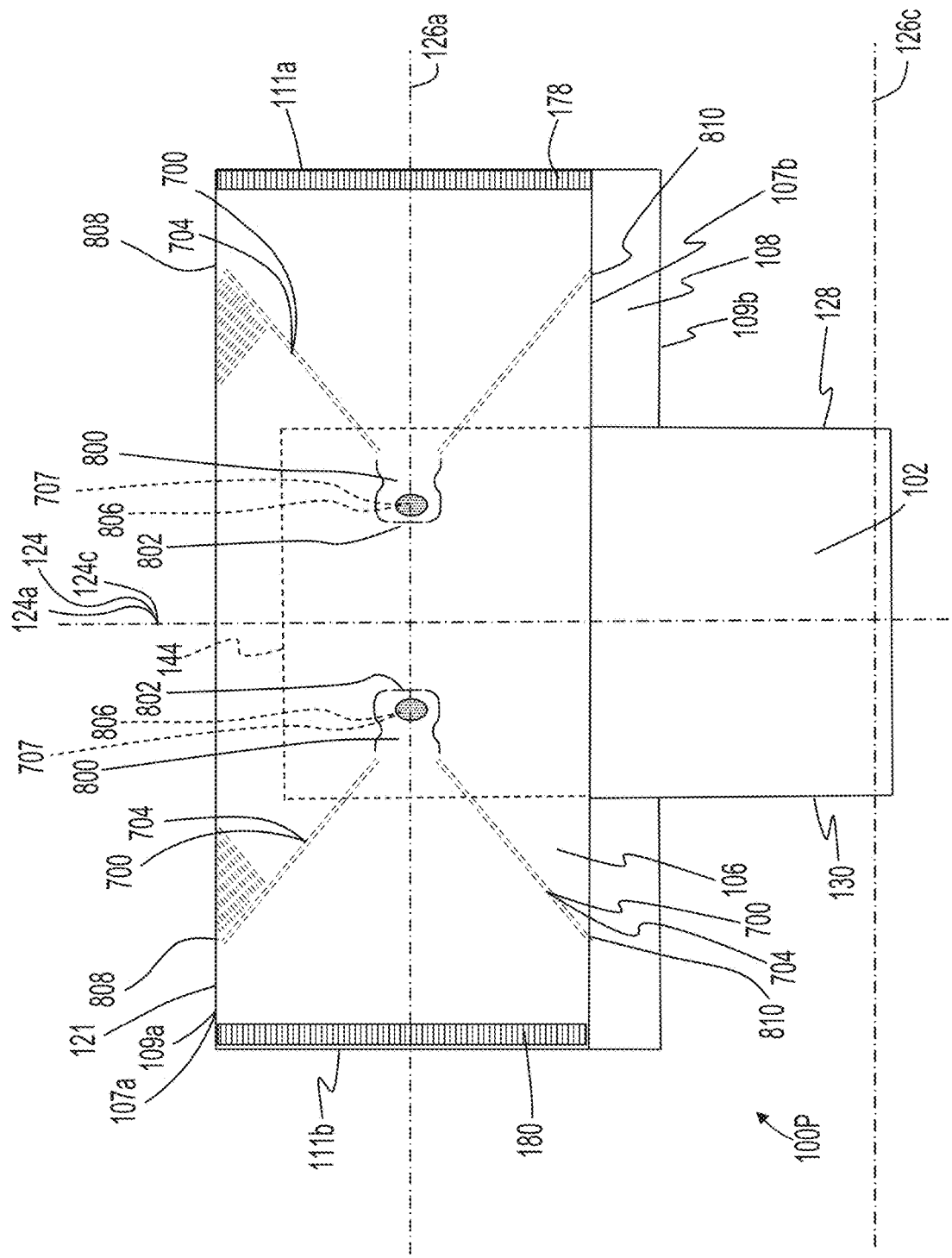

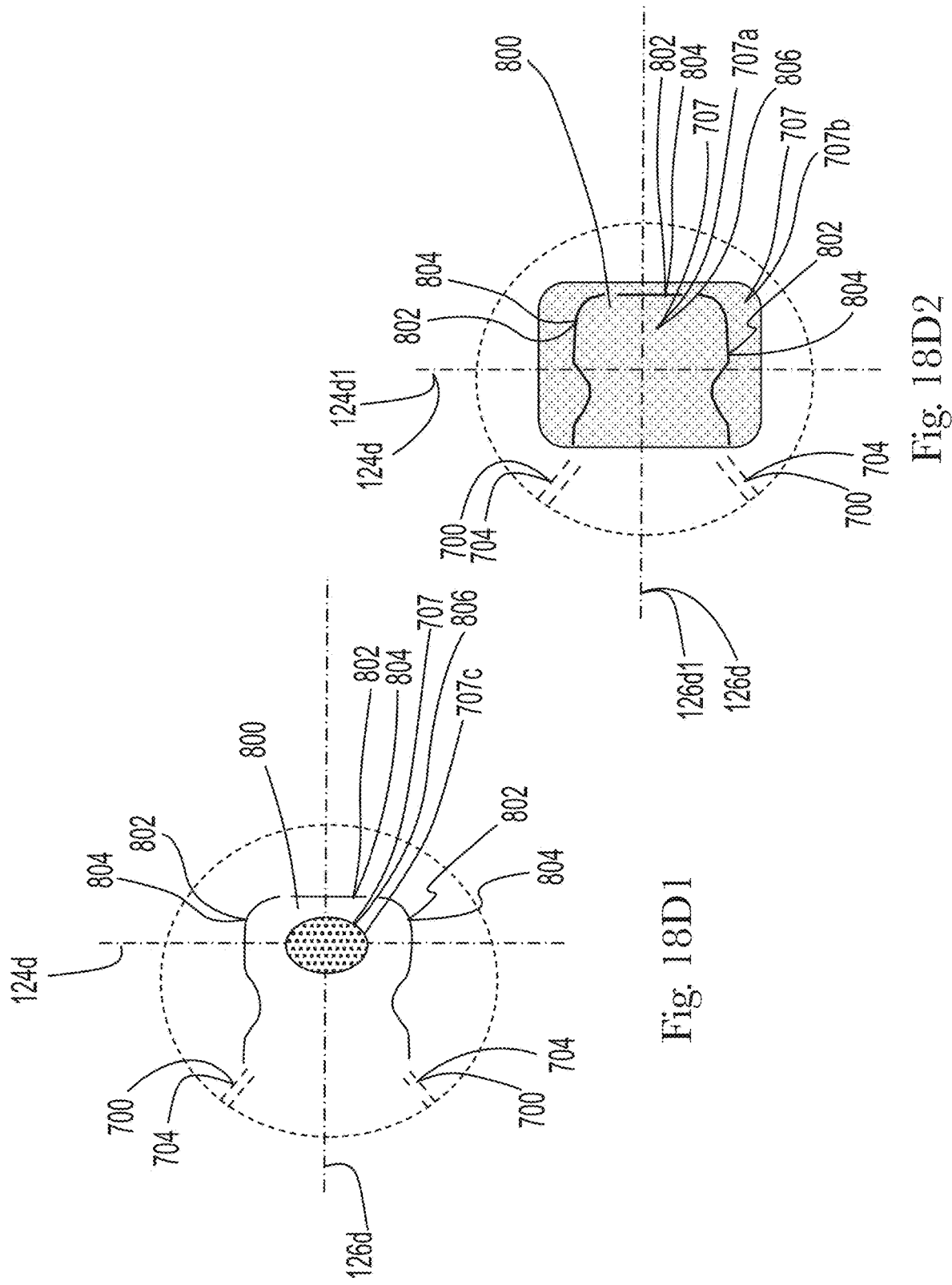

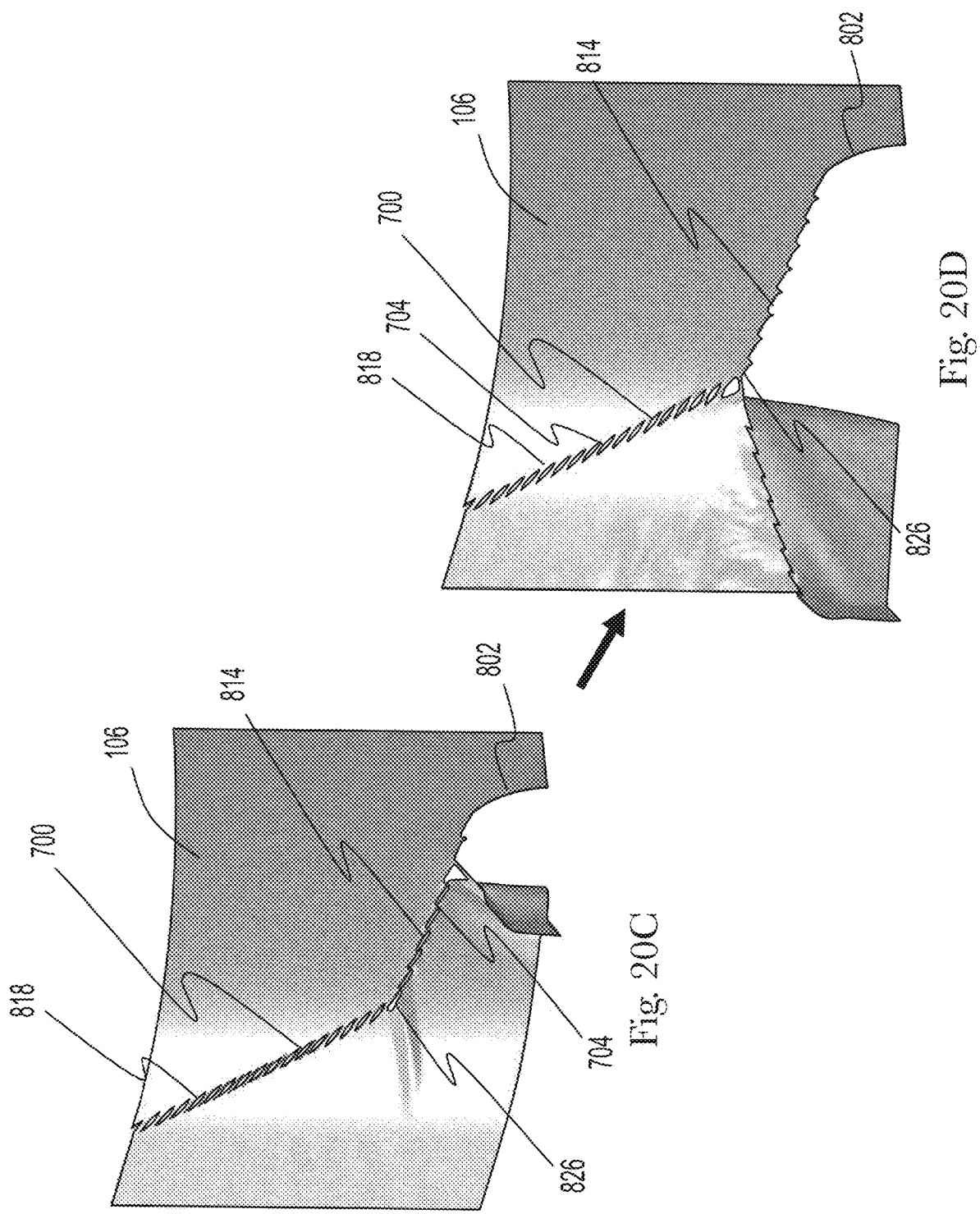

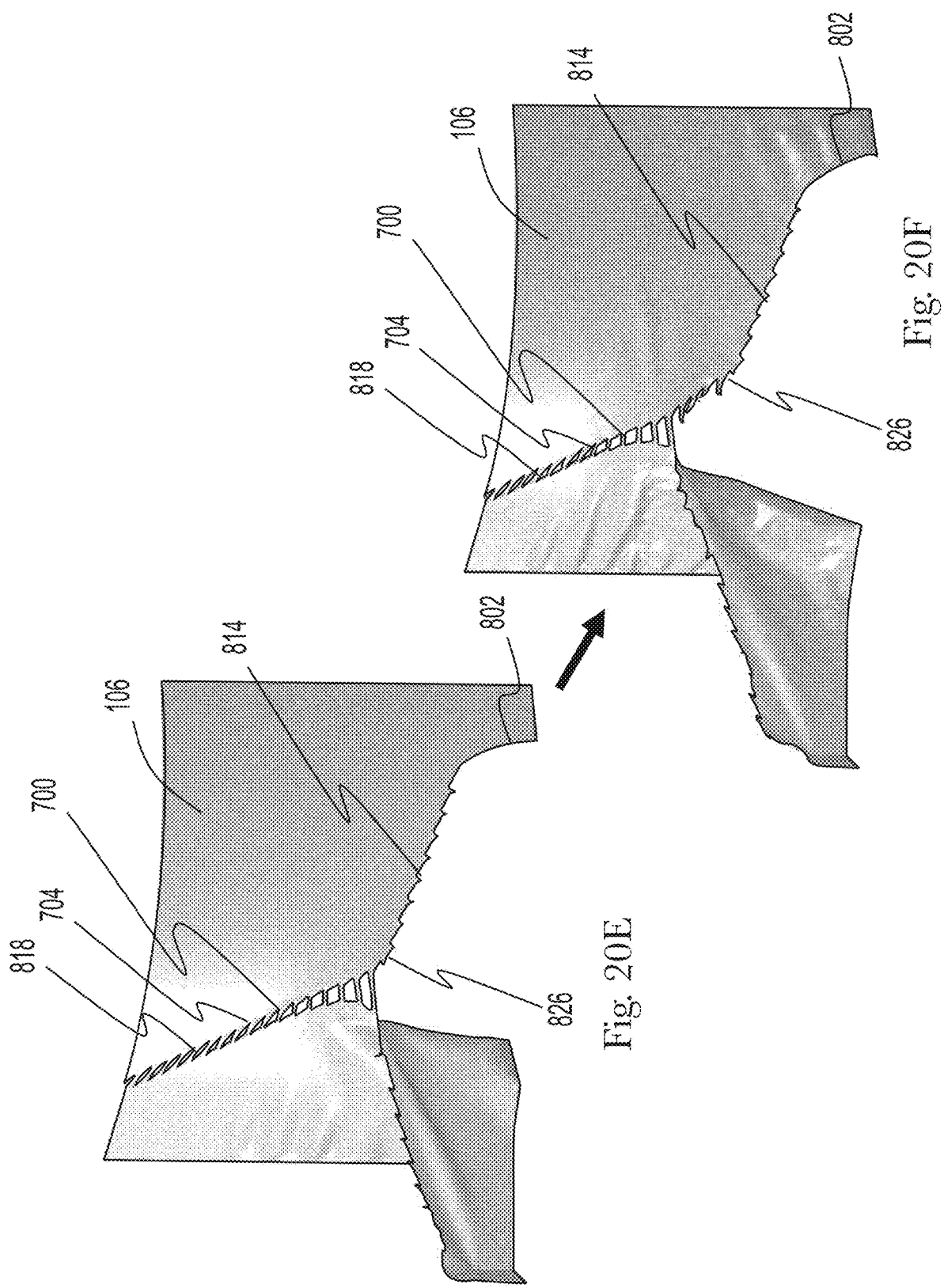

ABSORBENT ARTICLES AND METHODS AND APPARATUSES FOR MAKING ABSORBENT ARTICLES WITH FRANGIBLE PATHWAYS

CROSS REFERENCE TO RELATED APPLICATION

This application claims the benefit, under 35 USC 119(e), of U.S. Provisional Patent Application No. 63/357,043, filed on Jun. 30, 2022; U.S. Provisional Patent Application No. 63/432,400, filed on Dec. 14, 2022; U.S. Provisional Patent Application No. 63/432,401, filed on Dec. 14, 2022; U.S. Provisional Patent Application No. 63/432,402, filed on Dec. 14, 2022; U.S. Provisional Patent Application No. 63/432,403, filed on Dec. 14, 2022; U.S. Provisional Patent Application No. 63/432,404, filed on Dec. 14, 2022; U.S. Provisional Patent Application No. 63/432,406, filed on Dec. 14, 2022; U.S. Provisional Patent Application No. 63/432,410, filed on Dec. 14, 2022; and U.S. Provisional Patent Application No. 63/432,413, filed on Dec. 14, 2022, each of which are herein incorporated by reference in their entirety.

FIELD OF THE INVENTION

The present disclosure relates to absorbent articles, and more particularly, to methods and apparatuses for making absorbent articles having front and/or back waist regions including one or more frangible pathways.

BACKGROUND OF THE INVENTION

Along an assembly line, various types of articles, such as for example, diapers and other absorbent articles, may be assembled by adding components to and/or otherwise modifying an advancing, continuous web of material. For example, in some processes, advancing webs of material are combined with other advancing webs of material. In other examples, individual components created from advancing webs of material are combined with advancing webs of material, which in turn, are then combined with other advancing webs of material. In some cases, individual components created from an advancing web or webs are combined with other individual components created from other advancing webs. Webs of material and component parts used to manufacture diapers may include: backsheets, topsheets, leg cuffs, waist bands, absorbent core components, front and/or back ears, fastening components, and various types of elastic webs and components such as front and/or back waist panels, leg elastics, barrier leg cuff elastics, stretch side panels, and waist elastics. Once the desired component parts are assembled, the advancing web(s) and component parts are subjected to a final knife cut to separate the web(s) into discrete diapers or other absorbent articles.

Some absorbent articles have components that include elastomeric laminates. Such elastomeric laminates may include an elastic material bonded to one or more nonwovens. The elastic material may include an elastic film and/or elastic strands. In some laminates, a plurality of elastic strands are joined to a nonwoven while the plurality of strands are in a stretched condition so that when the elastic strands relax, the nonwoven gathers, and in turn, forms corrugations and rugosities. The resulting elastomeric laminate is stretchable to the extent that the corrugations allow the elastic strands to elongate.

Absorbent articles in the form of diaper pants may also be configured with an absorbent chassis connected with front and back elastic belts, wherein opposing end regions of the front and back belts are connected with each other at side seams. In some instances, the elasticity of the front and back belts is removed in regions where the chassis connects with the belts. Thus, in some converting configurations adapted to assemble such diaper pants, stretched elastic strands are glued between two continuous nonwoven webs to form an elastic laminate. Regions of the elastic strands may then be intermittently deactivated along the length of the elastic laminate by cutting the elastic strands in areas to be connected with the chassis, sometimes referred to as tummy elastic cutting.

Some caregivers of older incontinent babies or toddlers may prefer a closed, pant-style disposable absorbent article to enable application to, and removal from, a child while the child is in a standing position. One disadvantage of this product form is that the removal and disposal of feces-containing products may be unhygienic and inconvenient. For example, pulling the product down could cause feces to smear down the legs of a user. In other examples, a caregiver may tear open the bonded sides using force. In turn, the force used can lead to a rapid release of energy from the diaper, causing the caregiver to lose control of the product and allowing feces to spill out. In contrast, removal and disposal of traditional open or taped diaper forms with fasteners may be readily accomplished while the child is laying on their back. In this case, the fasteners are opened, the diaper is removed from under the child, rolled into a roughly cylindrical shape, and then the fasteners are secured around the rolled, soiled diaper, closing the leg openings for hygienic disposal.

In order to avoid having to remove soiled diaper pants from a wearer by sliding the soiled diaper pant down the wearer's legs or tearing bonded side seams, some diaper pants may be configured with tear lines in the front belt or back belt. Such tear lines may include perforations that allow a caregiver to more easily separate the belt along the perforation lines. Once the belt is separated, the diaper pant can be more easily removed from the wearer without having to slide the diaper pant down the wearer's legs, in a similar manner as a traditional open taped diaper form. Thus, in addition to the above mentioned assembly operations, elastic laminates to be converted into front and/or back belts may also be subjected to additional handling and converting operations to create such perforation lines.

For example, in some operations, an elastic laminate may advance through a cutting station that perforates the advancing laminate to form tear lines in finally assembled diaper pants. However, various challenges may be associated with the forming the tear lines. Some elastic laminates may include several elastic strands, and as such, there may be challenges associated with cutting the elastic strands in the location of the perforation line. There may be challenges associated with ensuring that all elastic strands extending through the tear line are also consistently cut. When uncut elastic strands extend through a tear line in a belt of a diaper pant, such uncut elastic strands would need to be broken during removal of a diaper pant from a wearer. Such uncut elastic strands can be very difficult to break or tear. In addition, cutting perforation lines in nonwoven webs while also cutting elastic strands in an elastic laminate may weaken the laminate, which in turn, may result in unintended or premature opening of a belt during use of a diaper pant. Further, such weakening of the laminate may make the laminate relatively more likely to tear during assembly operations, and/or may otherwise result in control and handling difficulties associated with differential stretch characteristics within the laminate. In addition, utilization of a separate cutting station to form tear lines in an elastic laminate can present challenges associated ensuring intended positioning of such tear lines relative to other cutting operations to be performed on the laminate, such as final knife cutting and/or tummy elastic cutting.

Consequently, it would be beneficial to create pant-style articles that provide the caregiver the ability to remove and dispose soiled products in a similar manner to traditional open diaper forms. In addition, it would be beneficial to provide methods and apparatuses that are configured to form frangible pathways in elastic laminates that consistently cut elastic strands in such frangible pathways in such a way to maintain sufficient strength during use and to reduce web control and handling difficulties.

SUMMARY OF THE INVENTION

In one form, an absorbent article comprises: a chassis comprising a topsheet, a backsheet, and an absorbent core positioned between the topsheet and the backsheet, the chassis further comprising a first end region and a second end region longitudinally separated from the first end region by a crotch region; a first belt connected with the first end region of the chassis; a second belt connected with the second end region of the chassis, wherein laterally opposing end portions of the second belt are connected with laterally opposing end portions of the first belt to form a waist opening; wherein the first belt comprises: a proximal edge and a distal edge; elastic strands positioned between and connected with a first substrate and a second substrate; and a first frangible pathway in the first belt extending between the proximal edge and the distal edge, the first frangible pathway comprising lines of weakness, wherein all elastic strands extending through the first frangible pathway are cut at the lines of weakness such that a first plurality of the elastic strands are cut only once and such that a second plurality of the elastic strands are cut more than once.

In another form, a method for assembling absorbent articles comprises steps of: providing a first elastic laminate, the first elastic laminate comprising elastic strands positioned between and connected with a first substrate and a second substrate, the elastic strands extending in a machine direction, the first elastic laminate further comprising a first edge separated from a second edge in a cross direction, wherein the first elastic laminate comprises a first laminate width defined by a distance extending in the cross direction between the first edge and the second edge; advancing the first elastic laminate in the machine direction; and forming a first frangible pathway in the first elastic laminate extending in the cross direction between the first edge and the second edge, the first frangible pathway comprising lines of weakness, wherein all elastic strands extending through the first frangible pathway are cut at the lines of weakness such that a first plurality of the elastic strands are cut only once and such that a second plurality of the elastic strands are cut more than once.

In yet another form, a cutting apparatus comprises: a knife roll comprising a means for forming a frangible pathway in an elastic laminate and a means for making a low-stretch zone in the elastic laminate.

In still another form, a cutting apparatus comprises: a knife roll comprising a means for forming a frangible pathway in an elastic laminate and a means for cutting the elastic laminate into discrete pieces.

BRIEF DESCRIPTION OF THE DRAWINGS

FIG. 2B shows a plan view of a diaper pant with the portion of the diaper that faces toward a wearer oriented toward the viewer.

FIG. 2C shows a plan view of a diaper pant with the portion of the diaper that faces away from a wearer oriented toward the viewer, illustrating first and second belt size and shape features.

FIG. 3A1 is a cross-sectional detailed view of another example configuration wherein the first belt is provided with panel layers wherein one panel layer is folded over another panel layer.

FIG. 3A2 is a cross-sectional detailed view of another example configuration wherein the first belt is provided with panel layers wherein one panel layer is folded over another panel layer.

FIG. 4A is perspective view of a diaper pant including frangible pathways in a front belt.

FIG. 4B is a perspective view of the diaper pant of FIG. 4A showing the front belt having been torn along one of the frangible pathways.

FIG. 5A is perspective view of a diaper pant including frangible pathways in a front belt and adjacent an absorbent chassis.

FIG. 5B is a perspective view of the diaper pant of FIG. 5A showing the front belt having been torn along one of the frangible pathways.

FIG. 5D shows the diaper pant of FIG. 5C being rolled up onto itself in a longitudinal direction.

FIG. 5E shows the diaper pant of FIG. 5D with fastener components connected with the backsheet of the chassis to maintain the diaper pant in a disposal configuration.

FIG. 6B is a view of a continuous length of chassis assemblies from FIG. 6 taken along line B-B.

FIG. 6C1 is a view of a discrete chassis from FIG. 6 taken along line C1-C1.

FIG. 6C2 is a view of a discrete chassis from FIG. 6 taken along line C2-C2.

FIG. 6D1 is a view of multiple discrete chassis spaced from each other along the machine direction MD and connected with each other by the first and second elastic belt laminates from FIG. 6 taken along line D1-D1 and showing outer edges of the first and second elastic belt laminates being folded.

FIG. 6D2 is a view of multiple discrete chassis spaced from each other along the machine direction MD and connected with each other by the first and second elastic belt laminates from FIG. 6 taken along line D2-D2 and showing outer edges of the first and second elastic belt laminates being folded.

FIG. 6E is a view of folded multiple discrete chassis with the first and second elastic belt laminates in a facing relationship from FIG. 6 taken along line E-E.

FIG. 6F is a view of two discrete absorbent articles advancing the machine direction MD from FIG. 6 taken along line F-F.

FIG. 11C is a side view of the elastic laminate of FIG. 11B after side seaming operations.

FIG. 11D is a side view of the elastic laminate of FIG. 11B after final knife cutting operations.

FIG. 14D1 is a side view of the elastic laminate of FIG. 14C after waist edge folding operations.

FIG. 14D2 is a side view of the elastic laminate of FIG. 14C after waist edge folding operations.

FIG. 15A is a detailed partial view of another configuration of a frangible pathway in an elastic laminate showing details of lines of weakness.

FIG. 17A is a side view of third configurations of frangible pathways on the elastic laminate of FIG. 14A.

FIG. 17B is a detailed view of another configuration of a fastener component and frangible pathways.

FIG. 17D1 is a side view of fifth configurations of frangible pathways on the elastic laminate of FIG. 14A.

FIG. 17D2 is a detailed view of a region of the frangible pathways on the elastic laminate of FIG. 14D1.

FIG. 18B shows a front plan view of the diaper pant of FIG. 18A.

FIG. 18D1 is a detailed view of a fastening component from FIG. 18B.

FIG. 18D2 is a detailed view of another fastening component configuration.

FIGS. 20A-20F show an example of a progression of the tear along a frangible pathway.

DETAILED DESCRIPTION OF THE INVENTION

Definitions

Figure 1:
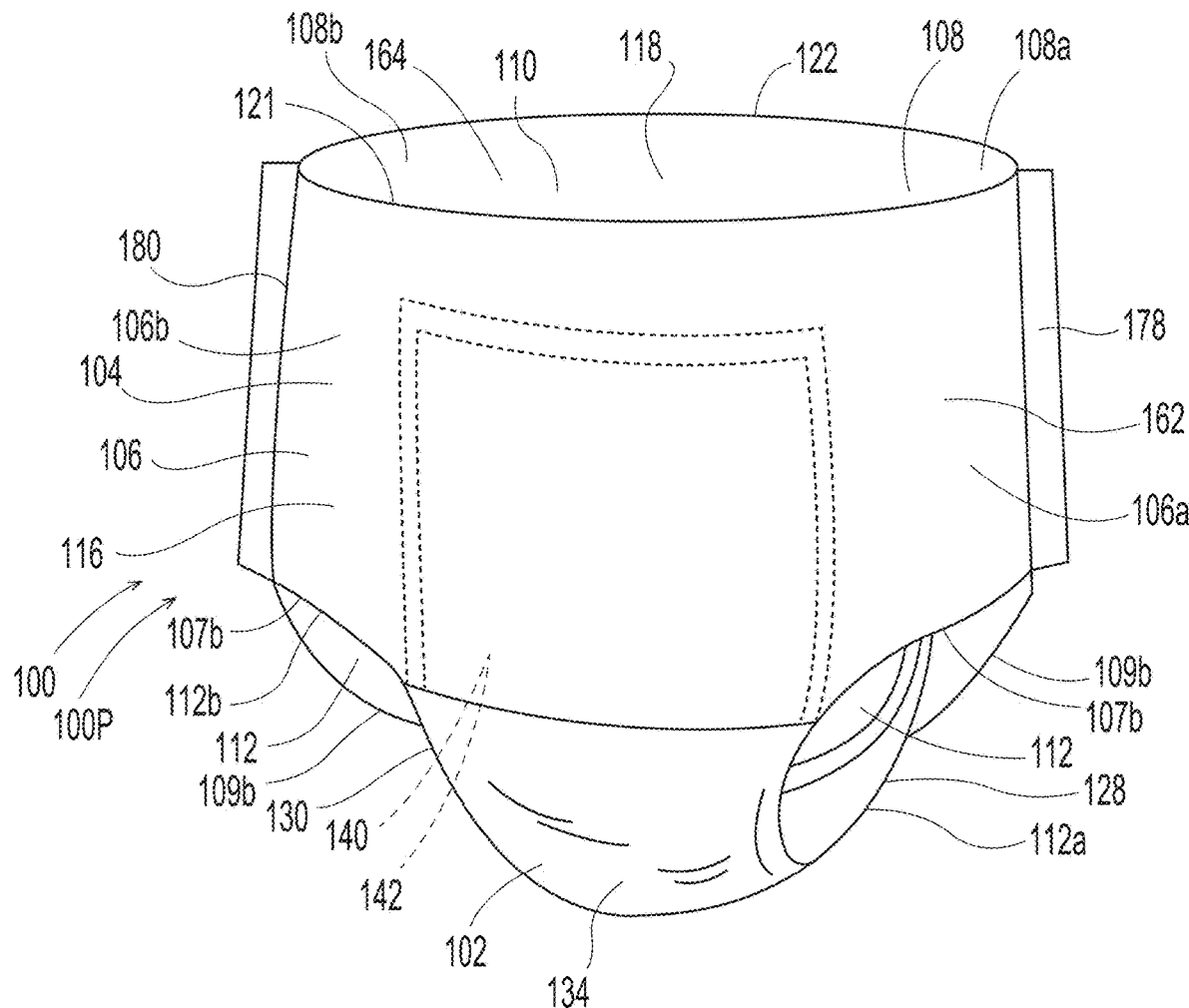
FIG. 1 shows a perspective view of a diaper pant in a pre-fastened configuration.

The following term explanations may be useful in understanding the present disclosure:

"Absorbent article" refers to devices, which absorb and contain body exudates and, more specifically, refers to devices, which are placed against or in proximity to the body of the wearer to absorb and contain the various exudates discharged from the body. Exemplary absorbent articles include diapers, training pants, pull-on pant-type diapers (i.e., a diaper having a preformed waist opening and leg openings such as illustrated in U.S. Pat. No. 6,120,487), refastenable diapers or pant-type diapers, incontinence briefs and undergarments, diaper holders and liners, feminine hygiene garments such as panty liners, absorbent inserts, menstrual pads and the like.

"Body-facing" and "garment-facing" refer respectively to the relative location of an element or a surface of an element or group of elements. "Body-facing" implies the element or surface is nearer to the wearer during wear than some other element or surface. "Garment-facing" implies the element or surface is more remote from the wearer during wear than some other element or surface (i.e., element or surface is proximate to the wearer's garments that may be worn over the disposable absorbent article).

The terms "elastic," "elastomer" or "elastomeric" refers to materials exhibiting elastic properties, which include any material that upon application of a force to its relaxed, initial length can stretch or elongate to an elongated length more than 10% greater than its initial length and will substantially recover back to about its initial length upon release of the applied force. Elastomeric materials may include elastomeric films, scrims, nonwovens, ribbons, strands and other sheet-like structures.

As used herein, the term "joined" encompasses configurations whereby an element is directly secured to another element by affixing the element directly to the other element, and configurations whereby an element is indirectly secured to another element by affixing the element to intermediate member(s) which in turn are affixed to the other element.

As used herein, the term "distal" is used to describe a position situated away from a center of a body or from a point of attachment, and the term "proximal" is used to describe a position situated nearer to a center of a body or a point of attachment.

The term "substrate" is used herein to describe a material which is primarily two-dimensional (i.e., in an XY plane) and whose thickness (in a Z direction) is relatively small (i.e., 1/10 or less) in comparison to its length (in an X direction) and width (in a Y direction). Non-limiting examples of substrates include a web, layer or layers or fibrous materials, nonwovens, films and foils such as polymeric films or metallic foils. These materials may be used alone or may comprise two or more layers laminated together. As such, a web is a substrate.

The term "nonwoven" refers herein to a material made from continuous (long) filaments (fibers) and/or discontinuous (short) filaments (fibers) by processes such as spunbonding, meltblowing, carding, and the like. Nonwovens do not have a woven or knitted filament pattern.

The term "machine direction" (MD) is used herein to refer to the direction of material flow through a process. In addition, relative placement and movement of material can be described as flowing in the machine direction through a process from upstream in the process to downstream in the process.

The term "cross direction" (CD) is used herein to refer to a direction that is generally perpendicular to the machine direction.

"Pre-strain" refers to the strain imposed on an elastic or elastomeric material prior to combining it with another element of the elastomeric laminate or the absorbent article. Pre-strain is determined by the following equation Pre-strain=((extended length of the elastic-relaxed length of the elastic)/relaxed length of the elastic)*100.

"Decitex" also known as Dtex is a measurement used in the textile industry used for measuring yarns or filaments. 1 Decitex=1 gram per 10,000 meters. In other words, if 10,000 linear meters of a yarn or filament weights 500 grams that yarn or filament would have a decitex of 500.

The term "taped diaper" (also referred to as "open diaper") refers to disposable absorbent articles having an initial front waist region and an initial back waist region that are not fastened, pre-fastened, or connected to each other as packaged, prior to being applied to the wearer. A taped diaper may be folded about the lateral centerline with the interior of one waist region in surface to surface contact with the interior of the opposing waist region without fastening or joining the waist regions together. Example taped diapers are disclosed in various suitable configurations U.S. Pat. Nos. 5,167,897, 5,360,420, 5,599,335, 5,643,588, 5,674,216, 5,702,551, 5,968,025, 6,107,537, 6,118,041, 6,153,209, 6,410,129, 6,426,444, 6,586,652, 6,627,787, 6,617,016, 6,825,393, and 6,861,571; and U.S. Patent Publication Nos. 2013/0072887 A1; 2013/0211356 A1; and 2013/0306226 A1, all of which are incorporated by reference herein.

The term "pant" (also referred to as "training pant", "pre-closed diaper", "diaper pant", "pant diaper", and "pull-on diaper") refers herein to disposable absorbent articles having a continuous perimeter waist opening and continuous perimeter leg openings designed for infant or adult wearers. A pant can be configured with a continuous or closed waist opening and at least one continuous, closed, leg opening prior to the article being applied to the wearer. A pant can be preformed or pre-fastened by various techniques including, but not limited to, joining together portions of the article using any refastenable and/or permanent closure member (e.g., seams, heat bonds, pressure welds, adhesives, cohesive bonds, mechanical fasteners, etc.). A pant can be preformed anywhere along the circumference of the article in the waist region (e.g., side fastened or seamed, front waist fastened or seamed, back waist fastened or seamed). Example diaper pants in various configurations are disclosed in U.S. Pat. Nos. 4,940,464; 5,092,861; 5,246,433; 5,569,234; 5,897, 545; 5,957,908; 6,120,487; 6,120,489; 7,569,039 and U.S. Patent Publication Nos. 2003/0233082 A1; 2005/0107764 A1, 2012/0061016 A1, 2012/0061015 A1; 2013/0255861 A1; 2013/0255862 A1; 2013/0255863 A1; 2013/0255864 A1; and 2013/0255865 A1, all of which are incorporated by reference herein.

"Closed-form" means opposing waist regions are joined, as packaged, either permanently or refastenably to form a continuous waist opening and leg openings.

"Open-form" means opposing waist regions are not initially joined to form a continuous waist opening and leg openings but comprise a closure means such as a fastening system to join the waist regions to form the waist and leg openings before or during application to a wearer of the article.

The present disclosure relates to absorbent articles including elastic laminates, and more particularly, to methods and apparatuses for making absorbent articles having elastic laminates in front and/or back waist regions with frangible pathways. In a method for making an absorbent article, a first elastic laminate and a second elastic laminate may be assembled and converted into first and second elastic belts on an assembled absorbent article. The first and second elastic laminates may comprise elastic strands positioned between and connected with a first substrate and a second substrate, wherein the elastic strands extend in a machine direction. The first and second elastic laminates further comprise a first edge separated from a second edge in a cross direction. The first and second elastic laminates are advanced in the machine direction, and a frangible pathway extending in the cross direction between the first edge and the second edge may be formed in the first elastic laminate and/or the second elastic laminate. Such frangible pathways provide a feature that allows an elastic belt of a diaper pant to be relatively easily torn along the frangible pathway when removing the diaper pant from a wearer, avoiding the need to remove the diaper pant by sliding the diaper pant over a wearer's legs.

The frangible pathway comprises a plurality of lines of weakness positioned, oriented, and/or configured such that all elastic strands extending through the frangible pathways are severed, so as to help ensure that an elastic belt can be torn along the frangible pathway without having to also break elastic strands in the process. In some configurations, all elastic strands extending through the frangible pathway are cut at the lines of weakness such that a first plurality of the elastic strands are cut only once and such that a second plurality of the elastic strands are cut more than once. In some configurations, some elastic strands may remain intact to strengthen a particular portion of the frangible pathway. In some configurations, an elastic laminate may be advanced in the machine direction through a cutting device adapted to form the lines of weakness that define the frangible pathway and to cut elastic strands extending through the frangible pathway. It is to be appreciated that the cutting device may be configured to create various forms of lines of weakness. For example, the cutting device may be configured to cut through the first substrate and the second substrate such that the lines of weakness comprise discrete cut lines. In another example, the cutting device may pressure bond the first substrate and the second substrate together without cutting through the first and second substrates such that the lines of weakness comprise discrete bonds wherein materials of the first substrate and the second substrate are fused together. In addition, the cutting device may be configured to form more than one frangible pathway in an elastic laminate and may also be configured to perform additional cutting operations, such as a final knife cutting operations or tummy elastic cutting operations. In some configurations, the cutting device may be configured to form one or more frangible pathways in an elastic laminate and may also be configured to perform die cutting operations, such as leg hole forming operations. In some configurations, the cutting device may be configured as a stand alone process that forms one or more frangible pathways in an elastic laminate that is separate process from other cutting operations, such as tummy cutting, final knife cutting, and/or die cutting operations. In some configurations, each line of weakness may be oriented to define an offset angle relative to the machine direction that is less than 90 degrees. In turn, the offset angles of the lines of weakness help to prevent the lines of weakness from opening when forces are applied to the respective first and second substrates during assembly operations and/or during use of the assembled article.

Figure 2A:
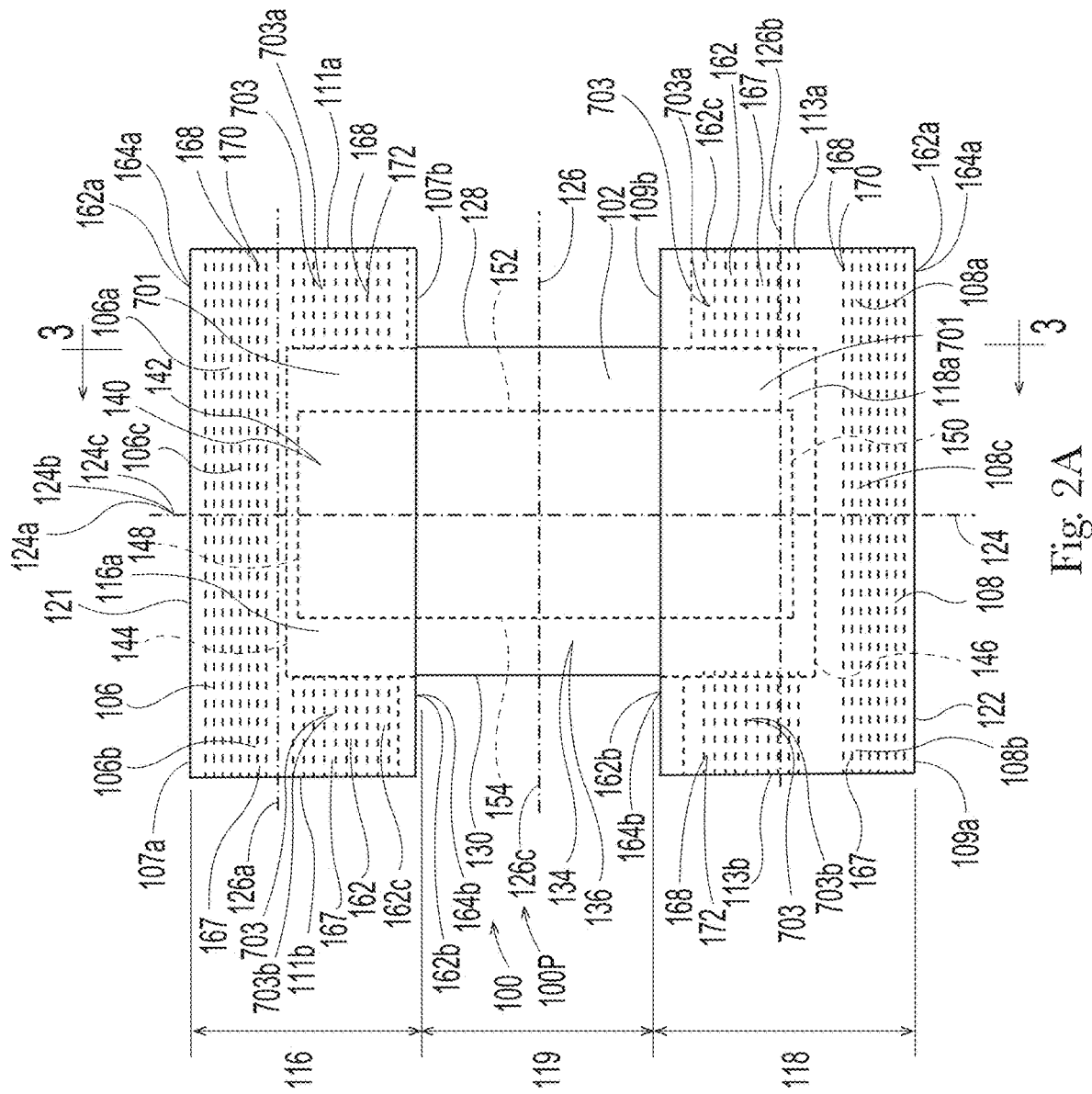
FIG. 2A shows a plan view of a diaper pant with the portion of the diaper that faces away from a wearer oriented toward the viewer.

FIGS. 1-2B show an example of an absorbent article 100 in the form of a diaper pant 100P that may include components constructed from elastic laminates assembled in accordance with the configurations disclosed herein. In particular, FIG. 1 shows a perspective views of a diaper pant 100P in a pre-fastened configuration. FIG. 2A shows a plan view of the diaper pant 100P with the portion of the diaper that faces away from a wearer oriented toward the viewer, and FIG. 2B shows a plan view of the diaper pant 100P with the portion of the diaper that faces toward a wearer oriented toward the viewer. The diaper pant 100P includes a chassis 102 and a ring-like elastic belt 104. As discussed below in more detail, a first elastic belt 106 and a second elastic belt 108 are bonded together to form the ring-like elastic belt 104.

With continued reference to FIGS. 1-2B, the diaper pant 100P and the chassis 102 each include a first waist region 116, a second waist region 118, and a crotch region 119 disposed intermediate the first and second waist regions. It may also be described that the chassis 102 includes a first end region 116a, a second end region 118a, and a crotch region 119 disposed intermediate the first and second end regions 116a, 118a. The first waist region 116 may be configured as a front waist region, and the second waist region 118 may be configured as back waist region. The diaper 100P may also include a laterally extending front waist edge 121 in the front waist region 116 and a longitudinally opposing and laterally extending back waist edge 122 in the back waist region 118. To provide a frame of reference for the present discussion, the diaper 100P and chassis 102 of FIGS. 2A and 2B are shown with a longitudinal axis 124 and a lateral axis 126. In some embodiments, the longitudinal axis 124 may extend through the front waist edge 121 and through the back waist edge 122. And the lateral axis 126 may extend through a first longitudinal or right side edge 128 and through a second longitudinal or left side edge 130 of the chassis 102. As previously mentioned, the longitudinal axis 124 extends perpendicularly through the front waist edge 121 and the back waist edge 122, and the lateral axis 126 extends perpendicularly to the longitudinal axis 124. To provide a further frame of reference for the present discussion, the diapers 100P of FIGS. 2A, 2B, and 18B are shown wherein: the first elastic belt 106 comprises a longitudinal centerline 124a and lateral centerline 126a; the second elastic belt 108 comprises a longitudinal centerline 124b and lateral centerline 126b; and the chassis 102 comprises a longitudinal centerline 124c and lateral centerline 126c. The longitudinal centerlines 124a, 124b, 124c are perpendicular to the lateral center lines 126a, 126b, 126c.

As shown in FIGS. 1-2B, the diaper pant 100P may include an inner, body facing surface 132, and an outer, garment facing surface 134. The chassis 102 may include a backsheet 136 and a topsheet 138. The chassis 102 may also include an absorbent assembly 140, including an absorbent core 142, disposed between a portion of the topsheet 138 and the backsheet 136. As discussed in more detail below, the diaper 100P may also include other features, such as leg elastics and/or leg cuffs to enhance the fit around the legs of the wearer.

As shown in FIG. 2A, the periphery of the chassis 102 may be defined by the first longitudinal side edge 128, a second longitudinal side edge 130, a first laterally extending end edge 144 disposed in the first waist region 116, and a second laterally extending end edge 146 disposed in the second waist region 118. Both side edges 128 and 130 extend longitudinally between the first end edge 144 and the second end edge 146. As shown in FIG. 2A, the laterally extending end edges 144 and 146 may be located longitudinally inward from the laterally extending front waist edge 121 in the front waist region 116 and the laterally extending back waist edge 122 in the back waist region 118. In some configurations, the laterally extending end edges 144 and 146 may be coterminous with or located longitudinally outward from the laterally extending front waist edge 121 in the front waist region 116 and the laterally extending back waist edge 122 in the back waist region 118. When the diaper pant 100P is worn on the lower torso of a wearer, the front waist edge 121 and the back waist edge 122 may encircle a portion of the waist of the wearer. At the same time, the side edges 128 and 130 may encircle at least a portion of the legs of the wearer. And the crotch region 119 may be generally positioned between the legs of the wearer with the absorbent core 142 extending from the front waist region 116 through the crotch region 119 to the back waist region 118.

As previously mentioned, the diaper pant 100P may include a backsheet 136. The backsheet 136 may also define the outer, garment facing surface 134 of the chassis 102. The backsheet 136 may also comprise a woven or nonwoven material, polymeric films such as thermoplastic films of polyethylene or polypropylene, and/or a multi-layer or composite materials comprising a film and a nonwoven material. The backsheet may also comprise an elastomeric film. An example backsheet 136 may be a polyethylene film having a thickness of from about 0.012 mm (0.5 mils) to about 0.051 mm (2.0 mils). Further, the backsheet 136 may permit vapors to escape from the absorbent core (i.e., the backsheet is breathable) while still preventing exudates from passing through the backsheet 136.

Also described above, the diaper pant 100P may include a topsheet 138. The topsheet 138 may also define all or part of the inner, wearer facing surface 132 of the chassis 102. The topsheet 138 may be liquid pervious, permitting liquids (e.g., menses, urine, and/or runny feces) to penetrate through its thickness. A topsheet 138 may be manufactured from a wide range of materials such as woven and nonwoven materials; apertured or hydroformed thermoplastic films; apertured nonwovens, porous foams; reticulated foams; reticulated thermoplastic films; and thermoplastic scrims. Woven and nonwoven materials may comprise natural fibers such as wood or cotton fibers; synthetic fibers such as polyester, polypropylene, or polyethylene fibers; or combinations thereof. If the topsheet 138 includes fibers, the fibers may be spunbond, carded, wet-laid, meltblown, hydroentangled, or otherwise processed as is known in the art. Topsheets 138 may be selected from high loft nonwoven topsheets, apertured film topsheets and apertured nonwoven topsheets. Exemplary apertured films may include those described in U.S. Pat. Nos. 5,628,097; 5,916,661; 6,545,197; and 6,107,539, all of which are incorporated by reference herein.

As mentioned above, the diaper pant 100P may also include an absorbent assembly 140 that is joined to the chassis 102. As shown in FIG. 2A, the absorbent assembly 140 may have a laterally extending front edge 148 in the front waist region 116 and may have a longitudinally opposing and laterally extending back edge 150 in the back waist region 118. The absorbent assembly may have a longitudinally extending right side edge 152 and may have a laterally opposing and longitudinally extending left side edge 154, both absorbent assembly side edges 152 and 154 may extend longitudinally between the front edge 148 and the back edge 150. The absorbent assembly 140 may additionally include one or more absorbent cores 142 or absorbent core layers. The absorbent core 142 may be at least partially disposed between the topsheet 138 and the backsheet 136 and may be formed in various sizes and shapes that are compatible with the diaper. Exemplary absorbent structures for use as the absorbent core of the present disclosure are described in U.S. Pat. Nos. 4,610,678; 4,673,402; 4,888,231; and 4,834,735, all of which are incorporated by reference herein.

Some absorbent core embodiments may comprise fluid storage cores that contain reduced amounts of cellulosic airfelt material. For instance, such cores may comprise less than about 40%, 30%, 20%, 10%, 5%, or even 1% of cellulosic airfelt material. Such a core may comprise primarily absorbent gelling material in amounts of at least about 60%, 70%, 80%, 85%, 90%, 95%, or even about 100%, where the remainder of the core comprises a microfiber glue (if applicable). Such cores, microfiber glues, and absorbent gelling materials are described in U.S. Pat. Nos. 5,599,335; 5,562,646; 5,669,894; and 6,790,798 as well as U.S. Patent Publication Nos. 2004/0158212 A1 and 2004/0097895 A1, all of which are incorporated by reference herein.

As previously mentioned, the diaper 100P may also include elasticized leg cuffs 156. It is to be appreciated that the leg cuffs 156 can be and are sometimes also referred to as leg bands, side flaps, barrier cuffs, elastic cuffs or gasketing cuffs. The elasticized leg cuffs 156 may be configured in various ways to help reduce the leakage of body exudates in the leg regions. Example leg cuffs 156 may include those described in U.S. Pat. Nos. 3,860,003; 4,909,803; 4,695,278; 4,795,454; 4,704,115; 4,909,803; and U.S. Patent Publication No. 2009/0312730 A1, all of which are incorporated by reference herein.

As mentioned above, diaper pants may be manufactured with a ring-like elastic belt 104 and provided to consumers in a configuration wherein the front waist region 116 and the back waist region 118 are connected to each other as packaged, prior to being applied to the wearer. As such, diaper pants may have a continuous perimeter waist opening 110 and continuous perimeter leg openings 112 such as shown in FIG. 1. The ring-like elastic belt may be formed by joining a first elastic belt to a second elastic belt with a permanent side seam or with an openable and reclosable fastening system disposed at or adjacent the laterally opposing sides of the belts.

As previously mentioned, the ring-like elastic belt 104 may be defined by a first elastic belt 106 connected with a second elastic belt 108. As shown in FIGS. 2A and 2B, the first elastic belt 106 extends between a first longitudinal side edge 111a and a second longitudinal side edge 111b and defines first and second opposing end regions 106a, 106b and a central region 106c. And the second elastic 108 belt extends between a first longitudinal side edge 113a and a second longitudinal side edge 113b and defines first and second opposing end regions 108a, 108b and a central region 108c. The distance between the first longitudinal side edge 111a and the second longitudinal side edge 111b defines the pitch length, PL, of the first elastic belt 106, and the distance between the first longitudinal side edge 113a and the second longitudinal side edge 113b defines the pitch length, PL, of the second elastic belt 108. The central region 106c of the first elastic belt is connected with the first waist region 116 or first end region 116a of the chassis 102, and the central region 108c of the second elastic belt 108 is connected with the second waist region 118 or second end region 118a of the chassis 102. As shown in FIG. 1, the first end region 106a of the first elastic belt 106 is connected with the first end region 108a of the second elastic belt 108 at first side seam 178, and the second end region 106b of the first elastic belt 106 is connected with the second end region 108b of the second elastic belt 108 at second side seam 180 to define the ring-like elastic belt 104 as well as the waist opening 110 and leg openings 112. It is to be appreciated that the first belt 106 and the second belt 108 may be permanently or refastenably connected with each other at the first side seam 178 and the second side seam 180. The side seams 178, 180 may comprise a permanent bond, such as a thermal, pressure, or adhesive bond, or may be a releasable bond, such as a mechanical or cohesive fastener.

As shown in FIGS. 2A and 2B, the first elastic belt 106 also defines an outer laterally extending edge 107a and an inner laterally extending edge 107b, and the second elastic belt 108 defines an outer laterally extending edge 109a and an inner laterally extending edge 109b. As such, as shown in FIG. 1, a perimeter edge 112a of one leg opening may be defined by portions of the inner laterally extending edge 107b of the first elastic belt 106, the inner laterally extending edge 109b of the second elastic belt 108, and the first longitudinal or right side edge 128 of the chassis 102. And a perimeter edge 112b of the other leg opening may be defined by portions of the inner laterally extending edge 107b, the inner laterally extending edge 109b, and the second longitudinal or left side edge 130 of the chassis 102. The outer laterally extending edges 107a, 109a may also define the front waist edge 121 and the laterally extending back waist edge 122 of the diaper pant 100P.

It is to be appreciated that the first elastic belt 106 and the second elastic belt 108 may define different sizes and shapes. In some configurations, the first elastic belt 106 and/or second elastic belt 108 may define curved contours. For example, the inner lateral edges 107b, 109b of the first and/or second elastic belts 106, 108 may include non-linear or curved portions in the first and second opposing end regions. Such curved contours may help define desired shapes to leg opening 112, such as for example, relatively rounded leg openings. In addition to having curved contours, the elastic belts 106, 108 may include elastic strands 168 that extend along non-linear or curved paths that may correspond with the curved contours of the inner lateral edges 107b, 109b.

FIG. 2C shows a configuration wherein the first elastic belt 106 and the second elastic belt 108 both define generally rectangular shapes. For example, as shown in FIG. 2C, the outer laterally extending edge 107a of the first elastic belt 106 may comprise a lateral width of W1D and the inner laterally extending edge 107b may comprise a lateral width of W1P, wherein W1D and W1P are equal or substantially equal. In addition, the outer laterally extending edge 109a of the second elastic belt 108 may comprise a lateral width of W2D and the inner laterally extending edge 109b may comprise a lateral width of W2P, wherein W2D and W2P are equal or substantially equal.

Figure 2D:
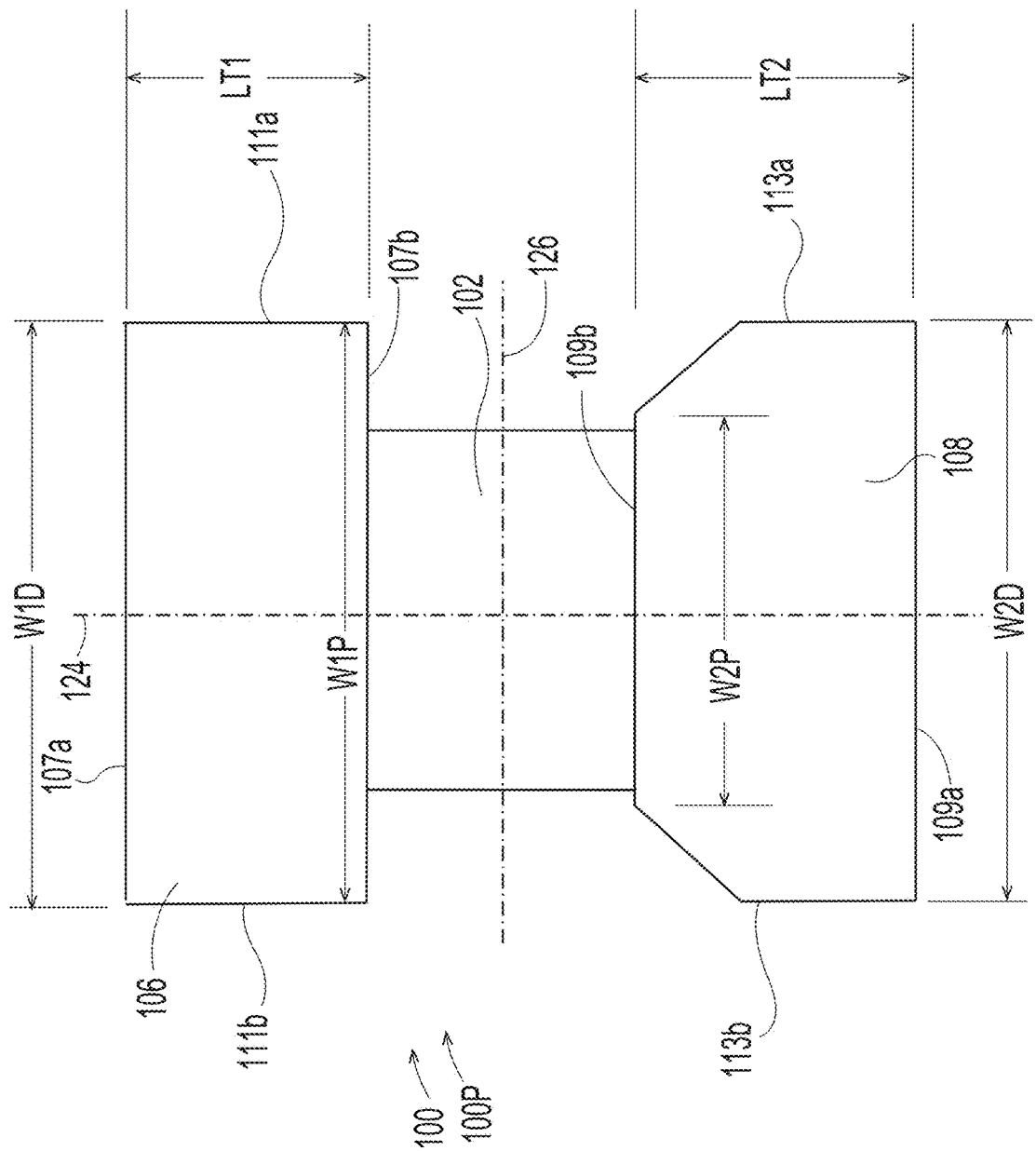
FIG. 2D shows a plan view of a diaper pant with the portion of the diaper that faces away from a wearer oriented toward the viewer, illustrating first and second belt size and shape features.

In some configurations, at least one of the first elastic belt 106 and the second elastic belt 108 may comprise lateral edges having different lengths. For example, FIG. 2D shows a configuration wherein the first elastic belt 106 defines a generally rectangular shape, such as described with reference to FIG. 2C, and wherein the outer laterally extending edge 109a of the second elastic belt 108 and the inner laterally extending edge 109b have different lengths. As shown in FIG. 2D, the outer laterally extending edge 109a of the second elastic belt 108 may comprise a lateral width of W2D and the inner laterally extending edge 109b may comprise a lateral width of W2P, wherein W2D is greater than W2P.

Figure 2E:
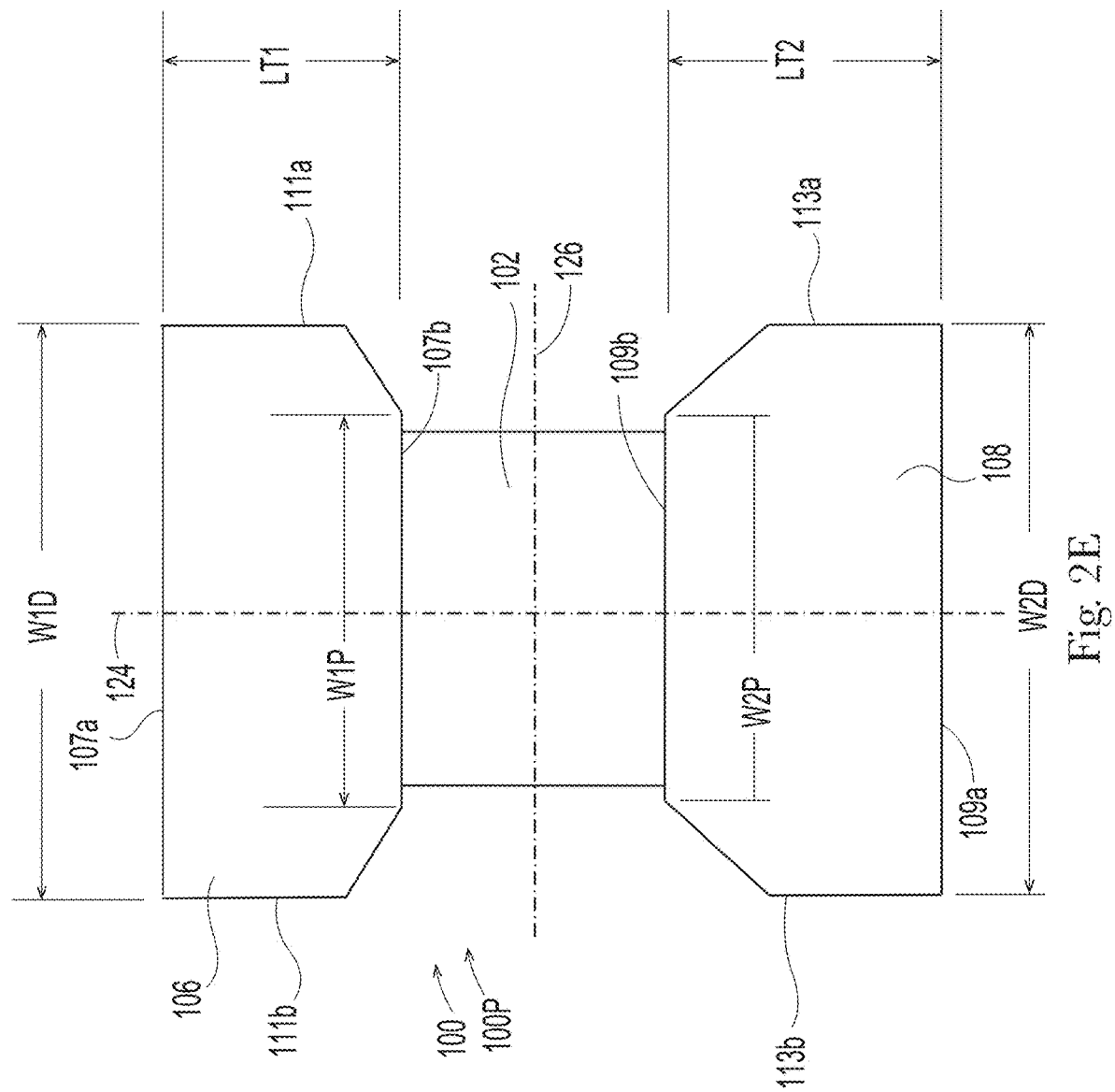
FIG. 2E shows a plan view of a diaper pant with the portion of the diaper that faces away from a wearer oriented toward the viewer, illustrating first and second belt size and shape features.

In some configurations, both the first elastic belt 106 and the second elastic belt 108 may comprise lateral edges having different lengths. For example, FIG. 2E shows a configuration wherein the outer laterally extending edge 107a of the first elastic belt 106 and the inner laterally extending edge 107b have different lengths, and wherein the outer laterally extending edge 109a of the second elastic belt 108 and the inner laterally extending edge 109b have different lengths. As shown in FIG. 2E, the outer laterally extending edge 107a of the first elastic belt 107 may comprise a lateral width of W1D and the inner laterally extending edge 107b may comprise a lateral width of W1P, wherein W1D is greater than W1P, and wherein the outer laterally extending edge 109a of the second elastic belt 108 may comprise a lateral width of W2D and the inner laterally extending edge 109b may comprise a lateral width of W2P, wherein W2D is greater than W2P.

With reference to FIGS. 2C-2E, the first elastic belt 106 may define a longitudinal length LT1 extending between outer laterally extending edge 107a and the inner laterally extending edge 107b, and the second elastic belt 108 may define a longitudinal length LT2 extending between outer laterally extending edge 109a and the inner laterally extending edge 109b. In some configurations, LT1 may be equal to LT2. In some configurations, LT1 may be less or greater than LT2. With continued reference to FIGS. 2C-2E, in some configurations, W1D may be equal to W1P, or W1D may be different than W1P. In some configurations, W2D may be equal to W2P, or W2D may be different than W2P. In some configurations, W1D and/or W1P may be equal to or different W2D and/or W2P.

Figure 3:
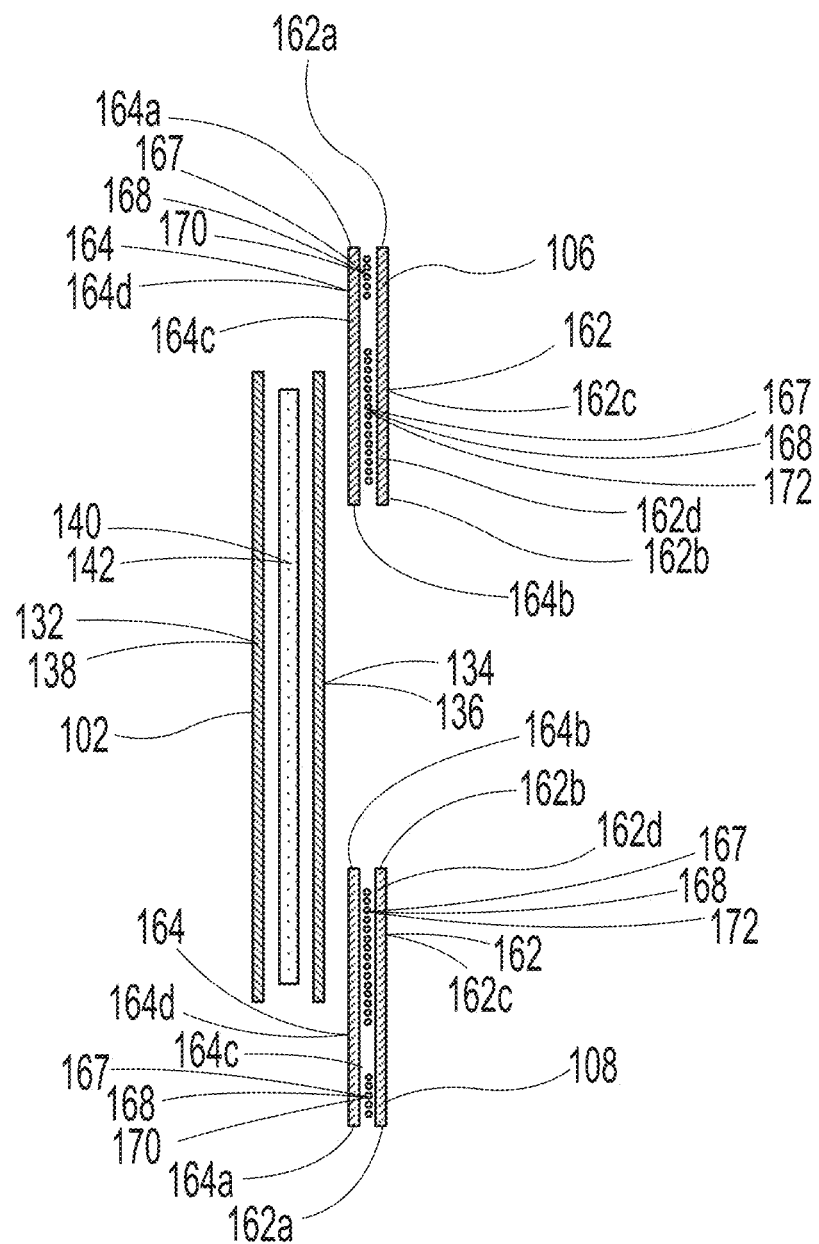
FIG. 3 is a cross-sectional view of the diaper pant of FIG. 2A taken along line 3-3 showing first and second elastic belts provided with panel layers.

With reference to FIGS. 2A, 2B, and 3, the first elastic belt 106 and the second elastic belt 108 may also each include a first substrate 162 and a second substrate 164. The first substrates 162 may be oriented to define at least a portion of the garment facing surfaces of the first elastic belt 106 and the second elastic belt 108, and the second substrates 164 may be oriented to define at least a portion of the wearer facing surfaces of the first elastic belt 106 and the second elastic belt 108. The first substrate 162 may extend from a proximal edge 162b to a distal edge 162a for a maximum length L1, and the second substrate 164 may extend from a proximal edge 164b to a distal edge 164a for a maximum length L2. It is to be appreciated that the distal edge 162a and/or the proximal edge 162b of the first substrate 162 may be straight and/or curved and/or may be parallel or unparallel to each other. It is also to be appreciated that the distal edge 164a and/or the proximal edge 164b of the second substrate 164 may be straight and/or curved and/or may be parallel or unparallel to each other. As such, the maximum length L1 refers to the longest distance extending longitudinally between the distal edge 162a and the proximal edge 162b of the first substrate 162, and the maximum length L2 refers to the longest distance extending longitudinally between the distal edge 164a and the proximal edge 164b of the second substrate 164. In some configurations, L1 may be equal to, less than, or greater than L2. In some configurations, L1 may be equal to or less than LT1, and L2 may be equal to or less than LT2. In some configurations, the distal edge 162a of the first substrate 162 may define at least a portion of the front waist edge 121 and/or at least a portion of back waist edge 122, and/or the distal edge 164a of the second substrate 164 may define at least a portion of the front waist edge 121 and/or at least a portion of back waist edge 122. As such, in some configurations, the distal edge 162a of the first substrate 162 and/or the distal edge 164a of the second substrate 164 may define at least a portion of the waist opening 110.

Figure 1A:
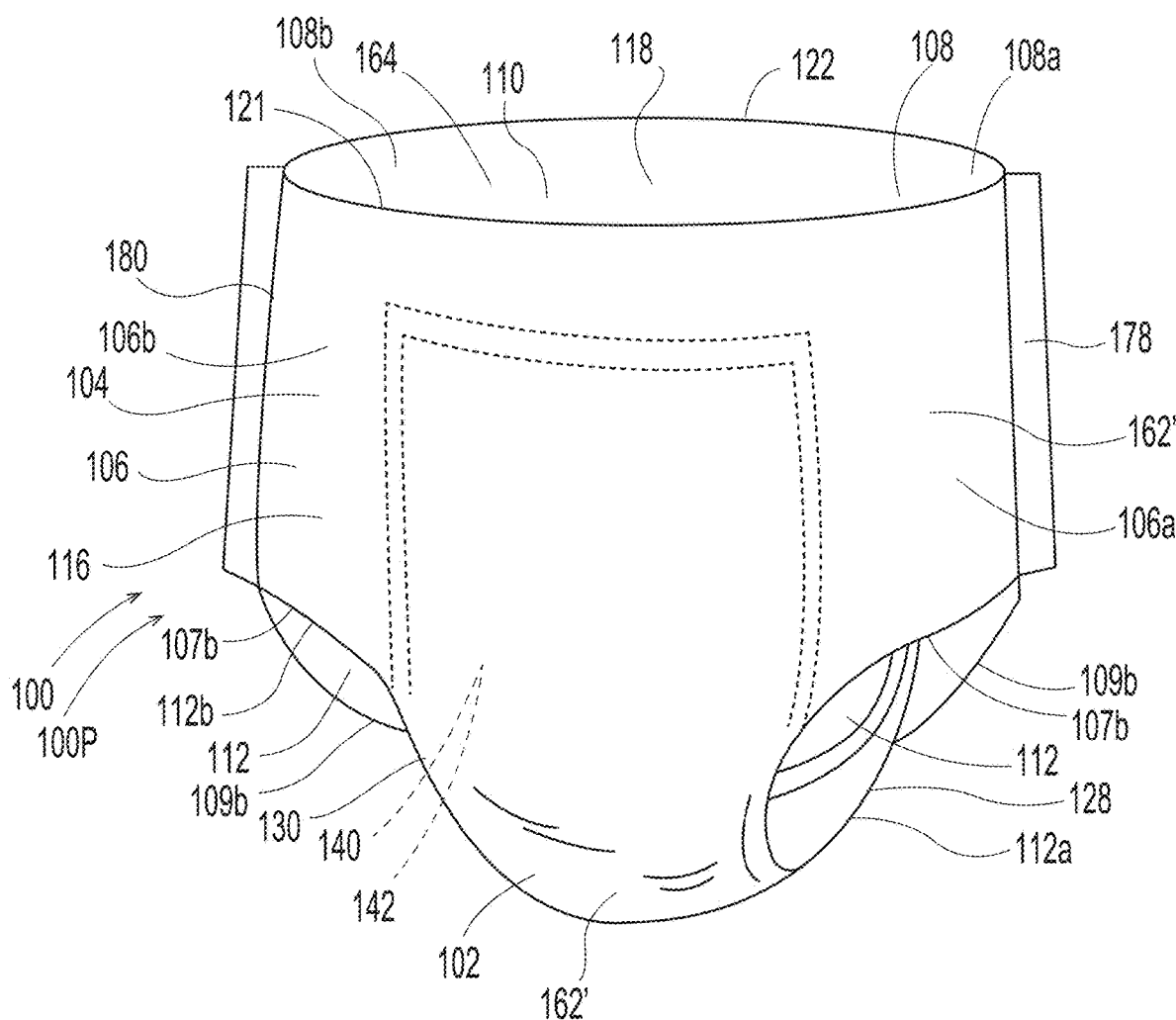
FIG. 1A shows a perspective view of a diaper pant with a continuous outer cover in a pre-fastened configuration.
Figure 2F:
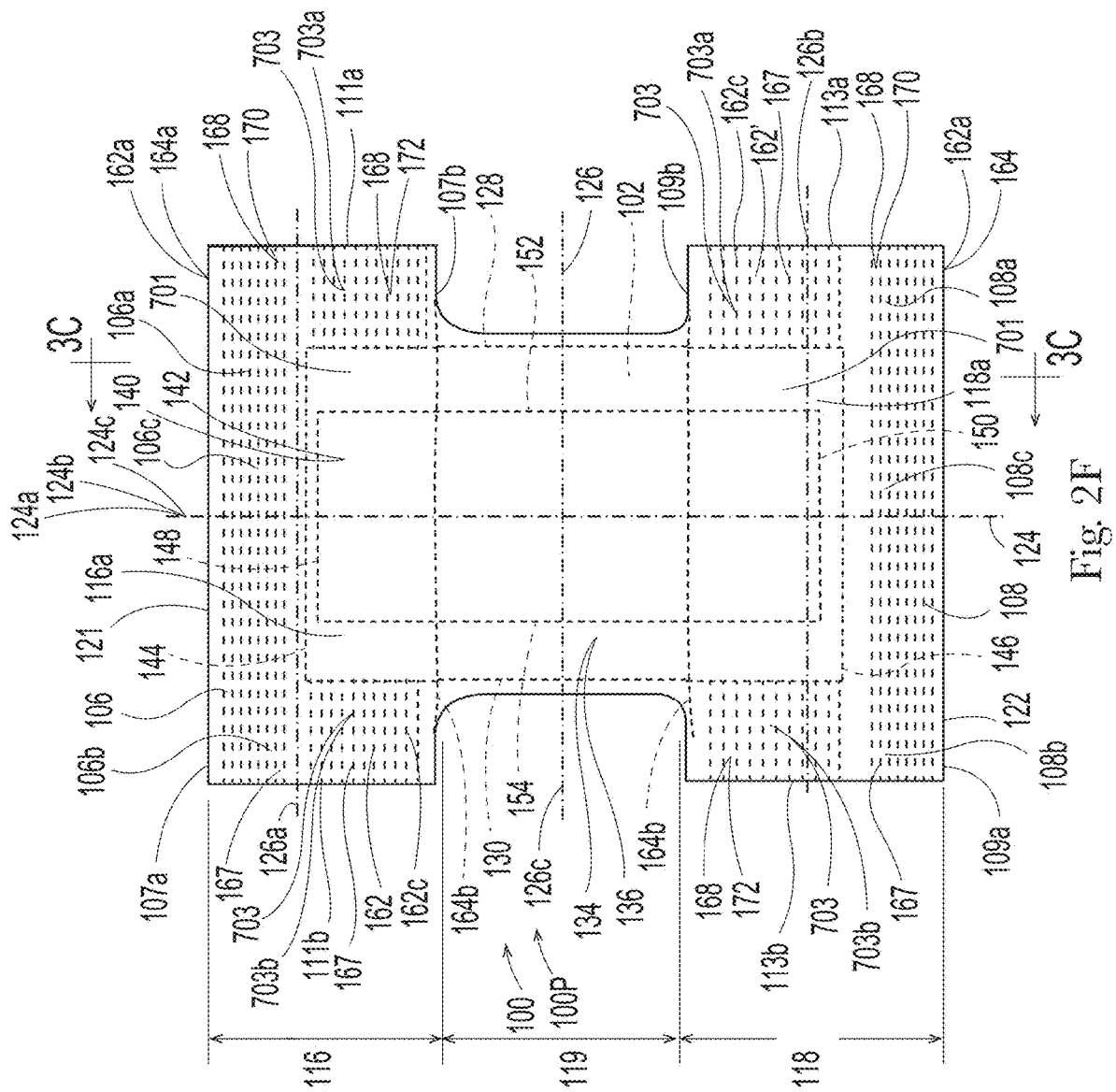
FIG. 2F shows a plan view of a diaper pant with a continuous outer cover with the portion of the diaper that faces away from a wearer oriented toward the viewer.
Figure 3A:
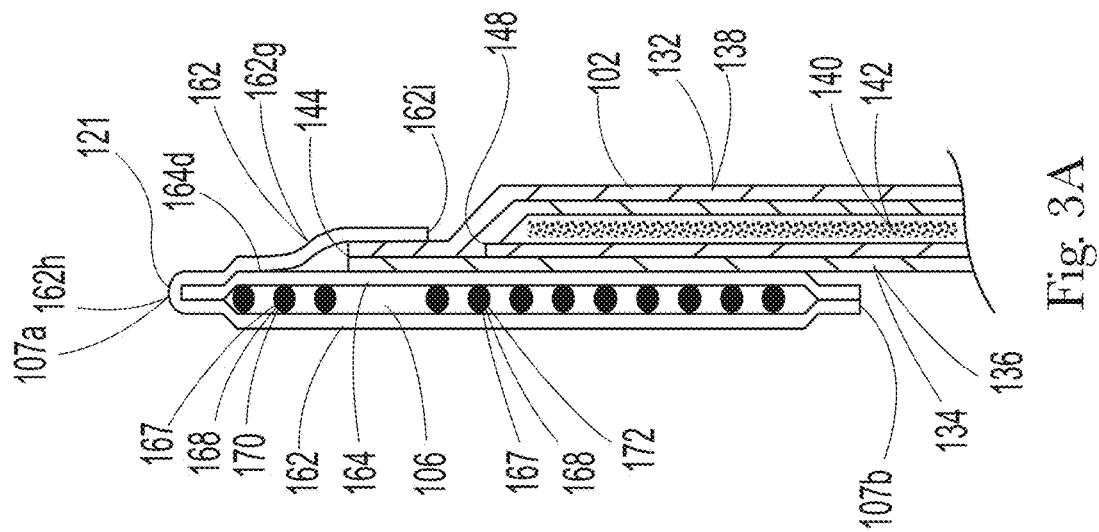
FIG. 3A is a cross-sectional detailed view of a first belt provided with panel layers wherein one panel layer is folded over another panel layer.
Figure 3B:
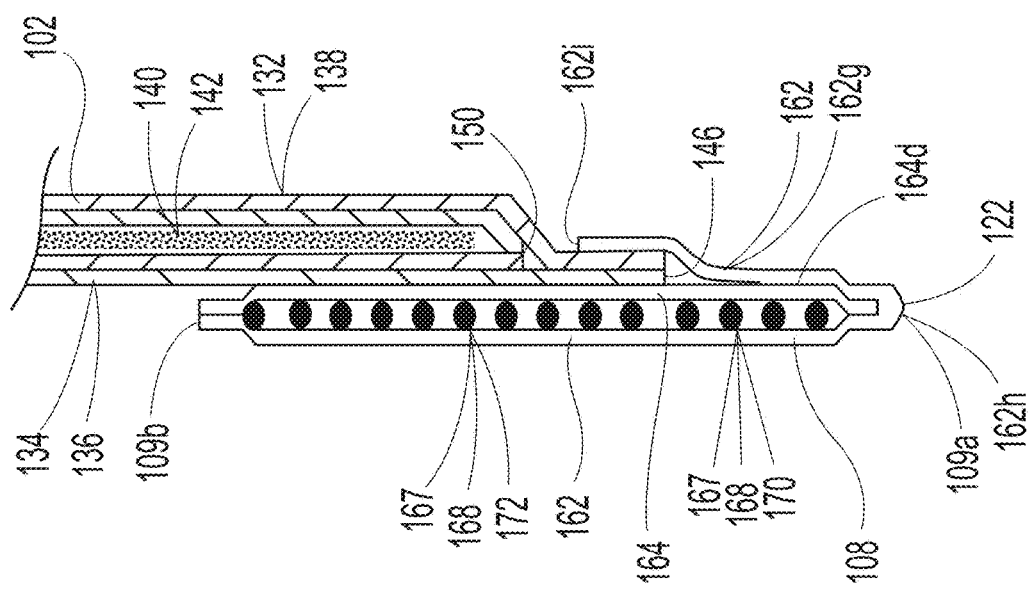
FIG. 3B is a cross-sectional detailed view of a second belt provided with panel layers wherein one panel layer is folded over another panel layer.
Figure 3C:
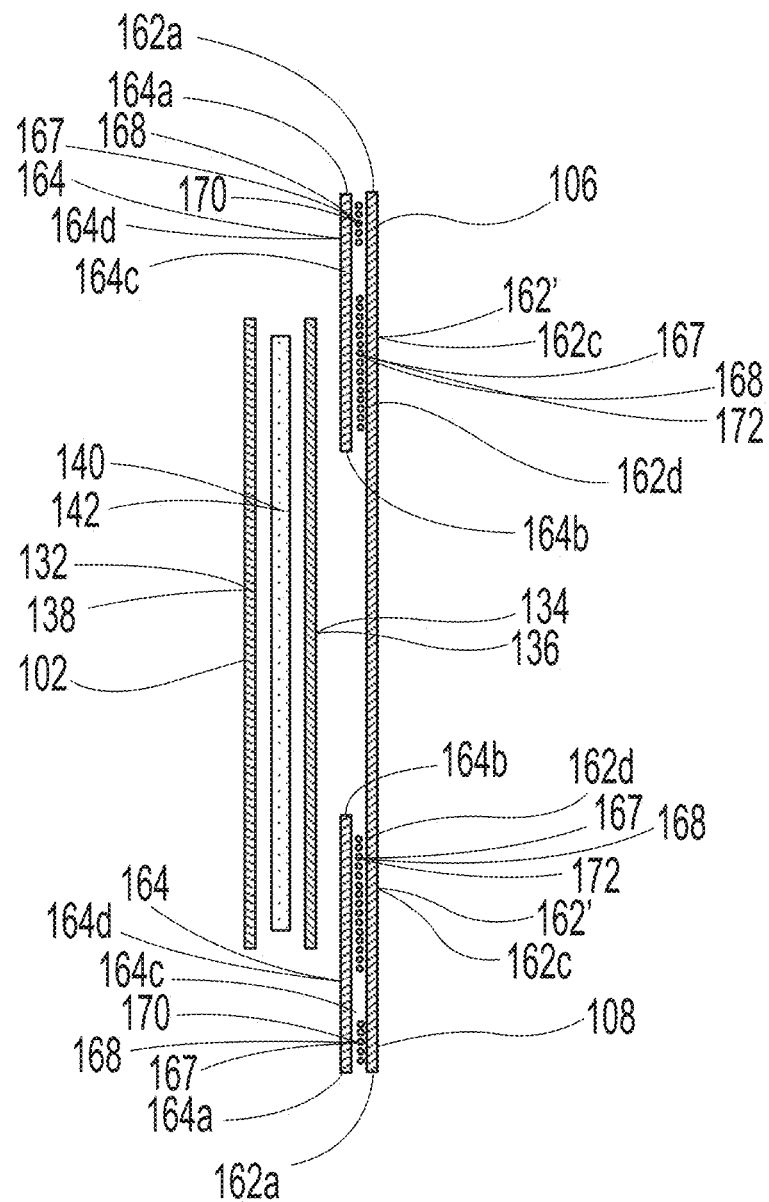
FIG. 3C is a cross-sectional view of the diaper pant of FIG. 2F taken along line 3C-3C showing first and second elastic belts provided with panel layers and a continuous outer cover.

It is also to be appreciated that the first substrate 162 and/or the second substrate 164 may extend continuously from the first belt 106 to the second belt 108. For example, the first substrate 162 may be configured to define a continuous outer cover 162' that extends contiguously from the first waist edge 121 to the second waist edge 122, such as shown in FIGS. 1A, 2F, and 3C. It is also to be appreciated that diaper pants 100P with continuous outer covers, such as shown in Figures 1A, 2F, and 3C may also be configured to include various aspects of the frangible pathways and fastener components discussed herein.

It is to be appreciated that the first substrate 162 and the second substrate 164 may define various lateral widths that may or may not be equal. For example, as shown in FIG. 2B, the first substrate 162 may extend laterally between a first longitudinal edge 162e and a second longitudinal edge 162f to define a first lateral width W1, and the second substrate 164 may extend laterally between a first longitudinal edge 164e and a second longitudinal edge 164f to define a second lateral width W2.

In some configurations, the proximal edge 162b of the first substrate 162 and/or the proximal edge 164b of the second substrate 164 may extend laterally across the backsheet 134. As shown in FIGS. 2A-3, the first substrate 162 includes a garment facing surface 162c and an opposing wearer facing surface 162d, and the second substrate 164 includes a garment facing surface 164c and an opposing wearer facing surface 164d.

In some configurations, the first elastic belt 106 and/or the second elastic belt 108 may include a folded portion of at least the first substrate 162 and/or the second substrate 164. For example, as shown in FIGS. 3A and 3B, the first elastic belt 106 and/or the second elastic belt 108 may include a folded portion 162g of the first substrate 162 extending longitudinally between a fold line 162h in the first substrate 162 and a lateral edge 162i. As such, the folded portion 162g of the first substrate 162 may be connected with the wearer facing surface 164d of the second substrate 164. In some configurations, the folded portion 162g of the first substrate 162 may also be connected with and/or overlap the chassis 102. In some configurations, the folded portion 162g of the first substrate 162 may also be connected with the wearer facing surface 162d of the first substrate 162. In some configurations, a portion of the folded portion 162g of the first substrate 162 may be left unbonded to the chassis 102 and/or the second substrate 164, forming a waste pocket having an opening oriented toward the lateral centerline 162c of the chassis 102. In another example, the first elastic belt 106 and/or the second elastic belt 108 may include a folded portion of the second substrate 164 extending longitudinally between a fold line in the second substrate 164 and a lateral edge. As such, the folded portion of the second substrate 164 may be connected with the garment facing surface 162c of the first substrate 162. As such, in some configurations, a fold line of the first substrate 162 and/or a fold line of the second substrate 164 may define at least a portion of the waist opening 110. It is to be appreciated that various waist configurations may be utilized. For example, as shown in FIG. 3A1, the folded portion 162g may be sandwiched between the second substrate 164 and the backsheet 136. In another example shown in FIG. 3A2, the second substrate 164 may be sandwiched between the folded portion 162g and the backsheet 136. Although FIGS. 3A1 and 3A2 show configurations of the first belt 106, it is to be appreciated that such configurations may be applied with the second belt 108.

It is to be appreciated that the first elastic belt 106 and the second elastic belt 108 may comprise the same materials and/or may have the same structure. In some embodiments, the first elastic belt 106 and the second elastic belt may comprise different materials and/or may have different structures. It should also be appreciated that components of the first elastic belt 106 and the second elastic belt 108, such as the first substrate 162, and/or second substrate 164 may be constructed from various materials. For example, the first and/or second belts may include a first substrate 162, and/or second substrate 164 that may be manufactured from materials such as plastic films; apertured plastic films; woven or nonwoven webs of natural materials (e.g., wood or cotton fibers), synthetic fibers (e.g., polyolefins, polyamides, polyester, polyethylene, or polypropylene fibers) or a combination of natural and/or synthetic fibers; or coated woven or nonwoven webs. In some configurations, the first and/or second belts may include a first substrate 162, and/or second substrate 164 comprising a nonwoven web of synthetic fibers, and may include a stretchable nonwoven. In some configurations, the first and second elastic belts may include an inner hydrophobic, non-stretchable nonwoven material and an outer hydrophobic, non-stretchable nonwoven material. It is to be appreciated that the belts may configured in various ways, such as disclosed for example, in U.S. Patent Application No. 63/111,790 and Chinese Patent Application No. CN2021/077843, which are both incorporated by reference.

Elastic material 167 may be positioned between the wearer facing surface 162d of the first substrate 162 and the garment facing surface 164c of the second substrate 164. It is to be appreciated that the elastic material 167 may include one or more elastic elements such as strands, ribbons, elastic films, or panels extending along the lengths of the elastic belts. As shown in FIGS. 2A and 3, the elastic material 167 may include a plurality of elastic strands 168. In some configurations, the elastic material 167 may be an elastic film used to form a zero-strain elastic laminate comprising an elastic film bonded to one or more nonwoven layers and subsequently subjected to mechanical deformation or activation sufficient to weaken the nonwoven layer(s) and enable the laminate to stretch and recover elastically.

It is also to be appreciated that the first substrate 162, second substrate 164, and/or elastic material 167 of the first elastic belt 106 and/or second elastic belt 108 may be bonded together and/or with other components, such as the chassis 102, with adhesive and/or mechanical bonds. It is to be appreciated that adhesive and mechanical bonding methods may be utilized alone or in combination with each other.

In some configurations, adhesive may be applied to at least one of the first substrate 162, second substrate 164, and/or elastic material 167 when being combined to form the first elastic belt 106 and/or second elastic belt 108. In some configurations, mechanical bonding devices may apply mechanical bonds to the to at least one of the first substrate 162, second substrate 164, and/or elastic material 167 when being combined to form the first elastic belt 106 and/or second elastic belt 108. Such mechanical bonds may be applied with heat, pressure, and/or ultrasonic devices. In some configurations, mechanical bonding devices may apply bonds that bond the first substrate 162, second substrate 164, and/or elastic material 167 together and/or may act to trap or immobilize discrete lengths of the contracted elastic strands in the first elastic belt 106 and/or second elastic belt 108.

It is also to be appreciated that the first substrate 162, second substrate 164, and/or elastic material 167 may be bonded together with various methods and apparatuses to create various elastomeric laminates, such as described in U.S. Patent Publication Nos. 20180168878 A1; 20180168877 A1; 20180168880 A1; 20180170027 A1; 20180169964 A1; 20180168879 A1; 20180170026 A1; 20180168889 A1; 20180168874 A1; 20180168875 A1; 20180168890 A1; 20180168887 A1; 20180168892 A1; 20180168876 A1; 20180168891 A1; 20190070042 A1; and 20190070041 A1 as well as U.S. Patent Application Nos. 62/989,059 and 62/984,837, and combinations thereof, all of which are incorporated herein by reference.

It is to be appreciated that components of the first elastic belt 106 and/or the second elastic belt 108 may be assembled in various ways and various combinations to create various desirable features that may differ along the lateral width and/or longitudinal length of the first elastic belt 106 and/or the second elastic belt 108. Such features may include, for example, Dtex values, bond patterns, aperture arrangements, elastic positioning, Average Dtex values, Average Pre-Strain values, rugosity frequencies, rugosity wavelengths, height values, and/or contact area. It is to be appreciated that differing features may be imparted to various components, such as for example, the first substrate 162, second substrate 164, and elastic material 167 before and/or during stages of assembly of the first elastic belt 106 and/or the second elastic belt 108.

It is to be appreciated that the first elastic belt 106 and/or the second elastic belt 108 may include various configurations of belt elastic materials 167 arranged in relation to each other and to the first substrate 162, and the second substrate 164. As discussed above, the elastic material 167 may include configurations of one or more elastic elements such as strands, ribbons, films, or panels positioned in various arrangements. In some configurations, the elastic material 167 may comprise various elastics, elastic features and arrangements, and processes for assembly, such as described in 2018/0168889 A1; 2018/0168874 A1; 2018/0168875 A1; 2018/0168890 A1; 2018/0168887 A1; 2018/0168892 A1; 2018/0168876 A1; 2018/0168891 A1; 2019/0298586 A1; 2019/0070042 A1; 2018/0168878 A1; 2018/0168877 A1; 2018/0168880 A1; 2018/0170027 A1; 2018/0169964 A1; 2018/0168879 A1; 2018/0170026 A1; and 2019/0070041 A1 as well as U.S. Patent Application Nos. 62/989,059 and 62/984,837, which are all incorporated by reference. It is also to be appreciated the elastic materials 167 herein may be configured with identical or different colors in various different locations on the first elastic belt 106 and/or the second elastic belt 108.

In some configurations, the elastic material 167 may be configured as elastic strands 168 disposed at a constant interval in the longitudinal direction. In other embodiments, the elastic strands 168 may be disposed at different intervals in the longitudinal direction. In some configurations, the elastic material 167 in a stretched condition may be interposed and joined between uncontracted substrate layers. When the elastic material 167 is relaxed, the elastic material 167 returns to an unstretched condition and contracts the substrate layers. The elastic material 167 may provide a desired variation of contraction force in the area of the ring-like elastic belt. It is to be appreciated that the chassis 102 and elastic belts 106, 108 may be configured in different ways other than as depicted in attached Figures. It is also to be appreciated that the elastic material 167 material may be joined to the substrates continuously or intermittently along the interface between the elastic material 167 material and the substrates. In some configurations, the elastic strands 168 may be in the form of extruded elastic strands, which may also be bonded with the first substrate 162 and/or second substrate 164 in a pre-corrugated configuration, such as disclosed for example in U.S. Pat. No. 5,681,302, which is incorporated by reference herein.

As discussed above for example with reference to FIGS. 2A and 3, the elastic material 167 discussed herein may be in the form of elastic strands 168. In some configurations, the elastic strands 168 may be parallel with each other and/or with the lateral axis 126. It is to be appreciated that the first elastic belt 106 and/or second elastic belt 108 may be configured to include various quantities of elastic strands 168. In some configurations, elastic strands 168 may be grouped in pairs. In some configurations, the first elastic belt 106 and/or second elastic belt 108 may comprise from about 100 to about 1500 elastic strands 168. It is also to be appreciated that elastic strands 168 herein may comprise various Dtex values, strand spacing values, and pre-strain values and such elastic strands 168 may utilized with other elastic strands to create first and second elastic belts 106, 108 comprising elastic strands 168 in various combinations of Dtex values, strand spacing values, and pre-strain values. For example, in some configurations, the Average-Dtex of one or more elastic strands 168 may be greater than 500. In some configurations, the Average-Dtex of one or more elastic strands 168 may be from about 10 to about 1500, specifically reciting all 1 Dtex increments within the above-recited range and all ranges formed therein or thereby. In some configurations, a plurality of elastic strands 168 may comprise an Average-Strand-Spacing of less than or equal to 4 mm. In some configurations, a plurality of elastic strands 168 may comprise an Average-Strand-Spacing from about 0.25 mm to about 4 mm, specifically reciting all 0.01 mm increments within the above-recited range and all ranges formed therein or thereby. In some configurations, a plurality of elastic strands 168 may comprise an Average-Strand-Spacing of greater than 4 mm. In some configurations, the Average-Pre-Strain of each of a plurality of elastic strands may be from about 50% to about 400%, specifically reciting all 1% increments within the above-recited range and all ranges formed therein or thereby. In some configurations, the elastic strands 168 comprise an Average-Strand-Spacing from about 0.25 mm to about 4 mm and an Average-Dtex from about 10 to about 500. In some configurations, the elastic strands 168 may comprise an Average-Pre-Strain from about 75% to about 300%.

In some configurations, a first plurality of elastic strands may comprise a first Average-Pre-Strain from about 75% to about 300%, and a second plurality of elastic strands may comprise a second Average-Pre-Strain that is greater than first Average-Pre-Strain. In some configurations, a first plurality of elastic strands comprises an Average-Strand-Spacing from about 0.25 mm to about 4 mm and an Average-Dtex from about 10 to about 500; and a second plurality of elastic strands may comprise an Average-Strand-Spacing greater than about 4 mm and an Average-Dtex greater than about 450.

In some configurations, such as shown in FIG. 2A, the elastic strands 168 may be referred to herein as outer waist elastics 170 and inner waist elastics 172. Elastic strands 168, such as the outer waist elastics 170, may continuously extend laterally between the first and second opposing end regions 106a, 106b of the first elastic belt 106 and between the first and second opposing end regions 108a, 108b of the second elastic belt 108. Some elastic strands 168, such as the inner waist elastics 172, may be configured with discontinuities in areas, such as for example, where the first and second elastic belts 106, 108 overlap portions of the chassis 102, such as the absorbent assembly 140.

As shown in FIG. 2A, the first elastic belt 106 and/or the second elastic belt 108 may be configured with low-stretch zones 701 and high-stretch zones 703. The first elastic belt 106 and/or the second elastic belt 108 may include a first high-stretch zone 703a and a second high-stretch zone 703b separated laterally by a low-stretch zone 701. Portions of the chassis 102, such as the backsheet 136 and absorbent assembly 140, may be connected with the first elastic belt 106 and/or the second elastic belt 108 in the low-stretch zones 701 in the first waist region 116 and/or the second waist region 118. The high-stretch zones 703 are elasticated by the elastic material 167, such as the elastic strands 168, 172; and the low-stretch zones 701 may comprise cut lines separating the elastic material 167, such as the elastic strands 168, 172. In some configurations, the elastic material 167 may be cut in an unbonded region where the elastic material is not bonded with first substrate 162 and the second substrate 164. Thus, the elastic material 167 retracts from the unbonded region and form low-stretch zone 701. In some configurations, the elastic material 167 may be cut into several discrete pieces. In turn, the low-stretch zones 701 define regions of the first elastic belt 106 and/or the second elastic belt 108 that have relatively less elasticity than the high-stretch zones 703. The discrete elastic material 167 that has been cut and which are elastically contracted do not add any substantial amount of elastication to the low-stretch zone 701. As such, upon application of a force, the high-stretch zones 703 will elongate more than the low-stretch zones 701. As provided above, the terms "elastic," "elastomer" or "elastomeric" refers to materials exhibiting elastic properties, which include any material that upon application of a force to its relaxed, initial length can stretch or elongate to an elongated length more than 10% greater than its initial length and will substantially recover back to about its initial length upon release of the applied force. In some configurations, the first elastic belt 106 and/or the second elastic belt 108 may be configured with high-stretch zones 703 that are elastic and may be configured with low-stretch zones 701 that are not elastic or "inelastic."

Figure 5C:
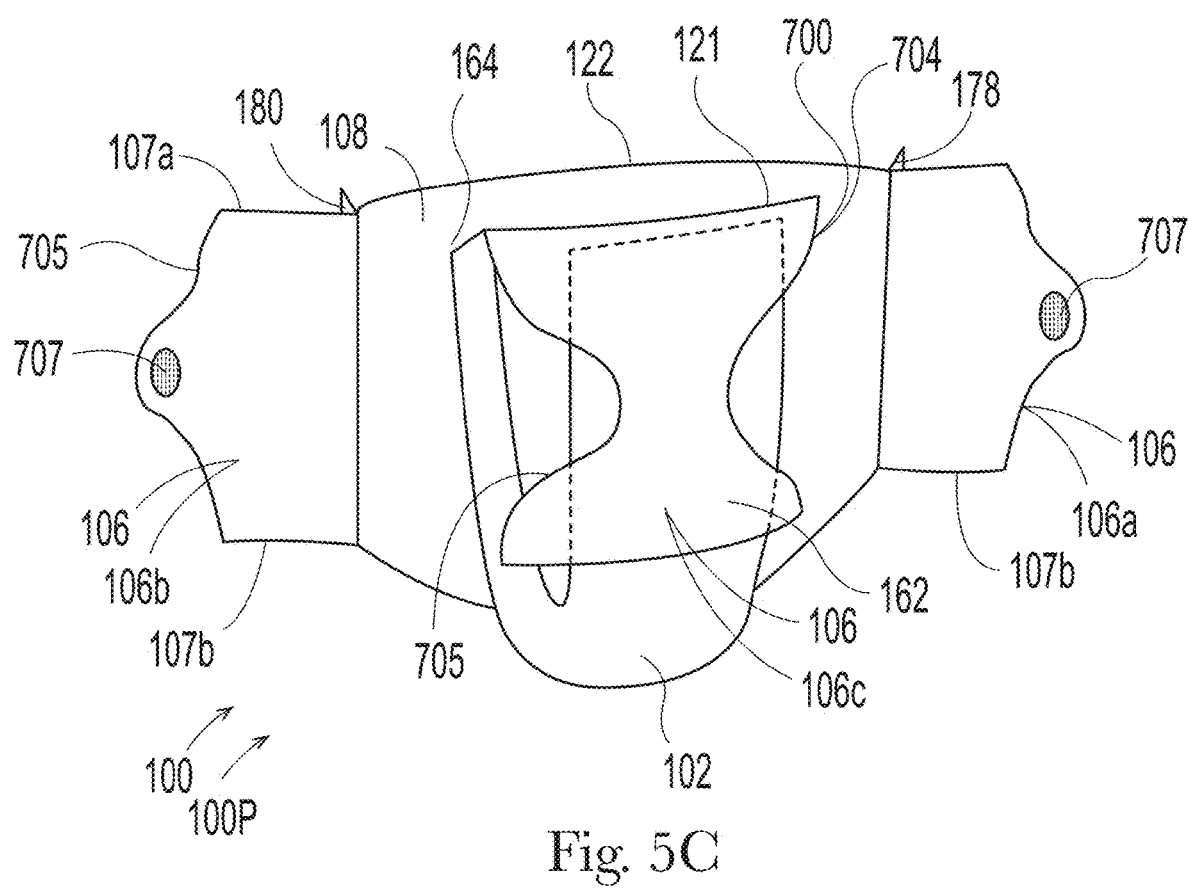
FIG. 5C is a perspective view of the diaper pant of FIG. 5A showing the front belt having been torn along two frangible pathways.

As discussed above, the diaper pants 100P described with reference to FIGS. 1-3C may include one or more frangible pathways in the first belt 106 and/or the second belt 108. For example, FIGS. 4A-5B show example diaper pants 100P with a first belt 106 that includes frangible pathways 700. The frangible pathways 700 may be configured to allow the first elastic belt 106 to be relatively easily torn along the frangible pathway 700, such as when removing the diaper pant 100P from a wearer. FIGS. 4B and 5B show view of the diaper pants 100P from FIGS. 4A and 5A, respectively, illustrating that the first belt 106 after having been torn along the frangible pathway 700 through both the outer longitudinal outer laterally extending edge 107a and the inner laterally extending edge 107b of the first belt 106. As such, the first elastic belts 106 shown in FIGS. 4B and 5B are separated by opposing tear lines 705. It is to be appreciated the first elastic belt 106 may torn along both frangible pathways 700 in FIGS. 4B and 5B. For example, FIG. 5C shows the diaper pant of FIG. 5A showing the front belt having been torn along two frangible pathways 700. As shown in FIG. 5C, the central region 106c of the first elastic belt 106 may remain bonded with the chassis 102 after separating the first and second opposing end regions 106a, 106b from the central region 106c by tearing the elastic belt 106 along the frangible pathways 700.

As discussed in more detail below, the frangible pathways 700 comprise a plurality of lines of weakness 704 configures such that all elastic strands 168 in the first elastic belt 106 are severed at least once in the frangible pathway 700. Severing the elastic strands 168 in the frangible pathway 700 helps make it relatively easier to tear the first elastic belt 106 along the frangible pathway 700. For example, when the elastic strands 168 are severed, the first substrate 162 and second substrate 164 of the first elastic belt 106 need only need to be torn without having to also tear uncut elastic strands 168. It is to be appreciated that the diaper pant 100P may include various quantities of frangible pathways 700 that may be: positioned in various locations; define various shapes; and extend for various lengths. For example, the first elastic belt 106 may comprises a first belt length defined by a longitudinal distance between the proximal edge 107b and the distal edge 107a, and the frangible pathway 700 may extend for a total length from an outermost edge of a line of weakness 704 nearest the proximal edge 107b of the first belt 106 to an outermost edge of a line of weakness 704 nearest the distal edge 107a of the first belt 106. In some configurations, the frangible pathway 700 may extend for a total length that is greater than, equal to, or less than the first belt length. In some configurations, the lines of weakness 704 may extend for a length from a first end to a second end, and a sum of the all the lengths of lines of weakness 704 in the frangible pathway 700 may be greater than the frangible pathway total length.

In some configurations, diaper pants 100P may be configured such that one or both of the first elastic belt 106 and the second elastic belt 108 include one or more frangible pathways 700. The frangible pathways 700 may be positioned in various locations on the first and second elastic belts 106, 108. For example, as shown in FIGS. 4A and 4B, frangible pathways 700 may be positioned laterally between the first and second side seams 178, 180 and the chassis 102. In another example, such as shown in FIGS. 5A-5C, frangible pathways 700 may extend to overlap with the chassis 102. In some configurations, the frangible pathways 700 may extend in straight lines and/or may be curved and/or have curved portions. In some configurations, the frangible pathways 700 may extend longitudinally for the entire length or less than the entire length of the first belt 106 and/or second belt 108.

In some configurations, the frangible pathways 700 may be configured and/or positioned to provide access to and/or function with other features, such as disposal features. For example, the diaper pant 100P shown in FIGS. 5A-5C includes fastener components 707 positioned on the wearing facing surface of the first elastic belt 106. In some configurations, the fastener components 707 may be positioned between the first elastic belt 106 and the chassis 102. The fastener component 707 may be configured to refastenably connect with other portions of the diaper pant 100P. As such, once the first elastic belt 106 is torn along the frangible pathways 700, the diaper pant 100P may be removed from a wearer and rolled or folded up for disposal, and the fastener component 707 may be connected with another portion of the diaper pant 100P to help maintain the diaper pant 100P in a disposal configuration. For example, FIG. 5C shows a diaper pant 100P after tearing the first elastic belt 106 along two frangible pathways. FIG. 5D shows the diaper pant 100P of FIG. 5C with the chassis 102 being rolled up onto itself in a longitudinal direction. And FIG. 5E shows the diaper pant 100P of FIG. 5D with fastener components 707 connected with the backsheet 134 of the chassis 102 to maintain the diaper pant 100P in a disposal configuration. In some configurations, when tearing the elastic belt along the frangible pathway 700, the tearing process may begin by tearing from the outer edge 107a or the inner edge 107b of the elastic belt 106. In some configurations, the first elastic belt 106 may also include a slit located adjacent to or in the proximity of the fastener component 707 and the weakened region 700 to help facilitate starting to tear the frangible pathway 700 in a region of the elastic belt 106 longitudinally between the outer edge 107a and the inner edge 107b.

It is also to be appreciated that the fastener component 707 may be configured various ways, such as hooks, loops, and/or adhesive. For example, the fastener component 707 may comprise hook elements or adhesive adapted to refastenably connect with another surface of the diaper pant 100P. In some configurations, the fastener component 707 may comprise loop elements adapted to refastenably connect with hook surface on the diaper pant 100P. The fastener component 707 may be a separate element connected with the elastic belt 106 in various ways, such as mechanical bonding, adhesive bonding, or both. In some configurations, the fastener component 707 may be integrally formed from materials of the elastic belt 106, 108. In some configurations, the fastener component 707 may be printed and/or comprise materials of various different colors such that the fastener component 707 may be visible from outside the diaper pant 100P.

As previously mentioned, the fastener component 707 may comprise a hook material that can refastenably engage with substrates, such as nonwovens for example, on an exterior surface of the diaper pant 100P. For example, the fastener component 707 may comprise a substrate comprising hooks, with the substrate bonded to the elastic belt 106, 108, such as the second substrate 164, which may be in the form of a nonwoven. It is to be appreciated that the substrate may be bonded to the elastic belt 106, 108 in various ways, such as for example, with mechanical bonds, thermal bonds, ultrasonic bonds, and/or adhesive bonds or combinations thereof. In some configurations, hooks may be integrally formed from the second substrate 164, which may be in the form of a nonwoven. The fastener component 707 may comprise one material or a combination of two or more materials arranged in at least partially overlapping configuration. In some configurations, the fastener component 707 may comprise other fastener types as known in the art.

It is to be appreciated that the fastener component 707 may comprise any of a wide variety of shapes, including rectangles or other polygons, circles, ovals, shapes having exterior convexities or concavities or combinations thereof, or one or a plurality of lines or geometric shapes forming an array. It is to be appreciated that the fastener component 707 may comprise various sizes. For example, in some configurations, the fastener component 707 may have a lateral width of between about 5 mm and about 100 mm, specifically reciting all 0.1 mm increments within the above-recited range and all ranges formed therein or thereby. In some configurations, the fastener component 707 may have a longitudinal length of between about 10 mm and about 100 mm, specifically reciting all 0.1 mm increments within the above-recited range and all ranges formed therein or thereby. The fastener component 707 may be aligned parallel the lateral centerline 126*a*, 126*b* of the elastic belt 106, 108 or may be oriented at an angle relative the longitudinal centerline 126*a*, 126 of the elastic belt 106, 108 of between 0 and 90 degrees. The fastener component 707 may comprise an array of two or more spaced-apart fastening elements. The fastener component 707 may have a color that is visible through any layers of the elastic belt 106, 108 on which the fastener component 707 is located. The elastic belt 106, 108 and/or chassis 102 may include printing or other indicia highlighting to a caregiver the location, function, and/or usage of the fastener component 707. The bond, or bond pattern, attaching the fastener component 707 to the elastic belt 106, 108 may be visually or tactilely distinct from the surrounding belt material in order to provide the caregiver a signal or a mechanical grip advantage.

It is also to be appreciated that the frangible pathways may comprise lines of weakness 704 that are: configured in various ways; positioned in various locations and orientations relative to each other, defined by various shapes; and extend for various lengths. For example, in some configurations, the lines of weakness 704 comprise discrete cut lines that penetrate through some or all the layers of the elastic belt 106. In some configurations, the lines of weakness 704 comprise discrete bonds wherein materials of the first substrate and the second substrate are fused together. In some configurations, the lines of weakness 704 may be linear, curvilinear, or have a regular or irregular geometry and may comprise one or more of a perforation, a bond, an aperture, or a mechanically thinned region of a material such as a nonwoven, or a combination thereof. It is also to be appreciated that the lines of weakness 704 can be formed with different lengths and spacings to achieve different separation forces.

Figure 6:
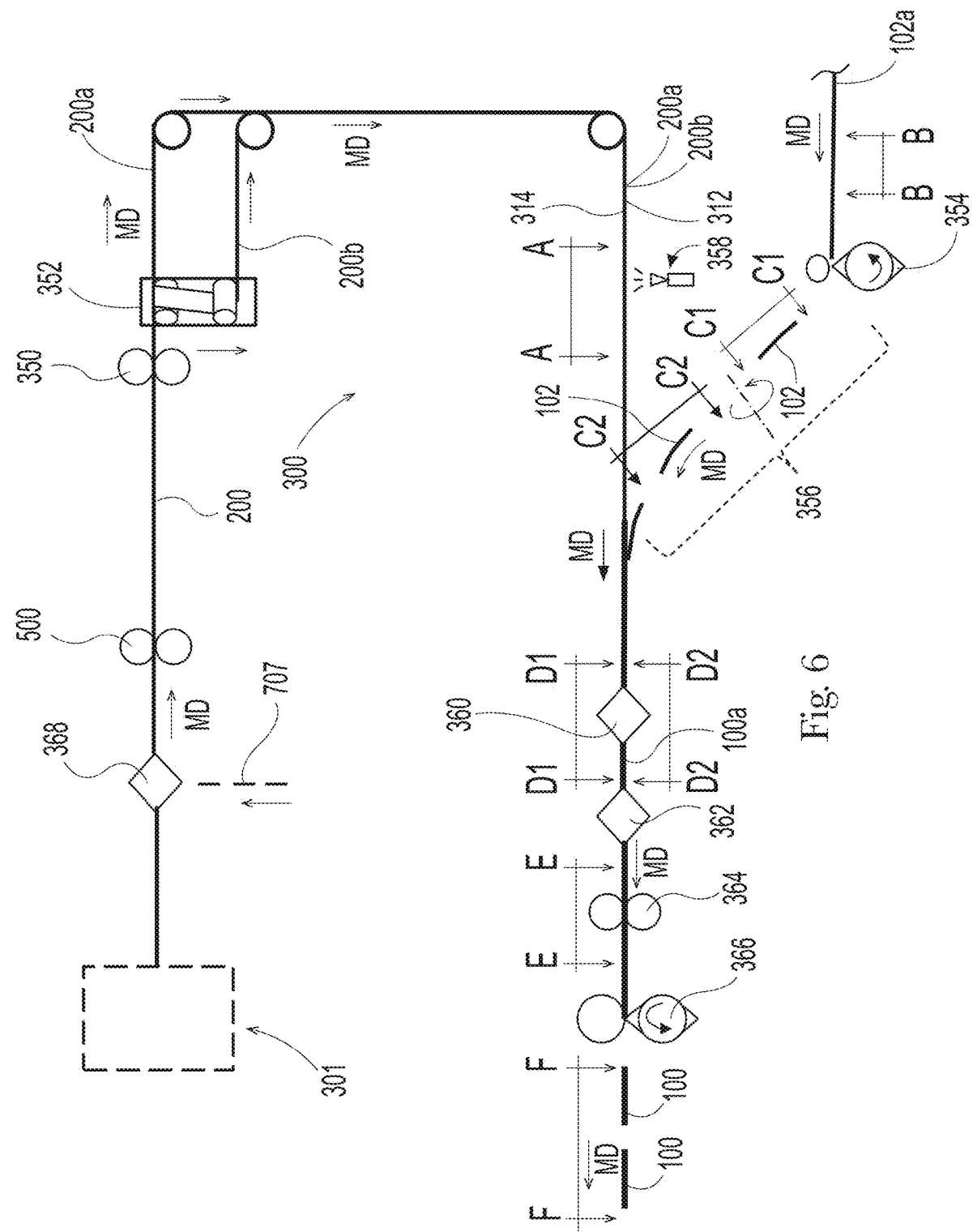
FIG. 6 is a schematic side view of a converting apparatus adapted to manufacture pre-fastened, pant diapers.

It is to be appreciated that various apparatuses and methods according to the present disclosure may be utilized to assemble various components of pre-fastened pant diapers 100 described herein. For example, FIG. 6 shows a schematic view of a converting apparatus 300 adapted to manufacture pant diapers 100P with frangible pathways 700. The method of operation of the converting apparatus 300 may be described with reference to the various components of pant diapers 100 described above and shown in FIGS. 1-5B. Although the following methods are provided in the context of the diaper 100 shown in FIGS. 1-5B, it is to be appreciated that various embodiments of diaper pants can be manufactured according to the methods disclosed herein, such as for example, the absorbent articles disclosed in U.S. Pat. No. 7,569,039; U.S. Patent Publication Nos. 2005/0107764 A1, 2012/0061016 A1, and 2012/0061015 A1, which are all hereby incorporated by reference herein. When assembling the diapers 100 shown in FIGS. 1-5B, the machine direction MD of the elastic belts 106, 108 discussed below in FIG. 6 may be parallel with the lateral centerlines 126*a*, 126*b* of the elastic belts 106, 108.

As described in more detail below, the converting apparatus 300 shown in FIG. 6 may operate to provide and advance an elastic laminate 200 and form frangible pathways in the elastic laminate 200 as well as cut elastic strands that extend through the frangible pathways. The elastic laminate may also be slit and separated along the machine direction MD into lanes, such as for example, a first elastomeric laminate 200*a* and a second elastomeric laminate 200*b*. In addition, a continuous length of chassis assemblies 102*a* may be advanced and cut into discrete chassis 102. The discrete chassis 102 may be spaced apart from each other along the machine direction MD, and opposing waist regions of the spaced apart chassis 102 are then connected with the advancing first and second elastic belt laminates 200*a*, 200*b*. Edge portions of the first belt laminate 200*a* may then be folded onto itself, and edge portions of the second belt laminate 200*b* may then be folded inward and onto itself. The chassis 102 may be folded to bring the first and second elastic belt laminates 200*a*, 200*b* into a facing relationship, and the first and second elastic belt laminates 200*a*, 200*b* are bonded together. The first and second elastic laminates 200*a*, 200*b* are then cut in the cross direction CD through bonded regions to create discrete pant diapers 100P, such as shown in FIGS. 1-5B.

As previously mentioned, the apparatus 300 may include various apparatuses and utilize various methods to produce elastomeric laminates 200 according to the present disclosure that may be used to construct diaper components, such as elastic belts 106, 108. For example, the apparatus 300 shown in FIG. 6 may include a converting apparatus 301 shown in FIGS. 7 and 8 that is adapted to manufacture elastomeric laminates 200. As described in more detail below, the converting apparatus 301 shown in FIGS. 7 and 8 operates to advance a continuous length of elastic material 202, a continuous length of a first substrate 204, and a continuous length of a second substrate 206 along a machine direction MD. It is also to be appreciated that in some configurations, the first substrate and second substrate 204, 206 herein may be defined by two discrete substrates or may be defined by folded portions of a single substrate. The apparatus 300 stretches the elastic material 202 and joins the stretched elastic material 202 with the first and second substrates 204, 206 to produce an elastomeric laminate 200.

Although the elastic material 202 is illustrated and referred to herein as strands 208, it is to be appreciated that in some configurations, elastic material 202 may include one or more continuous lengths of elastic strands, ribbons, and/or films.

It is to be appreciated that the methods and apparatuses herein may be adapted to operate with various types of absorbent article assembly processes, such as disclosed for example in U.S. Patent Publication Nos. 2013/0255861 A1; 2013/0255862 A1; 2013/0255863 A1; 2013/0255864 A1; and 2013/0255865 A1, which are all incorporated by reference herein. For example, the elastomeric laminates 200 may be used as a continuous length of elastomeric belt material that may be converted into the first and second elastic belts 106, 108 discussed above with reference to FIGS. 1-5B. As such, the elastic material 202 may correspond with the belt elastic material 168 interposed between the outer layer 162 and the inner layer 164, which in turn, may correspond with either the first and/or second substrates 204, 206. In other examples, the elastomeric laminates 200 may be used to construct waistbands and/or side panels in taped diaper configurations.

Figure 7:
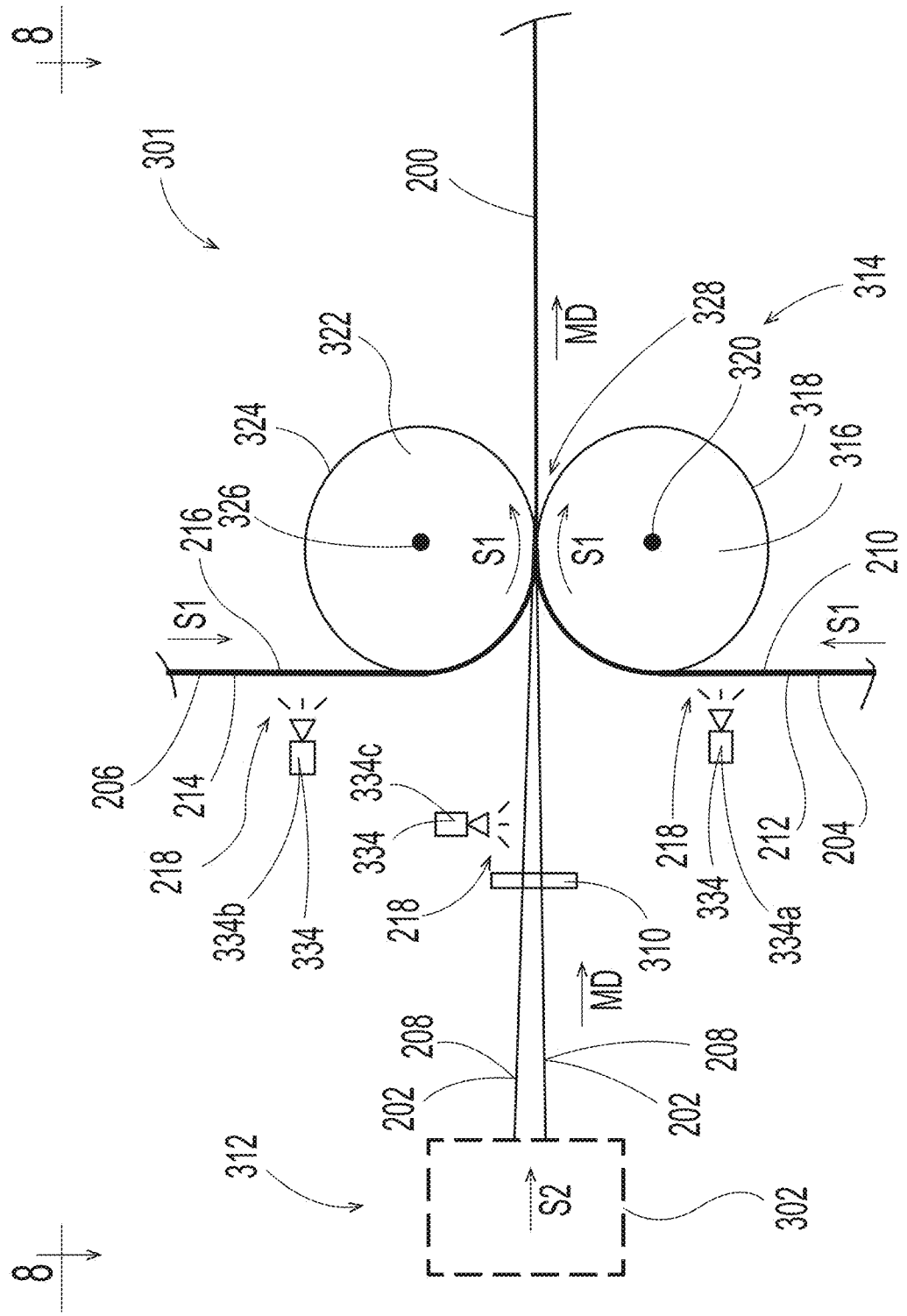
FIG. 7 is a schematic side view of a converting apparatus adapted to assemble an elastomeric laminate including a plurality of elastic strands positioned between a first substrate and a second substrate.
Figure 8:
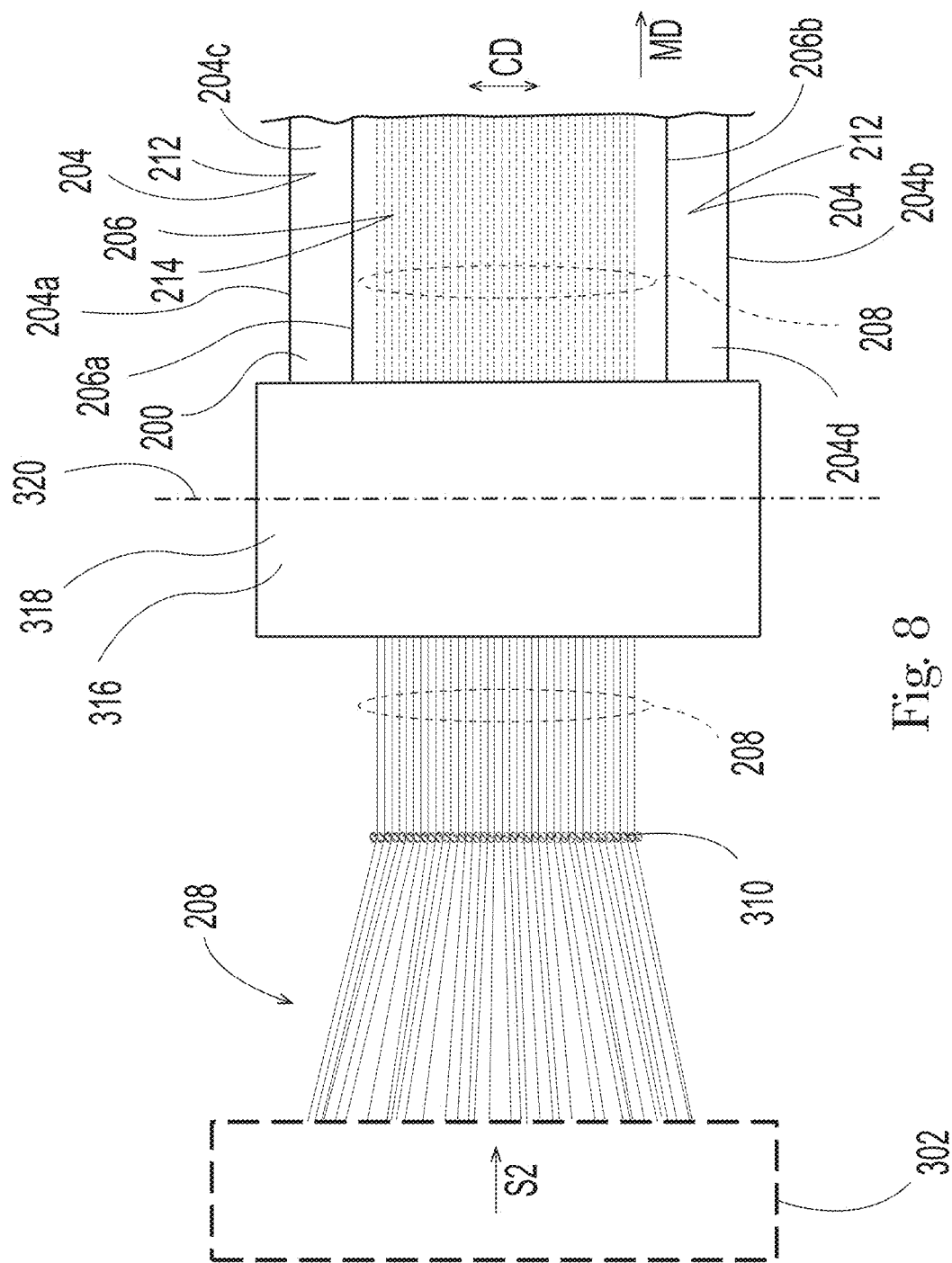
FIG. 8 is a view of the converting apparatus of FIG. 7 taken along line 8-8.

It is to be appreciated that elastic laminate 200 may be assembled and/or supplied in various ways. For example, FIGS. 7 and 8 show an example of a converting apparatus 301 for producing an elastomeric laminate 200 that may include a first metering device 312 and a second metering device 314. The first metering device 312 may be configured as an elastic strand supply apparatus, such as one or more unwinders 302 generically represented by a dash line rectangle, that may include one or more spools of elastic strands 208. During operation, the elastic strands 208 advance in the machine direction MD from the unwinder 302 to the second metering device 314. In addition, the elastic strands 208 may be stretched along the machine direction MD while advancing between the unwinder 302 and the second metering device 314. The stretched elastic strands 208 are also joined with the first substrate 204 and the second substrate 206 at the second metering device 314 to produce an elastomeric laminate 200. It is to be appreciated that the elastic strands 208 may advance along and/or around one or more guide rollers. It is also to be appreciated that the elastic strands 208 may be stretched along a continuous path while advancing in the machine direction MD or may be stretched in various steps that provide multiple increases in elongation while advancing in the machine direction MD.

As shown in FIG. 7, the second metering device 314 may include: a first roller 316 having an outer circumferential surface 318 and rotates about a first axis of rotation 320, and a second roller 322 having an outer circumferential surface 324 and rotates about a second axis of rotation 326. The first roller 316 and the second roller 322 rotate in opposite directions, and the first roller 316 is adjacent the second roller 322 to define a nip 328 between the first roller 316 and the second roller 322. The first roller 316 may rotate such that the outer circumferential surface 318 has a surface speed S1, and the second roller 322 may rotate such that the outer circumferential surface 324 has the same, or substantially the same, surface speed S1.

As shown in FIG. 7, the first substrate 204 includes a first surface 210 and an opposing second surface 212, and the first substrate 204 advances to the first roller 316. In particular, the first substrate 204 advances at speed S1 to the first roller 316 where the first substrate 204 partially wraps around the outer circumferential surface 318 of the first roller 316 and advances through the nip 328. As such, the first surface 210 of the first substrate 204 travels in the same direction as and in contact with the outer circumferential surface 318 of the first roller 316. In addition, the second substrate 206 includes a first surface 214 and an opposing second surface 216, and the second substrate 206 advances to the second roller 322. In particular, the second substrate 206 advances at speed S1 to the second roller 322 where the second substrate 206 partially wraps around the outer circumferential surface 324 of the second roller 322 and advances through the nip 328. As such, the second surface 216 of the second substrate 206 travels in the same direction as and in contact with the outer circumferential surface 324 of the second roller 322. It is to be appreciated that the first and/or substrates 204, 206 may advance at various speeds S1. In some configurations, the first substrate 204 and/or the second substrate 206 may advance at speed S1 from about 150 meters/minute to about 500 meters/minute, specifically reciting all 1 meter/minute increments within the above-recited range and all ranges formed therein or thereby.

In some configurations, the elastic strands 208 may also be stretched in the machine direction MD and combined with the first substrate 204 and the second substrate 206 in the stretched state. For example, with continued reference to FIGS. 7 and 8, the unwinder 302 may unwind or otherwise supply the elastic strands 208 advancing at a speed S2 in the machine direction MD to the nip 328. In some configurations, the speed S2 is less than the speed S1, and as such, the elastic strands 208 are stretched in the machine direction MD. In turn, the stretched elastic strands 208 advance through the nip 328 between the first and second substrates 204, 206 such that the elastic strands 208 are joined with the second surface 212 of the first substrate 204 and the first surface 214 of the second substrate 206 to produce a continuous length of elastomeric laminate 200.

As shown in FIG. 8, the first substrate 204 defines a width in the cross direction CD between opposing first and second longitudinal edges 204a, 204b. And the second substrate 206 defines a width in the cross direction CD between opposing first and second longitudinal edges 206a, 206b. As shown in FIG. 8, the width of the first substrate 204 may be greater than the width of the second substrate 206. As such, a first extended portion 204c of the first substrate 204 may extend outward in the cross direction from the first edge 206a of the second substrate 206 to the first edge 204a of the first substrate 204, and a second extended portion 204d of the first substrate 204 may extend outward in the cross direction from the second edge 206b of the second substrate 206 to the second edge 204b of the first substrate 204. It is to be appreciated that in some embodiments, the width of the second substrate 206 may be the same as or greater than the width of the first substrate 204.

As previously mentioned, the apparatus 301 may include an elastic strand supply apparatus, such as one or more unwinders 302, that supplies a plurality of elastic strands 208. It is to be appreciated the unwinders 302 herein may be configured in various ways. For example, the unwinder 302 may be configured with individual spools with mandrel and/or surface driven unwinders, overend unwinders, and/or beam unwinders (also referred to as warp beams). Various types of unwinders are disclosed in U.S. Pat. Nos. 6,676,054; 7,878,447; 7,905,446; 9,156,648; 4,525,905; 5,060,881; and 5,775,380; U.S. patent application Ser. No. 17/189,476, filed on Mar. 2, 2021; and U.S. Patent Publication Nos. 2004/0219854 A1; 2018/0168879 A1; and 2018/0170026 A1, all of which are incorporated by reference herein. Additional examples of elastics and associated handling equipment are available from Karl Mayer Corporation. It is to be appreciated that the apparatus 301 may be configured to assemble elastomeric laminates 200 with elastic strands 208 unwound from more than one unwinder 302 in combination with elastic strands supplied from the same and/or different types of elastic unwinder configurations. It is also to be appreciated that the elastic strands 208 may include various types of spin finish, also referred herein as yarn finish, configured as coating on the elastic strands 208 that may be intended to help prevent the elastic strands from adhering to themselves, each other, and/or downstream handling equipment. As such, the apparatus may also be configured to remove or partially remove the spin finish from the elastic strands, such as disclosed for example in U.S. Patent Publication No. 2018/0168877 A1, which is incorporated by reference herein.

As previously mentioned, the apparatus 301 may include one or more unwinders 302 that may supply various quantities of elastic strands. In some configurations, the unwinders 302 herein may include from 1 to about 3000 spools positioned thereon, and thus, may have from 1 to about 3000 elastic strands 208 advancing therefrom, specifically reciting all 1 spool and strand increments within the above-recited range and all ranges formed therein or thereby. In turn, the elastomeric laminates 200 herein may include from 1 to about 3000 elastic strands 208 spaced apart from each other in the cross direction CD, specifically reciting all 1 elastic strand increments within the above-recited range and all ranges formed therein or thereby.

It is also to be appreciated that the apparatuses and processes may be configured such that elastic strands 208 may be advanced from the unwinders 302 and directly to the assembly process without having to touch additional machine components, such as for example, guide rollers. It is also to be appreciated that in some configurations, elastic strands 208 may be advanced from the unwinders 302 and may be redirected and/or otherwise touched by and/or redirected by machine components, such as for example guide rollers, before advancing to the assembly process.

As shown in FIGS. 7 and 8, the elastic strands 208 may also advance through a strand guide 310 before being combined with the first substrate 204 and the second substrate 206. The strand guide 310 may space or separate neighboring elastic strands 208 from each other at a desired distance in a cross direction CD before being combined with the first substrate 204 and the second substrate 206. As shown in FIGS. 7 and 8, the elastic strands may advance through a strand guide 310 positioned between the unwinder 302 and the nip 328. The strand guide 310 may operate to change and/or dictate and/or fix the cross directional CD separation distance between neighboring elastic strands 208 advancing into the nip 328 and in the assembled elastomeric laminate 200. It is to be appreciated that the elastic strands 208 may be separated from each other by various distances in the cross direction CD advancing into the nip 328 and in the assembled elastomeric laminate 200. In some configurations, neighboring elastic strands 208 may be separated from each other by about 0.5 mm to about 4 mm in the cross direction CD, specifically reciting all 0.1 mm increments within the above-recited range and all ranges formed therein or thereby. It is to be appreciated that the strand guide 310 may be configured in various ways. In some configurations, the strand guide 310 may be configured as a comb that may comprise a plurality of tines or reeds. In turn, the advancing elastic strands 208 are separated and spaced apart from each other by the tines or reeds in the cross direction CD from each other. In some configurations, the strand guide 310 may include a plurality of rollers that separate and space the elastic strands in the cross direction CD from each other.

It is to be appreciated that different components may be used to construct the elastomeric laminates 200 in accordance with the methods and apparatuses herein. For example, the first and/or second substrates 204, 206 may include nonwovens and/or films. In addition, the elastic strands 208 may be configured in various ways and may have various decitex values. In some configurations, the elastic strands 208 may be configured with decitex values ranging from about 10 decitex to about 1000 decitex, specifically reciting all 1 decitex increments within the above-recited range and all ranges formed therein or thereby.

As discussed above, it is to be appreciated that the elastomeric laminates 200 assembled herein may include various quantities of elastic strands 208 spaced apart from each other by various distances and may include various decitex values. For example, the elastomeric laminates 200 herein may have various elastic densities, wherein the elastic density may be defined as decitex per elastomeric laminate width. For example, some elastomeric laminates 200 may have an elastic density from about 30 decitex/mm to about 150 decitex/mm, specifically reciting all 1 decitex/mm increments within the above-recited range and all ranges formed therein or thereby. In another example, the elastomeric laminates 200 herein may have various numbers of elastic strands arranged in the cross direction CD per meter of elastomeric laminate cross directional width. For example, some elastomeric laminates 200 may have from about 500 elastic strands/meter of elastomeric laminate width to about 2000 elastic strands/meter of elastomeric laminate width, specifically reciting all 1 elastic strand/meter increments within the above-recited range and all ranges formed therein or thereby.

As shown in FIG. 7, the apparatus 301 may include one or more adhesive applicator devices 334 that may apply adhesive 218 to at least one of the elastic strands 208, the first substrate 204, and the second substrate 206 before being combined to form the elastomeric laminate 200. For example, the first substrate 204 may advance past an adhesive applicator device 334a that applies adhesive 218 to the second surface 212 of the first substrate 204 before advancing to the nip 328. It is to be appreciated that the adhesive 218 may be applied to the first substrate 204 upstream of the first roller 316 and/or while the first substrate 204 is partially wrapped around the outer circumferential surface 318 of the first roller 316. In another example, the second substrate 206 may advance past an adhesive applicator device 334b that applies adhesive 218 to the first surface 214 of the second substrate 206 before advancing to the nip 328. It is to be appreciated that the adhesive 218 may be applied to the second substrate 206 upstream of the second roller 322 and/or while the second substrate 206 is partially wrapped around the outer circumferential surface 324 of the second roller 324. In another example, an adhesive applicator device 334c may be configured to apply adhesive 218 to the elastic strands 208 before and/or while being joined with first substrate 204 and second substrate 206.

It is to be appreciated that the adhesive applicator devices herein 334 be configured in various ways, such as for example, spray nozzles and/or slot coating devices. In some configurations, the adhesive applicator devices 334 may be configured in accordance with the apparatuses and/or methods disclosed in U.S. Pat. Nos. 8,186,296; 9,265,672; 9,248,054; and 9,295,590 and U.S. Patent Publication No. 2014/0148773 A1, all of which are incorporated by reference herein.

It is to be appreciated that the elastic strands 208 may be joined to the first substrate 204 and/or the second substrate 206 continuously or intermittently along the interface between the elastic strands 208 material and the substrates 204, 206. Thus, the elastic laminate 200 may include non-bonded regions intermittently spaced between bonded regions along the machine direction MD, wherein the elastic strands 208 are not bonded to either the first substrate 204 or the second substrate 206 in the non-bonded regions. As such, the elastic strands 208 may be severed in the non-bonded regions in a subsequent process step and thus, for example, may form low-stretch zones 701 mentioned above.

In some configurations, adhesive 334 may be applied intermittently on the first substrate 204, the second substrate 206, and/or the elastic strands 208 to create intermittent bonds along the lengths of the elastic strands 208 between the first substrate 204 and/or the second substrate 206. It is to be appreciated that intermittent application of adhesive 334 may be created with spray nozzles and/or slot coat devices that apply intermittent patterns of adhesive 334. In some configurations, adhesive 334 may be applied intermittently along the length of the advancing elastic strands 208 to create intermittent bonds along the lengths of the elastic strands 208 between the first substrate 204 and/or the second substrate 206. In some configurations, slot coat devices may be configured to continuously apply adhesive 334 at relatively low basis weights onto the first substrate 204 and/or the second substrate 206, wherein the relatively low basis weights of adhesive results in the creation of intermittent bonding between the first substrate 204 and/or the second substrate 206 along the lengths of the elastic strands 208. In some configurations, slot coat devices may be configured to continuously apply adhesive 334 at relatively high basis weights onto the first substrate 204 and/or the second substrate 206, wherein the relatively high basis weights of adhesive results in the creation of continuous bonding between the first substrate 204 and/or the second substrate 206 along the lengths of the elastic strands 208. In some configurations, adhesive 334 may be applied continuously along the length of the advancing elastic strands 208 to create continuous bonds along the lengths of the elastic strands 208 between the first substrate 204 and/or the second substrate 206.

In some configurations, the apparatus 301 may include a mechanical bonding device that applies the mechanical bonds to the elastomeric laminate 200, such as for example, bonds that may be applied with heat, pressure, and/or ultrasonic devices. Examples of ultrasonic bonding devices, which may include linear or rotary type configurations, are disclosed for example in U.S. Pat. Nos. 3,113,225; 3,562,041; 3,733,238; 5,110,403; 6,036,796; 6,508,641; and 6,645,330. In some configurations, the ultrasonic bonding device may be configured as a linear oscillating type sonotrode, such as for example, available from Herrmann Ultrasonic, Inc. Additional examples of mechanical bonding devices and methods are disclosed in U.S. Pat. Nos. 4,854,984; 6,291,039; 6,248,195; 8,778,127; and 9,005,392; and U.S. Patent Publication Nos. 2014/0377513 A1; and 2014/0377506 A1, all of which are incorporated by reference herein. It is to be appreciated that the mechanical bonding device may apply mechanical bonds to the elastomeric laminate at or downstream of the nip 328. The mechanical bonding device may apply bonds that bond the first substrate 204, the second substrate 206, and/or elastic strands 208 together and/or may act to trap or immobilize discrete lengths of the contracted elastic strands 208 in the elastomeric laminate 200. It is also to be appreciated that the apparatuses herein may include one of, some of, or all of adhesive applicator devices 334a, 334b, 334c and mechanical bonding device mentioned herein.

It is also to be appreciated that the elastic strands 208 may be bonded with the first substrate 204 and/or second substrate 206 with various methods and apparatuses to create various elastomeric laminates, such as described in U.S. Patent Publication Nos. 2018/0168878 A1; 2018/0168877 A1; 2018/0168880 A1; 2018/0170027 A1; 2018/0169964 A1; 2018/0168879 A1; 2018/0170026 A1; 2018/0168889 A1; 2018/0168874 A1; 2018/0168875 A1; 2018/0168890 A1; 2018/0168887 A1; 2018/0168892 A1; 2018/0168876 A1; 2018/0168891 A1; 2019/0070042 A1; and 2019/0070041 A1 and combinations thereof, all of which are incorporated herein by reference.

It is to be appreciated that the apparatuses 301 herein may be configured in various ways with various features described herein to assemble elastomeric laminates 200 having various stretch characteristics. For example, when the elastomeric laminate 200 is elongated, some elastic strands 208 may exert contraction forces in the machine direction MD that are different from contraction forces exerted by other elastic strands 208. Such differential stretch characteristics can be achieved by stretching some elastic strands 208 more or less than other elastic strands 208 before joining the elastic strands with the first and second substrates 204, 206. As discussed above, the spools of elastic strands 208 may be unwound from one or more unwinders 302 at different speeds from each other, and as such, the elastic strands 208 may be stretched more or less than each when combined with the first and second substrates. For example, as previously discussed, the first substrate 204 and the second substrate 206 may each advance at a speed S1. In some configurations, some elastic strands 208 may advance at speed S2 that is less than the speed S1 are also different from the advancement speeds of other elastic strands. As such, some elastic strands 208 are stretched by different amounts in the machine direction MD when combined with the first and second substrates 204, 206.

As discussed herein, the elastic strands 208 may be pre-strained prior to joining the elastic strands 208 to the first or second substrate layers 204, 206. In some configurations, the elastic strands 208 may be pre-strained from about 75% to about 300%, specifically reciting all 1% increments within the above-recited range and all ranges formed therein or thereby. In some configurations, the elastic strands 208 may be pre-strained from about 80% to about 250%, specifically reciting all 1% increments within the above-recited range and all ranges formed therein or thereby. Pre-strain refers to the strain imposed on an elastic or elastomeric material prior to combining it with another element of the elastomeric laminate or the absorbent article. Pre-strain is determined by the following equation: Pre-strain=((extended length of the elastic-relaxed length of the elastic)/relaxed length of the elastic)*100.

It is also to be appreciated that the elastic strands 208 may have various different material constructions and/or decitex values to create elastomeric laminates 200 having different stretch characteristics in different regions. In some configurations, the spools of elastic strands 208 having different decitex values may be positioned on and advanced from one or more unwinders 302. In some configurations, the elastomeric laminate 200 may have regions where the elastic strands 208 are spaced relatively close to one another in the cross direction CD and other regions where the elastic strands 208 are spaced relatively far apart from each other in the cross direction CD to create different stretch characteristics in different regions. In some configurations, the elastic strands 208 may be supplied on the spool in a stretched state, and as such, may not require additional stretching (or may require relatively less additional stretching) before being combined with the first substrate 204 and/or the second substrate 206. In some configurations, differential stretch characteristics in an elastomeric laminate 200 may be created by bonding another substrate and/or elastomeric laminate and/or an elastic film to a particular region of an elastomeric laminate. In some configurations, differential stretch characteristics in an elastomeric laminate 200 may be created by folding a portion of an elastomeric laminate onto itself in a particular region of the elastomeric laminate.

In some configurations, the elastic strands 208 may be joined with the first and second substrates 204, 206 such that the elastomeric laminate 200 may have different stretch characteristics in different regions along the cross direction CD, such as disclosed in U.S. Patent Publication Nos. 2006/0094319 A1; 2006/0032578 A1; 2018/0168878 A1; 2018/0168877 A1; 2018/0168880 A1; 2018/0170027 A1; 2018/0169964 A1; 2018/0168879 A1; 20180170026 A1; 2018/0168889 A1; 2018/0168874 A1; 2018/0168875 A1; 2018/0168890 A1; 2018/0168887 A1; 2018/0168892 A1; 2018/0168876 A1; 2018/0168891 A1; 2019/0070042 A1; and 2019/0070041 A1, which are all incorporated by reference herein. In some configurations, the elastomeric laminate 200 may include different tension zones that may help make some web handling operations less cumbersome, such as disclosed in U.S. Patent Publication No. 2002/0009940 A1, which is incorporated by reference herein.

Figure 9:
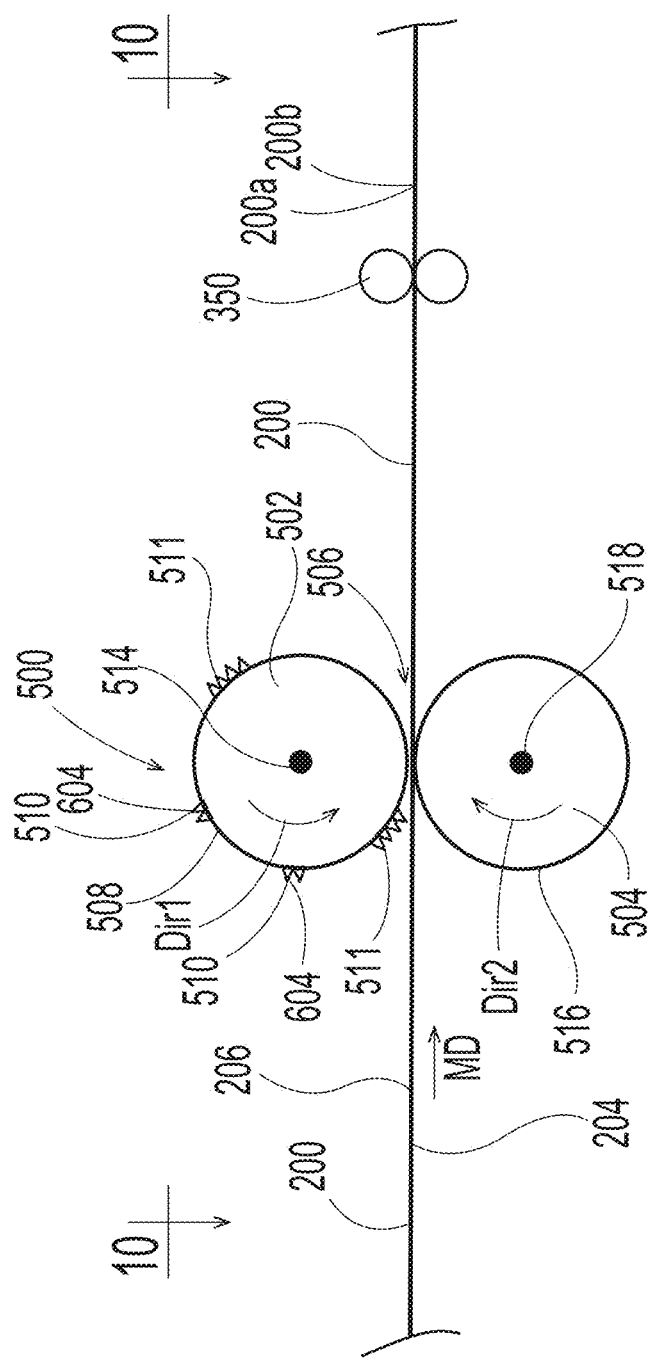
FIG. 9 is a schematic side view of a cutting apparatus adapted to form frangible pathways in an elastomeric laminate.
Figure 10:
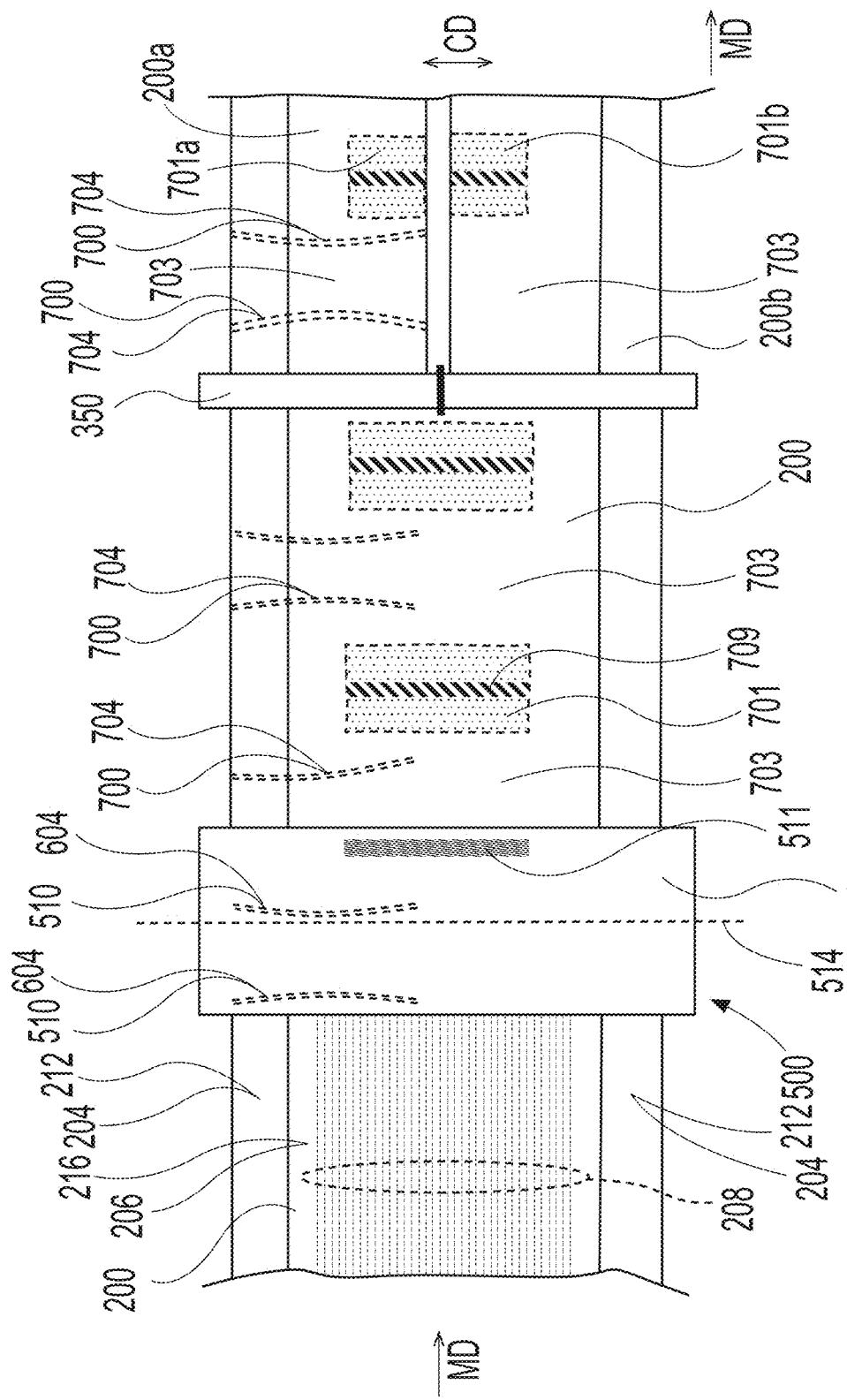
FIG. 10 is a view of the cutting apparatus of FIG. 9 taken along line 10-10.

Referring again to FIG. 6, the elastic laminate 200 may advance in the machine direction MD to a cutting device 500 adapted to form frangible pathways 700 in the elastic laminate 200. As shown in FIGS. 9 and 10, the cutting device 500 may include a knife roll 502 positioned adjacent an anvil roll 504 to define a nip 506 therebetween. The knife roll 502 may include an outer circumferential surface 508 and blades 510 extending radially outward to blade edges 604 and adapted to rotate about an axis 514 in a first direction Dir1. The anvil roll 504 may include an outer circumferential surface 516 adapted to rotate about an axis 518 in a second direction Dir2 opposite the first direction Dir1. As the elastic laminate 200 advances through the nip 506 between the knife roll 502 and the anvil roll 504, the blades 510 operate to form frangible pathways 700 in the elastic laminate 200. As discussed in more detail below, the blade edges 604 act on the elastic laminate 200 to create discrete lines of weakness 704 that define each frangible pathway 700. When forming the lines of weakness 704, the blade edges 604 may also cut elastic strands 208 that extend through the lines of weakness 704. As discussed in more detail below, the blades 510 may be configured such that all elastic strands 208 extending through the frangible pathway 700 are cut at the lines of weakness 704 such that some of the elastic strands are cut only once and such that some of the elastic strands are cut more than once.

Figure 10A:
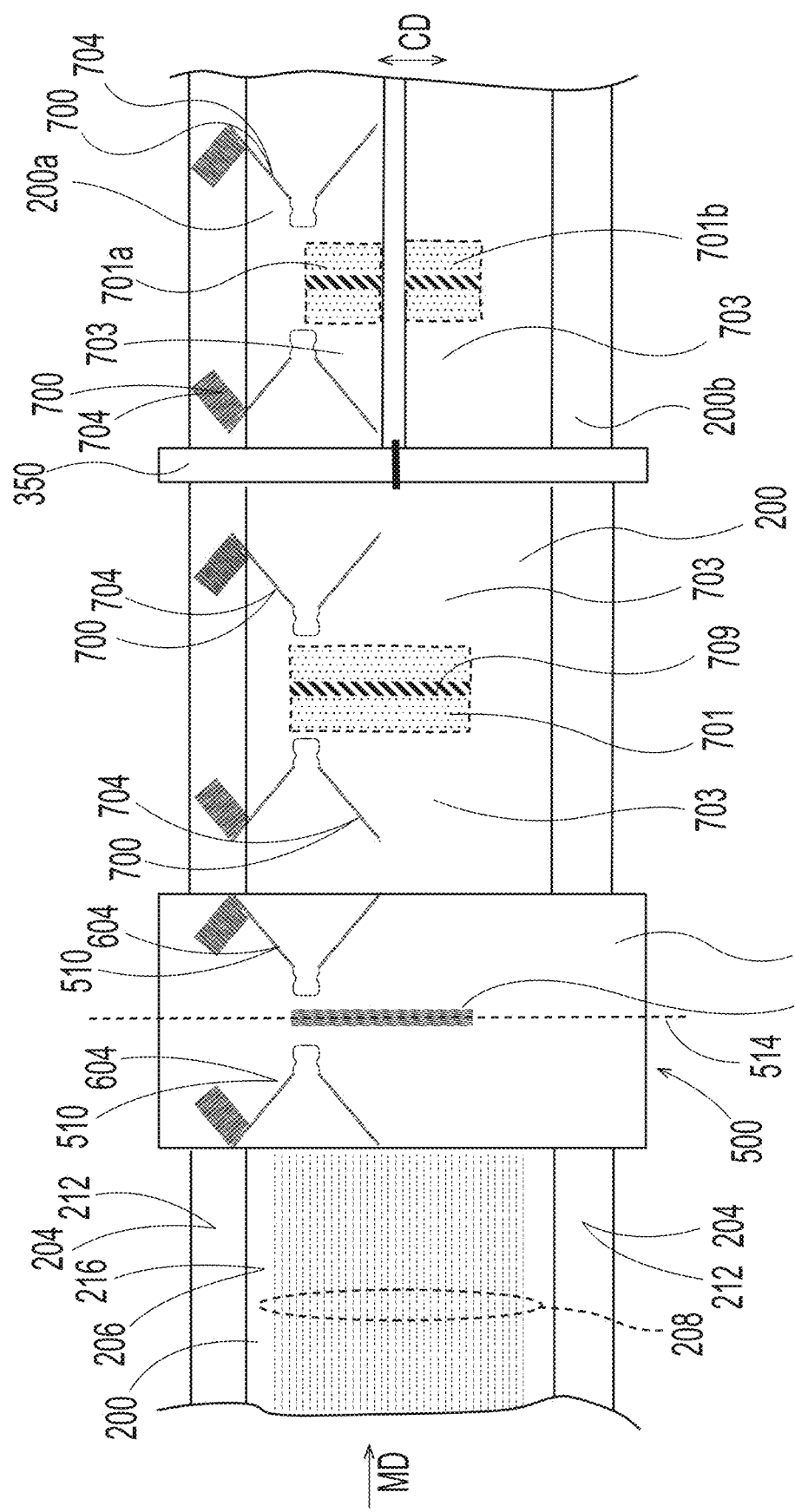
FIG. 10A is a view of another configuration of the cutting apparatus of FIG. 9 taken along line 10-10.

It is to be appreciated that the cutting device 500 may configured in various ways with various different blade configurations adapted to form different configurations of frangible pathways 700. For example, FIG. 10A illustrates another configuration of the cutting device 500 adapted to form frangible pathways 700 in the elastic laminate 200.

In some configurations, the cutting device 500 may further be adapted to cut elastic strands 208 to create zones of reduced elasticity in the elastic laminate 200, which may be also referred to as tummy elastic cutting. For example, regions of the elastic strands 208 may be intermittently deactivated along the length of the elastic laminate 200 by cutting the elastic strands 208 to create low-stretch zones 701 in intermittently spaced along the machine direction between high-stretch zones 703, such as discussed above with reference to FIG. 2A. In turn, chassis 102 may be subsequently connected with the first and/or second elastic laminates 200a, 200b so as to overlap the low-stretch zones 701. As shown in FIGS. 9 and 10, the knife roll 502 may include blades 511 adapted to cut elastic strands 208 to form the low-stretch zones 701. For example, the blades 511 may cut elastic strands 208 in unbonded regions where lengths of the elastic strands 208 are not bonded with the first substrate 204 and the second substrate 206. Tummy cut regions 709 where the blades 511 contact the elastic laminate 200 are illustrated generically as cross-hatched areas in FIG. 10. As such, the severed elastic strands 208 may retract from the unbonded regions to form low-stretch zones 701. In some configurations, the blades 511 may cut elastic strands 208 into several pieces along the machine direction MD to form low-stretch zones 701, such as disclosed for example in U.S. Patent Application No. 63/281,113, filed on Nov. 19, 2021, which is incorporated herein by reference. The cutting device 500 may be configured with various aspects of the cutting devices and blades disclosed in U.S. Pat. Nos. 8,440,043; 10,759,153; and 10,807,263; and U.S. Patent Publication No. 2020/0180182 A1, which are incorporated by reference herein. As opposed to or in addition to blades, it is to be appreciated that the cutting device 500 may be configured to perform cutting operations in various ways, such as with lasers or ultrasonics, for example as disclosed in U.S. Patent Publication Nos. 2016/0354254 A1; 2016/0128874 A1; 2017/0266941 A1; 2017/0266057 A1; and 2017/0266056 A1, which are all incorporated by reference herein. It is to be appreciated that the apparatus 300 may be configured to include an additional cutting device that is separate from the cutting device 500 to perform tummy cutting operations.

In some configurations, the apparatus 300 such as shown in FIG. 6 may be configured to assemble elastomeric laminates 200 that may be cut along the machine direction MD to define separate lanes of elastic of individual elastomeric laminates 200. For example, as shown in FIGS. 6, 9, and 10, the continuous elastomeric laminate 200 may advance to a slitting device 350, wherein the elastomeric laminate 200 is slit and separated along the machine direction MD into lanes, such as for example, a first continuous elastomeric laminate 200a and a second continuous elastomeric laminate 200b. It is to be appreciated that the elastomeric laminate 200 may be slit with a shear slitting operation or a crush slit operation. In a crush slit operation, the first substrate 204 and the second substrate 206 may be bonded together during the slitting operation.

With continued reference to FIG. 10, the slitting device 350 may be configured to cut the elastic laminate 200 in the machine direction MD through the low stretch zones 701 to create a first low-stretch zones 701a and second low-stretch zones 701b. It is to be appreciated that the first elastic laminate 200a may correspond with the first elastic belt 106 and the second elastic laminate 200b may correspond with the second elastic belt 108 described above. As discussed in more detail below, when assembling diaper pants 100P, the elastic laminate 200 may be converted into a first elastic belt laminate 200a and/or a second elastic belt laminate 200b. The first elastic belt laminate 200a and the second elastic belt laminate 200b may be separated from each other in the cross direction CD. In turn, opposing end regions of chassis 102 may be connected with the low-stretch zones 701a in the first elastic belt laminate 200a and/or low stretch zones 701b in the second elastic belt laminate 200*b*. During subsequent assembly operations, the chassis 102 may be folded so as to position the first elastic belt laminate 200*a* into a facing relationship with the second elastic belt laminate 200*b*. The overlapping belt laminates 200*a*, 200*b* may be bonded together, and subsequently, discrete diaper pants 100P may be formed by separating the first and second belt laminates 200*a*, 200*b* into first and second belts 106, 108 by cutting along the cross direction CD through bonded regions of the first and second belt laminates 200*a*, 200*b*. As such, the bonded regions may be divided to define the first and second side seams 178, 180, respectively.

From the slitting device 350, the first and second elastic laminates 200*a*, 200*b* may advance through a diverter 352 that separates the first and second elastic laminates 200*a*, 200*b* from each other in the cross direction CD. It is to be appreciated that the diverter 352 may be configured in various ways. For example, in some embodiments, the diverter 352 may include turn bars angled at 45 degrees or some other angle with respect to the machine direction MD. In some embodiments, the diverter may include cambered rollers. In some embodiments, the diverter 352 may include a pivot or tracking table, such as for example, the FIFE-500 Web Guiding System, by Maxcess-FIFE Corporation, which can adjust the positions of the first and second elastic laminates 200*a*, 200*b* in the cross direction CD. Other suitable pivot or tracking tables are available from Erhardt & Leimer, Inc. The diverter may also include instrumentation and web edge control features that allow for precise active control of the substrate positions.

It is to be appreciated that the apparatus 300 may be configured in various ways and to conduct more or less converting operations and/or in various different orders of execution. For example, the first and second elastic laminates 200*a*, 200*b* may be formed by separate continuous lengths of material similar to the description above, and as such would not require a slitting step and/or a diverting step. In some configurations, the elastic laminate 200 may advance first to the slitting device 350, and the first and second elastic laminates 200*a*, 200*b* may then advance to the cutting device 500.

Figure 6A:
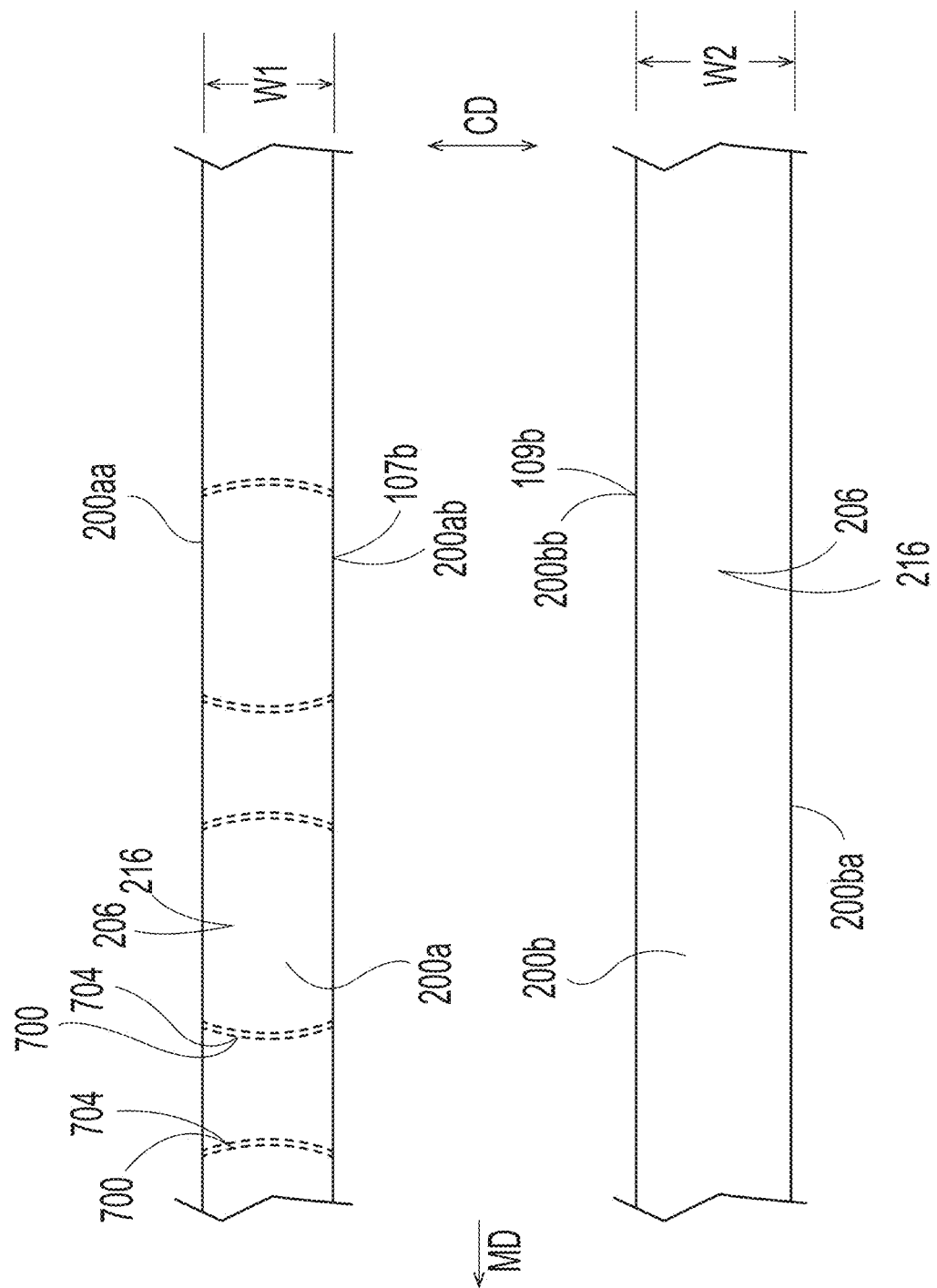
FIG. 6A is a view of continuous lengths of advancing first and second elastic belt laminates from FIG. 6 taken along line A-A.

With reference to FIGS. 6 and 6A, the first elastic laminate 200*a* includes an outer longitudinal edge 200*aa* and an inner longitudinal edge 200*ab* that may define a substantially constant width, W1, in the cross direction CD. The second elastic laminate 200*b* includes an outer longitudinal edge 200*ba* and an inner longitudinal edge 200*bb* that may define a substantially constant width, W2, in the cross direction CD. In some configurations, W1 and W2 may be equal or not equal. For example, in some configurations, W2 may be greater than W1. The first elastic laminate 200*a* is separated in the cross direction CD from the second elastic laminate 200*b* to define a gap between the inner longitudinal edge 200*ab* of the first elastic laminate 200*a* and the inner longitudinal edge 200*bb* of the second elastic laminate 200*b*. It is to be appreciated that the first elastic laminate 200*a* may correspond with and may be converted into the first elastic belt 106 of an assembled diaper pant 100P, and the second elastic laminate 200*b* may correspond with and may be converted into the first elastic belt 108 of an assembled diaper pant 100P. As such, the inner longitudinal edge 200*ab* of the first elastic laminate 200*a* may correspond with the inner laterally extending edge 107*b* of the first elastic belt 106, and the inner longitudinal edge 200*bb* of the second elastic laminate 200*b* may correspond with the inner laterally extending edge 109*b* of the second elastic belt 108. As discussed in more detail below, the first and second elastic laminates 200*a*, 200*b* advance from the diverter 352 and are combined with discrete chassis 102.

Referring now to FIGS. 6 and 6B, a continuous length of chassis assemblies 102*a* are advanced in a machine direction MD and define a width in a cross direction CD. The continuous length of chassis assemblies 102*a* may include: absorbent assemblies 140 sandwiched between topsheet material 138 and backsheet material 136; leg elastics; barrier leg cuffs; and the like.

As shown in FIGS. 6, 6B, and 6C1, the continuous length of chassis assemblies 102*a* may advance to a cutting apparatus 354 and may be cut into discrete chassis 102. In turn, the discrete chassis 102 are combined with the first elastic laminate 200*a* and the second elastic laminate 200*b*. In some configurations, the discrete chassis 102 advance from the cutting apparatus 354 to a carrier apparatus 356, generically represented in FIG. 6 by a dashed bracket. The carrier apparatus 356 may operate to change the orientation and/or advancement speed of the chassis 102 and combine the chassis 102 with the advancing first elastic laminate 200*a* and the second elastic laminate 200*b*, which may also be referred to herein as chassis-belt combing operations. It is to be appreciated that various forms of carrier apparatuses 356 may be used with the methods herein, such as for example, the carrier apparatuses disclosed in U.S. Pat. No. 7,587,966 and U.S. Patent Publication Nos. 2013/0270065 A1; 2013/0270069 A1; 2013/0270066 A1; and 2013/0270067 A1. In some embodiments, the carrier apparatus 356 may rotate at a variable angular velocity that may be changed or adjusted by a controller in order to change the relative placement of the chassis 102 and the advancing belt laminates 200*a*, 200*b*.

In an example operation shown in FIGS. 6 and 6C1, after the discrete absorbent chassis 102 are cut by the cutting apparatus 354, the carrier apparatus 356 advances the discrete chassis 102 in the machine direction MD in the orientation shown in FIG. 6C1. The carrier apparatus 356 also changes the orientation of the advancing chassis 102. In changing the chassis orientation, the carrier apparatus 356 may turn each chassis 102 such that the lateral axis 126 of the chassis 102 is parallel or generally parallel with the machine direction MD, such as shown in FIG. 6C2. The carrier apparatus 356 may also change the speed at which the chassis 102 advances in the machine direction MD to a different speed. FIG. 6C2 shows the orientation of the chassis 102 on the carrier apparatus 308 while advancing in the machine direction MD. More particularly, FIG. 6C2 shows the chassis 102 with the lateral axis 126 of the chassis 102 generally parallel with the machine direction MD. As shown in FIG. 6, adhesive 358 may be intermittently applied to the first and second belt laminates 200*a*, 200*b* before combining with the discrete chassis 102 from the carrier apparatus 356. It is to be appreciated that adhesive 358 may comprise one or more adhesives that may be applied by one or more adhesive applicators.

As discussed below with reference to FIGS. 6, 6D1, 6D2, 6E, and 6F, the discrete chassis 102 are transferred from the carrier apparatus 356 and combined with advancing, continuous lengths of belt laminates 200*a*, 200*b*, which are subsequently cut to form first and second elastic belts 106, 108 on diapers 100.

As shown in FIGS. 6, 6D1, and 6D2, the chassis 102 are transferred from the carrier apparatus 356 and combined with continuous lengths of advancing first elastic laminate 200*a* and second elastic laminate 200*b*. The chassis 102 are spaced apart from each other along the machine direction MD. The first waist region 116 of the chassis 102 may be bonded with the second substrate 208 of the first elastic laminate 200a, and the second waist region 118 of the chassis 102 may be bonded with the second substrate 208 of the second elastic laminate 200b. As previously mentioned, the first elastic laminate 200a may correspond with and may be converted into the first elastic belt 106 of an assembled diaper pant 100P, and the second elastic laminate 200b may correspond with and may be converted into the first elastic belt 108 of an assembled diaper pant 100P. As such, the first substrate 204 of the first elastic laminate 200a and the second elastic laminate 200b may correspond with the first substrate 162 on the first elastic belt 106 and the second elastic belt 108, respectively. And the second substrate 206 of the first elastic laminate 200a and the second elastic laminate 200b may correspond with the second substrate 164 on the first elastic belt 106 and the second elastic belt 108, respectively.

As shown in FIG. 6, the combined chassis 102, first belt laminate 200a, and second belt laminate 200b advance to an edge transformation apparatus 360. In some configurations, the edge transformation apparatus 360 may be configured as a folding apparatus that operates to fold the first and/or second belt laminates 200a, 200b in the cross direction CD along fold lines that extend along the machine direction MD, which may also be referred to herein as waist edge folding operations. For example, as shown in FIGS. 6D1 and 6D2, the edge transformation apparatus 360 operates to fold the first substrate 204 on the first elastic laminate 200a longitudinally to position the second surface 212 of the first extended portion 204c of the first substrate 204 in a facing relationship with the first surface 214 of the second substrate 206. The edge transformation apparatus 360 also operates to fold the first substrate 204 on the second elastic laminate 200b longitudinally to position the second surface 212 of the second extended portion 204d of the first substrate 204 in a facing relationship with the first surface 214 of the second substrate 206.

As such, the edge transformation apparatus 360 creates a fold line 204h in the first belt laminate 200a that extends in the machine direction MD. The edge transformation apparatus 360 also creates a fold line 204h in the second belt laminate 200b that extends in the machine direction MD. In turn, the fold line 204h in the first elastic laminate 200a may correspond with the fold line 162h that defines an outer longitudinal edge 107a of the first elastic belt 106 in an assembled diaper pant 100P, and the fold line 204h in the second elastic laminate 200b may correspond with the fold line 162h that defines an outer longitudinal edge 109a of the second elastic belt 108 in an assembled diaper pant 100P as discussed above with reference to FIGS. 3A and 3B.

As shown in FIG. 6D2, the edge transformation apparatus 360 forms a folded portion 204g in the first belt laminate 200a that extends between the first outer longitudinal edge 204a of the first substrate 204 and the fold line 200h. And the edge transformation apparatus 360 forms a folded portion 204g in the second belt laminate 200b that extends between the second longitudinal edge 204b of the first substrate 204 and the fold line 200h. As shown in FIG. 6D2, the folded portions 204g of the first and second elastic laminates 200a, 200b are folded so as to overlap the first and/or second laterally extending end edges 144, 146 and topsheet 138 of each chassis 102. In turn, the folded portions 204g in the first elastic laminate 200a may correspond with the folded portion 162g of the first elastic belt 106 in an assembled diaper pant 100P, and the fold portion 204g in the second elastic laminate 200b may correspond with the folded portion 162g of the second elastic belt 108 in an assembled diaper pant 100P as discussed above with reference to FIGS. 3A and 3B. It is to be appreciated that the folded portions 204g, the opposing end regions of the topsheets 138, and the first surface 214 of the second substrate 206 may be bonded together in various ways, such as with adhesive and/or mechanical bonds.

Referring back to FIGS. 6, 6D1, and 6D2 a continuous length of absorbent articles 100a are defined by multiple discrete chassis 102 spaced from each other along the machine direction MD and connected with each other by the second belt laminate 200b and the first belt laminate 200a. As shown in FIG. 6, the continuous length of absorbent articles 100a may advance from the edge transformation apparatus 360 to a folding apparatus 362. At the folding apparatus 362, each chassis 102 is folded in the cross direction CD parallel to or along a lateral axis 126 to place the first waist region 116, and specifically, the inner, body facing surface 132 into a facing, surface to surface orientation with the inner, body surface 132 of the second waist region 118. The folding of the chassis also positions the second belt laminate 200b extending between each chassis 102 in a facing relationship with the first belt laminate 200a extending between each chassis 102. It is to be appreciated that the folding apparatus 364 may be configured in various ways, such as disclosed for example in U.S. Patent Publication Nos. 2013/0203580 A1 and 2017/0304124 A1, which are incorporated by reference herein.

As shown in FIGS. 6 and 6E, the folded discrete chassis 102 connected with the first and second belt laminates 200a, 200b may advance from the folding apparatus 362 to a bonder apparatus 364. The bonder apparatus 364 operates to form bonded regions 250 spaced intermittently along the machine direction that bond first and second elastic laminates 200a, 200b together, which may also be referred to herein as side seaming operations. It is to be appreciated that the bonder apparatus 364 may be configured in various ways to create bonded regions in various ways, such as for example with heat, adhesives, pressure, and/or ultrasonics. It is also to be appreciated that in some embodiments, the apparatus 300 may also be configured to refastenably bond the first and second elastic laminates 200a, 200b together in addition to or as opposed to permanently bonding. Thus, the bonded regions 250 may be configured to be refastenable, such as with hooks and loops.

Referring now to FIGS. 6 and 6F, the continuous length of absorbent articles 100a are advanced from the bonder 364 to a cutting apparatus 366 where the first belt laminate 200a and the second belt laminate 200b are cut along the cross direction CD through the bonded regions 250 to create discrete absorbent articles 100 with first and second bonded regions 250a, 250b, which may also be referred to herein as final knife cutting operations. As shown in FIG. 6F, the first belt laminate 200a and the second belt laminate 200b are cut into discrete pieces to form the first and second elastic belts 106, 108, each having a pitch length, PL, extending along the machine direction MD. As such, bonded region 250a may correspond with and form a first side seam 178 on an absorbent article 100, and the bonded region 250b may correspond with and form a second side seam 180 on a subsequently advancing absorbent article. In addition, the assembled absorbent articles 100P may also include frangible pathways 700 in the first elastic belt 106 and/or the second elastic belt 108, such as discussed above with reference to FIGS. 4A-5B.

As discussed above with reference to FIGS. 6, 9, and 10 and as discussed below with reference to FIGS. 11A-12B, the cutting device 500 may form frangible pathways 700 in various ways and in various shapes and may be positioned in various locations on the first elastic laminate 200a and/or the second elastic laminate 200b relative to other features and/or elements formed in other process operations, such as for example: chassis-belt combining operations; waist edge folding operations; side seaming operations; and final knife cutting operations.

Figure 11B:
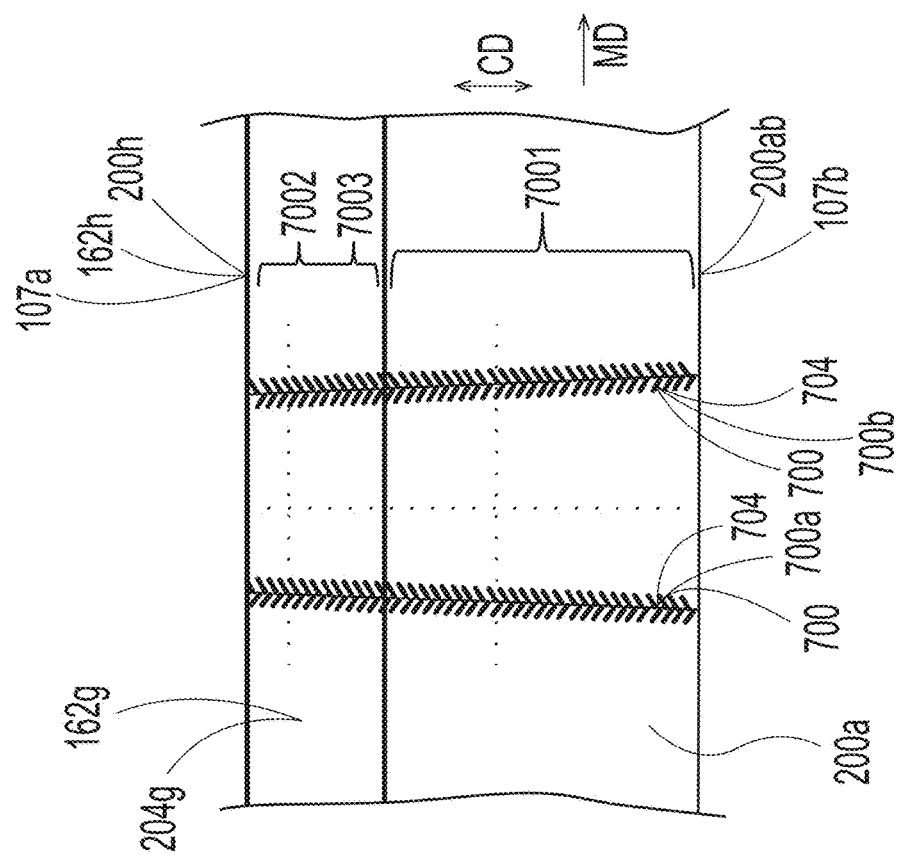
FIG. 11B is a side view of the elastic laminate of FIG. 11A after waist edge folding operations.
Figure 11A:
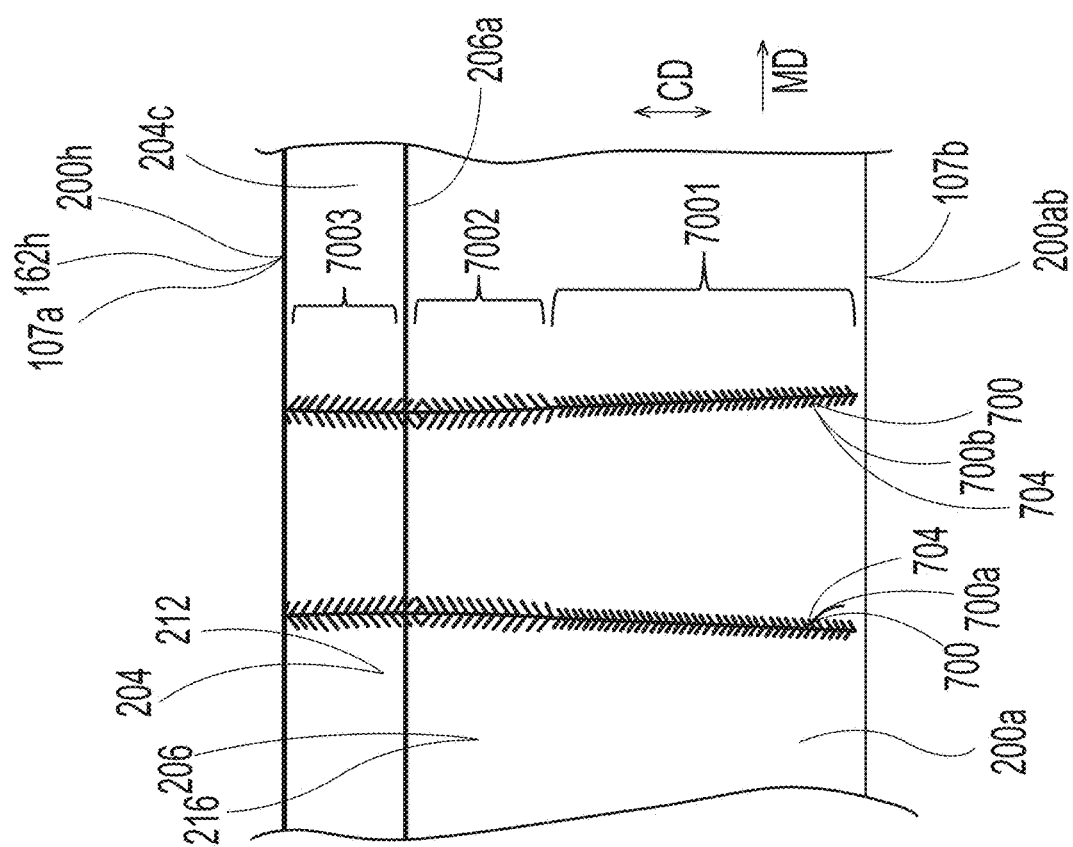
FIG. 11A is a side view of an elastic laminate with first configurations of frangible pathways.

FIG. 11A shows an example of first and second frangible pathways 700a, 700b that may be formed on the first elastic substrate 200a by the cutting device 500 discussed above with reference to FIGS. 9 and 10. The frangible pathways 700 in FIG. 11A extend in cross direction CD from the inner longitudinal edge 200ab of the first elastic laminate 200a to the outer longitudinal edge 200aa. The frangible pathways 700 herein may each include one or more regions 7000 (such as 7001, 7002, . . . , 700n) comprising different types, quantities, sizes, and/or orientations of lines of weakness 704. For example, the frangible pathways 700a, 700b may each include a first region 7001 extending in the cross direction CD from adjacent the inner longitudinal edge 200ab of the first elastic laminate 200a to a second region 7002. As shown in FIG. 11A, the second region 7002 comprises a greater length than the first region 7001 extending in the machine direction MD. As such, the frangible pathway may transition from the first region to the second region where the machine direction length increases in the machine direction MD. The second region 7002 may extend in the cross direction CD from the first region 7001 and transition to the third region 7003 adjacent the first longitudinal edge 206a of the second substrate 206. And the third region 7003 may extend in the cross direction CD from the second region 7002 to adjacent the first outer longitudinal edge 204a of the first substrate 204. As such, the third region 7003 may extend from adjacent the first longitudinal edge 206a of the second substrate 206 across the extended portion 204c of the first substrate 204 to adjacent the first outer longitudinal edge 204a of the first substrate 204.

It is to be appreciated that the first region 7001, the second region 7002, and the third region 7003 may define different shapes; different lengths along the machine direction MD; and/or define different widths along the cross direction CD. In addition, the first region 7001, the second region 7002, and the third region 7003 may be oriented in various different ways relative to the machine direction MD and/or cross direction CD. For example, as discussed above, the frangible pathway 700 comprises a plurality of lines of weakness 704. As shown in FIG. 11A, the lines of weakness 704 in the third region 7003 may be sized, shaped, oriented, arranged, and/or positioned to define a pattern that mirrors a pattern of the lines of weakness 704 in the second region 7002 about a reference line extending in the machine direction MD, such as for example, with respect to the first longitudinal edge 206a of the second substrate 206. As such, when the first elastic laminate 200a is subjected to waist edge folding operations, such as discussed above with reference to FIGS. 6D1 and 6D2, when the extended portion 204c is folded along the fold line 200h, the lines of weakness 704 in the third region 7003 may overlap and may align with the lines of weakness 704 in the second region 7002, such as shown in FIG. 11B.

As discussed above, frangible pathways 700 may be positioned in various locations on the first elastic laminate 200a and/or the second elastic laminate 200b relative to other features and/or elements formed in other process operations, such as for example: chassis-belt combining operations; waist edge folding operations; side seaming operations; and final knife cutting operations. For example, FIG. 11C illustrates an example of a bonded region 250 formed during side seaming operations with a bonder apparatus 364, such as described above with reference to FIGS. 6 and 6E. As shown in FIG. 11C, the bonded region 250 may be positioned between the first frangible pathway 700a and the second frangible pathway 700b. Thus, as shown in FIG. 11D, the first frangible pathway 700a may be adjacent a first side seam 178 of an assembled diaper pant 100P and the second frangible pathway 700b may be adjacent a second side seam 180 of another assembled diaper pant 100P subsequent to the final knife cutting operations discussed above with reference to FIGS. 6 and 6G.

Figure 12A:
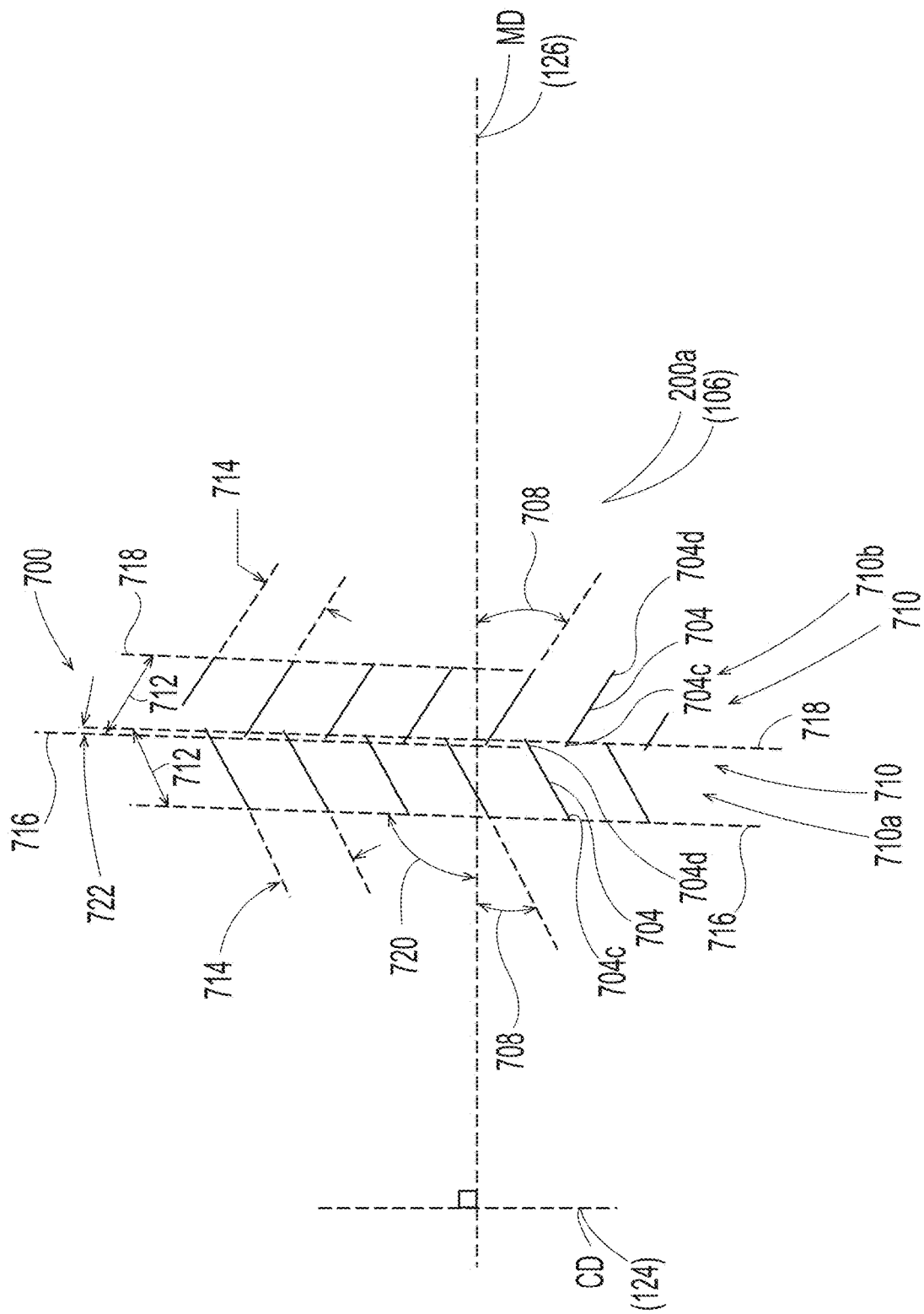
FIG. 12A is a detailed partial view of a frangible pathway in an elastic laminate showing details of lines of weakness.
Figure 12B:
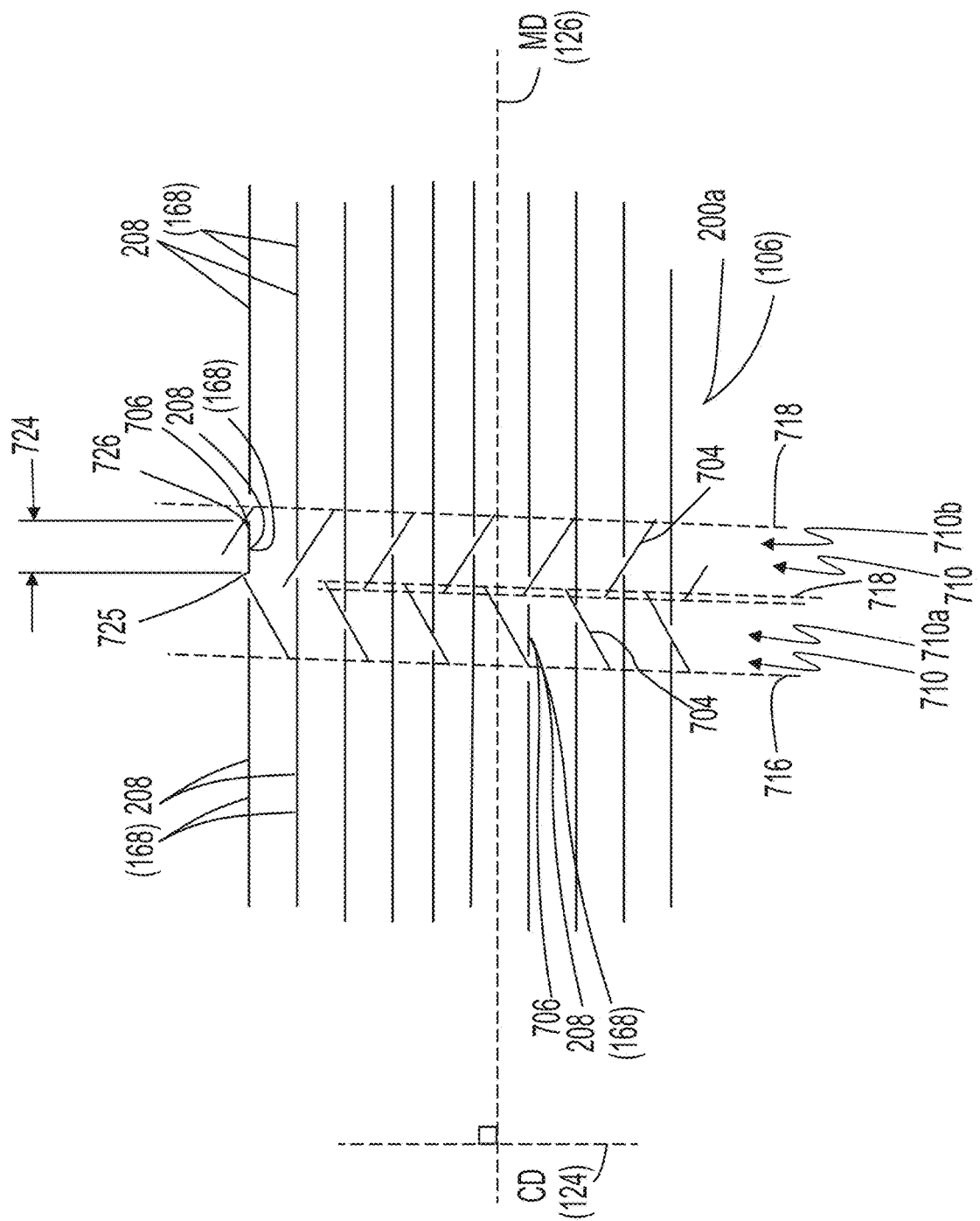
FIG. 12B is a detailed view of a portion of a frangible pathway showing details of lines of weakness and severed elastic strands therein.

As discussed above, the frangible pathways 700 may include lines of weakness 704 that may be sized, shaped, oriented, arranged, and/or positioned in various different ways and/or so as to define various patterns. FIGS. 12A and 12B show detailed views of lines of weakness 704 of a portion of a frangible pathway 700 such as discussed above, for example, in the first belt 106 and the second belt of the pant diaper 100P illustrated in FIGS. 11A-11D. As shown in FIGS. 12A and 12B, the lines of weakness 704 in the frangible pathway 700 cut and separate the elastic strands 208 (168) at least once. The lines of weakness 704 in the frangible pathway 700 may also cut and separate the elastic strands into discrete pieces 706. For the purposes of clarity, the elastic strands 208 (168) and the discrete pieces 706 of elastic strands 208 (168) are not shown in FIG. 12A. The lines of weakness 704 are faded in FIG. 12B to accentuate the visibility of the elastic strands 208 (168) and the discrete pieces 706 of elastic strands 208 (168). In some configurations, the lines of weakness 704 penetrate through the elastic strands 208 (168), the first substrate 204, and the second substrate 164. In some configurations, the lines of weakness 704 may penetrate through the elastic strands 208 (168) and only one of the first substrate 204 (162) and the second substrate 206 (164). In some configurations, the lines of weakness 704 may penetrate through the elastic strands 208 (168) bond the first substrate 204 (162) with the second substrate 206 (164). In some configurations, the lines of weakness 704 may sever the elastic strands 208 (168) in such a manner that the severed elastic strands 208 (168) do not retract from each other at the line of weakness and are not separated from each other at the line of weakness 704. In some configurations, the lines of weakness 704 may damage the elastic strands 208 (168) at the line of weakness 704 in such a manner that some portion of the damaged elastic strands 208 (168) are present in and/or extend through the line of weakness 704.

It is to be appreciated that the descriptions provided with respect to details relating to the frangible pathways 700 and lines of weakness 704 described with reference to FIGS. 12A and 12B are also applicable to the frangible pathways 700 shown in other Figures described herein. When applying the descriptions of the frangible pathways 700 of the elastic laminate 200a in FIGS. 12A and 12B to the frangible pathways 700 and the lines of weakness 704 in Figures showing assembled diaper pants 100P, the orientations of the frangible pathways 700 and the lines of weakness 704 relative to the machine direction MD and cross direction CD, may be also taken relative to the lateral axis 126 and longitudinal axis 124, respectively, of the first belt 106 of an assembled diaper pant 100P.

It is to be appreciated that the lines of weakness 704 may be arranged in various orientations and sizes. For example, as shown in FIG. 12A the lines of weakness may be oriented to define an offset angle 708 relative to the machine direction MD. The size of the offset angle 708 may be configured to help minimize or prevent the separation of opposing sides 704a, 704b of the lines of weakness 704 when the elastic laminate 200a (108) is subjected to opposing forces in the machine directions or lateral directions, such as when the elastic belts 106, 108 are stretched laterally. In some configurations, offset angles 708 may be greater than 10 degrees and less than 80 degrees, specifically reciting all 1 degree increments within the above-recited range and all ranges formed therein or thereby.

With continued reference to FIG. 12A, the lines of weakness 704 may be arranged in rows 710 comprising at least a first row 710a and a second row 710b neighboring the first row 710a. The lines of weakness 704 in the first row 710a and the second row 710b may extend for a length 712 from a first end 704c to a second end 704d. In some configurations, the length 712 of each line of weakness 704 in the first row 710a and the second row 710b may be from about 1 mm to about 10 mm, specifically reciting all 0.1 mm increments within the above-recited range and all ranges formed therein or thereby. In some configurations, the lines of weakness 704 in the first row 710a and the lines of weakness 704 in the second row 710b are parallel to each other. The lines of weakness 704 in the first row 710a and/or second row 710b may be separated from each other by a cut line gap distance 714. In some configurations, the cut line gap distance 714 may be from about 1 mm to about 10 mm, specifically reciting all 0.1 mm increments within the above-recited range and all ranges formed therein or thereby. The first ends 704c of cut lines 704 in the first row 710b and the first ends 704c of lines of weakness 704 in the second row 710b may be aligned along first reference lines 716 that are oriented to define a row angle relative 720 to the lateral axis 126. In some configurations, the row angle 720 may be from about 0 degrees to about 90 degrees, specifically reciting all 1 degree increments within the above-recited range and all ranges formed therein or thereby. As shown in FIG. 12A, the second ends 704d of lines of weakness 704 in the first row 710a and the second ends 704d of lines of weakness 704 in the second row 710b may be aligned along second reference lines 718. In some configurations, the second reference 718 lines are parallel to the first reference lines 716. In addition, the second reference line 718 of the first row 710a may be separated from the first reference line 716 of the second row 710b by a row gap distance 722. When the second reference line 718 of the first row 710a is positioned downstream in the machine direction MD of the first reference line 716 of the second row 710b, the row gap distance 722 may be expressed as a positive number. When the second reference line 718 of the first row 710a is positioned upstream in the machine direction MD of the first reference line 716 of the second row 710b, the row gap distance 722 may be expressed as a negative number. In some configurations, the row gap distance 722 may be from about −10 mm to about 10 mm, specifically reciting all 0.1 mm increments within the above-recited range and all ranges formed therein or thereby.

As previously mentioned, the lines of weakness 704 in the frangible pathways 700 may cut some of the elastic strands 208 (168) once and may cut some of the elastic strands 208 (168) more than once to separate some of the elastic strands 208 (168) into discrete pieces 706. As shown in FIG. 12B, the discrete pieces 706 of elastic strands (208) 168 extend for an elastic piece length 724 between a first end 725 and a second end 726. In some configurations, the first elastic piece length 724 of the discrete pieces 706 may be defined by a distance extending may be defined by a distance extending laterally between lines of weakness 704 in the first row 710a and lines of weakness 704 in the second row 710b.

As previously mentioned, the elastic strands 168 may be continuously bonded with at least one of the first substrate 204 (162) and the second substrate 206 (164) or may be intermittently bonded with at least one of the first substrate 204 (162) and the second substrate 206 (164). As such, the discrete pieces 706 of elastic strands 208 (168) may be continuously bonded with at least one of the first substrate 204 (162) and the second substrate 206 (164) or may be intermittently bonded with at least one of the first substrate 204 (162) and the second substrate 206 (164). It is also to be appreciated that the elastic strands 208 (168) and the discrete pieces 706 of elastic strands 208 (168) may be bonded with adhesive applied to at least one of the first substrate 204 (162), the second substrate 206 (164), and the elastic strands 208 (168).

Figure 13:
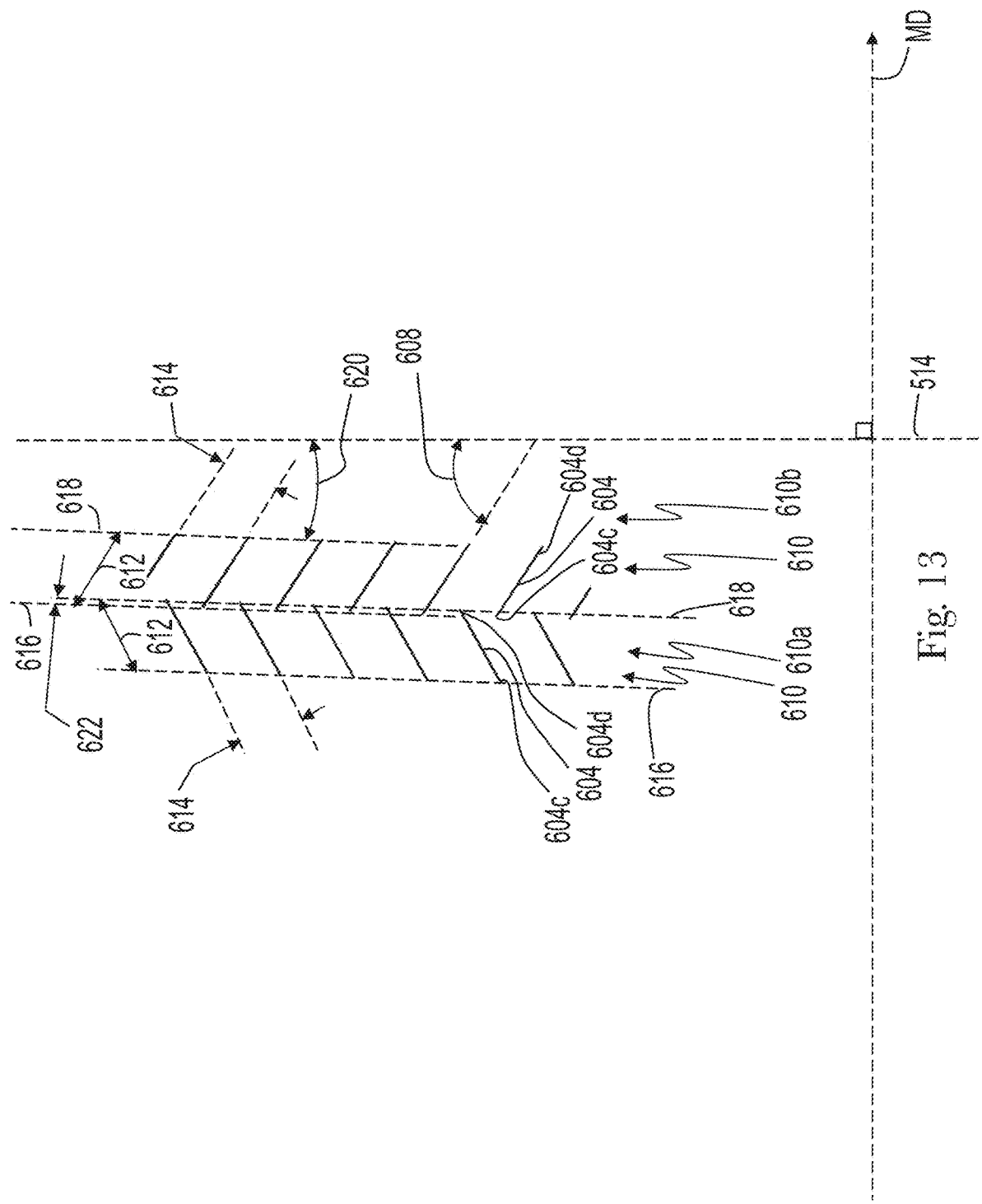
FIG. 13 is a detailed view of a cutting device showing details of blades thereon.

As mentioned above, the knife roll 502 may include blades 510 extending radially outward to blade edges 604 adapted to rotate about the axis 514. As such, the blade edges 604 may be oriented to cut the elastic strands 208 on the first substrate 200a to frangible pathways 700 in the elastic laminate 200a with corresponding lines of weakness 704 and discrete elastic pieces 706 such as described above with reference to FIGS. 12A and 12B. FIG. 13 shows an example orientation of a portion of a group of blade edges 604 on a knife roll 502. It is to be appreciated that the knife roll 502 may be configured to rotate at a variable angular velocity or a constant angular velocity and may be driven by a servo motor.

It is to be appreciated that the blade edges 604 may be arranged in various orientations and sizes. For example, as shown in FIG. 13 the blade edges 604 may be oriented to define an offset angle 608 relative to the rotation axis 514. In some configurations, offset angles 608 may be greater than 45 degrees and less than 90 degrees. With continued reference to FIG. 13, the blade edges 604 may be arranged in rows 610 comprising at least a first row 610a and a second row 610b neighboring the first row 610a. The blade edges in the first row 610a and the second row 610b may extend for a length 612 from a first end 604c to a second end 604d. In some configurations, the length 612 of each blade edge 604 in the first row 610a and the second row 610b may be from about 1 mm to about 10 mm, specifically reciting all 0.1 mm increments within the above-recited range and all ranges formed therein or thereby. In some configurations, the blade edges 604 in the first row 610a and the blade edges 604 in the second row 610b are parallel to each other. The 604 blade edges in the first row 610a and/or second row 610b may be separated from each other by a blade edge gap distance 614. In some configurations, the blade edge gap distance 614 may be from about 1 mm to about 10 mm, specifically reciting all 0.1 mm increments within the above-recited range and all ranges formed therein or thereby. The first ends 604c of blade edges 604 in the first row 610b and the first ends 604c of blade edges 604 in the second row 610b may be aligned along first reference lines 616 that are oriented to define a row angle relative 620 to the rotation axis 514. In some configurations, the row angle 620 may be from about 0 degrees to about 90 degrees, specifically reciting all 1 degree increments within the above-recited range and all ranges formed therein or thereby. As shown in FIG. 13, the second ends 604d of blade edges 604 in the first row 610a and the second ends 604d of blade edges 604 in the second row 610b may be aligned along second reference lines 618. In some configurations, the second reference 618 lines are parallel to the first reference lines 616. In addition, the second reference line 618 of the first row 610a may be separated from the first reference line 616 of the second row 610*b* by a row gap distance 622. When the second reference line 618 of the first row 610*a* is positioned upstream in the machine direction MD of the first reference line 616 of the second row 610*b*, the row gap distance 622 may be expressed as a positive number. When the second reference line 618 of the first row 610*a* is positioned downstream in the machine direction MD of the first reference line 616 of the second row 610*b*, the row gap distance 622 may be expressed as a negative number. In some configurations, the row gap distance 622 may be from about −10 mm to about 10 mm, specifically reciting all 0.1 mm increments within the above-recited range and all ranges formed therein or thereby.

Figure 14A:
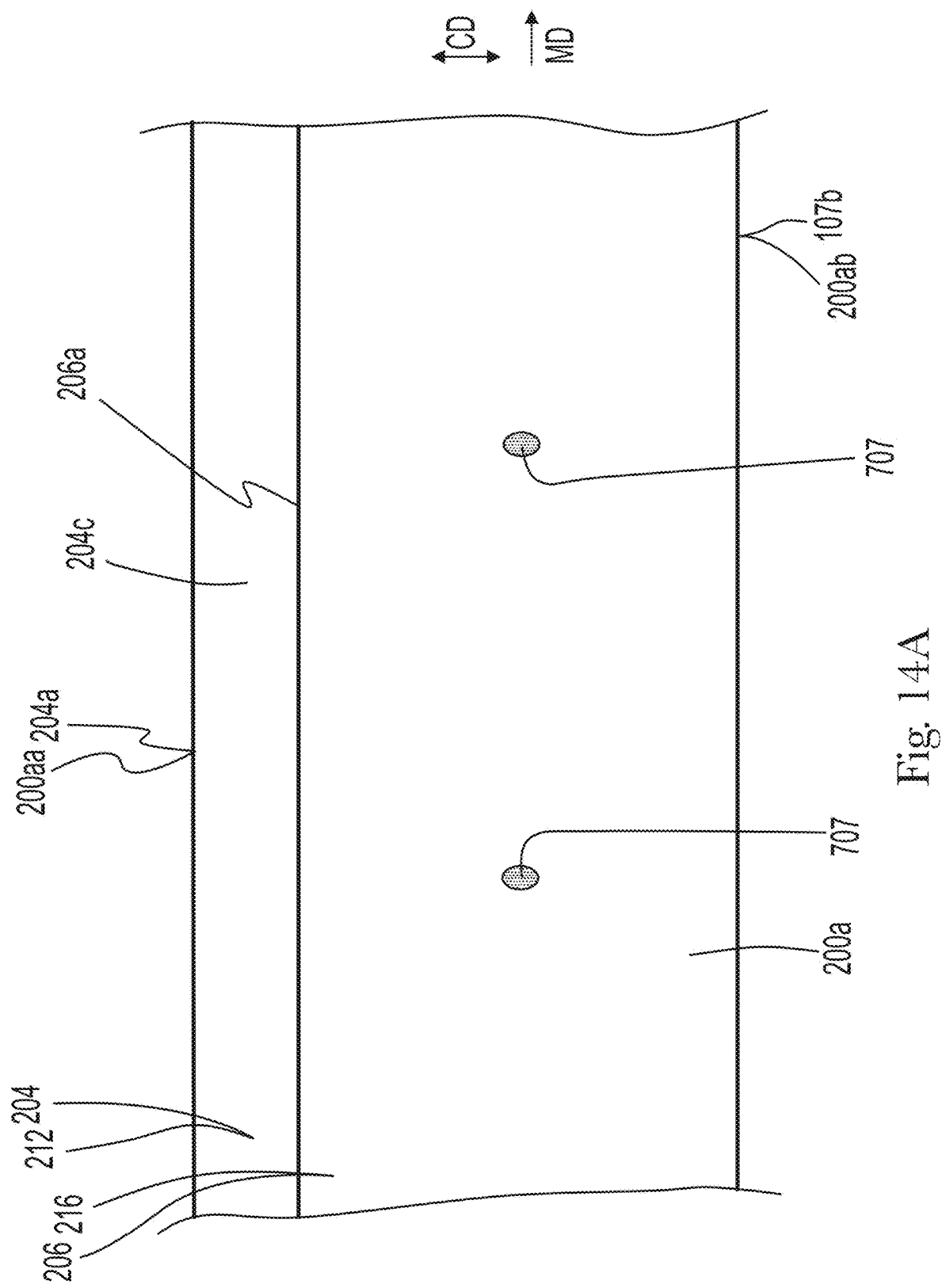
FIG. 14A is a side view of an elastic laminate with fastener components bonded thereto.

FIGS. 14A-14D2 provide illustrations of additional examples of how the cutting device 500 discussed above with reference to FIGS. 6, 9, and 10A may form frangible pathways 700 in various ways and in various shapes that may be positioned in various locations on the first elastic laminate 200*a* and/or the second elastic laminate 200*b* relative to other features and/or elements formed in other process operations, such as for example: chassis-belt combining operations and waist edge folding operations.

FIG. 14A shows the first elastic substrate 200*a* advancing in a machine direction MD upstream of the cutting device 500 discussed above with reference to FIGS. 9 and 10A. The first elastic substrate 200*a* includes fastener components 707, such as discussed above with reference to FIGS. 5A-5C, that may be bonded with the second surface 216 of the second substrate 206. It is to be appreciated that such fastener components 707 may be bonded with first elastic laminate 200*a* in various ways and at various times relative to other assembly operations. For example, FIG. 6 shows a bonding apparatus 368 that may apply fastener components 707 to the advancing elastic laminate 200. As shown in FIG. 6, the bonding apparatus 368 may positioned upstream of the cutting device 500. It is to be appreciated that the bonding apparatus 368 may also be positioned in other locations of the assembly process, for example, the bonding apparatus 368 may positioned downstream of the cutting device 500.

Figure 14B:
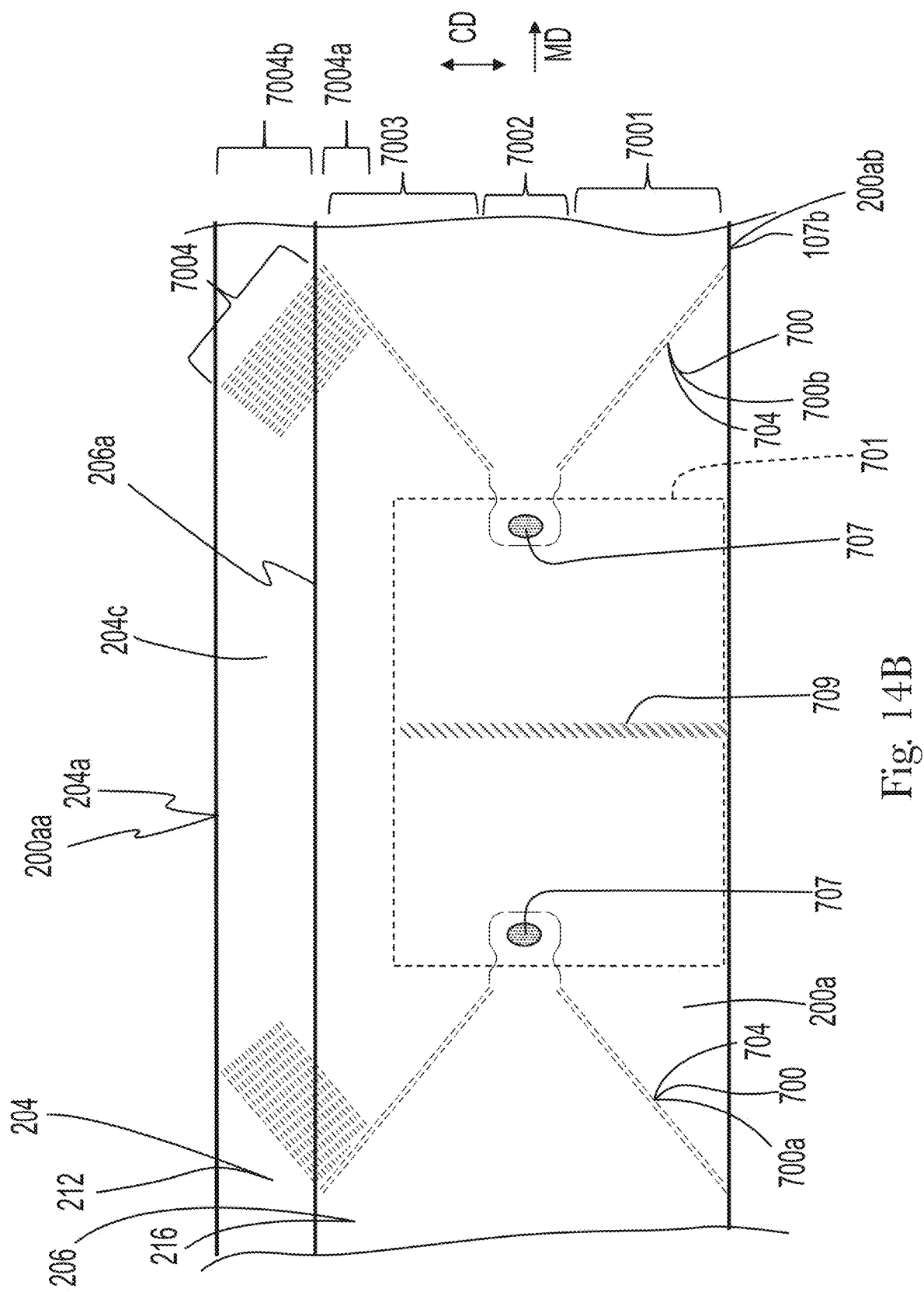
FIG. 14B is a side view of second configurations of frangible pathways on the elastic laminate of FIG. 14A.

Referring now to FIG. 14B, examples of first and second frangible pathways 700*a*, 700*b* may be formed on the first elastic substrate 200*a* of FIG. 14A by the cutting device 500 discussed above with reference to FIGS. 9 and 10. FIG. 14B also illustrates examples of a tummy cut region 709 and a low-stretch zone 701 that may be formed by the cutting device 500. The frangible pathways 700 in FIG. 14B extend in cross direction CD from the inner longitudinal edge 200*ab* of the first elastic laminate 200*a* to the outer longitudinal edge 200*aa* and may comprise various regions. As discussed above, the frangible pathways 700 herein may include one or more regions 7000 (such as 7001, 7002, . . . , 700*n*) comprising different types, quantities, sizes, and/or orientations of lines of weakness 704. For example, the frangible pathways 700*a*, 700*b* may each include a first region 7001 extending in the cross direction CD from adjacent the inner longitudinal edge 200*ab* of the first elastic laminate 200*a* to a second region 7002. As shown in FIG. 14B, the second region 7002 may include lines of weakness 704 that extend in the machine direction MD and cross direction CD to partially surround the fastener component 707. The frangible pathways 700 in FIG. 14B may also include a third region 7003 that extends in the cross direction CD from the second region 7002 to adjacent the first longitudinal edge 206*a* of the second substrate 206. In addition, the frangible pathways 700 may include a fourth region 7004 that may comprise a cluster of lines of weakness 704. The fourth region 7004 may include a first subregion 7004*a* and a second subregion 7004*b*. The first subregion 7004*a* may be positioned between the third region 7003 and the first longitudinal edge 206*a* of the second substrate 206, and the second subregion 7004*b* may extend between the first longitudinal edge 206*a* of the second substrate 206 across the extended portion 204*c* of the first substrate 204 to adjacent the first outer longitudinal edge 204*a* of the first substrate 204.

It is to be appreciated that the first region 7001, the second region 7002, the third region 7003, and the fourth region 7004 may define different shapes; different lengths along the machine direction MD; and/or define different widths along the cross direction CD. In addition, the first region 7001, the second region 7002, the third region 7003, and the fourth region 7004 may be oriented in various different ways relative to the machine direction MD and/or cross direction CD. For example, as discussed above, the frangible pathways 700 comprise a plurality of lines of weakness 704. As shown in FIG. 14B, the lines of weakness 704 in the third region 7003 may be sized, shaped, oriented, arranged, and/or positioned to define a pattern that mirrors a pattern of the lines of weakness 704 in the first region 7001 about a reference line extending in the machine direction MD, such as for example, with respect a reference line extending in the machine direction MD that bisects the second region 7002. Further, the lines of weakness 704 in the first frangible pathway 700*a* may be sized, shaped, oriented, arranged, and/or positioned to define a pattern that mirrors a pattern of the lines of weakness 704 in the second frangible pathway 700*b* about a reference line extending in the cross direction CD, such as for example, with respect to the tummy cut region 709.

Figure 14C:
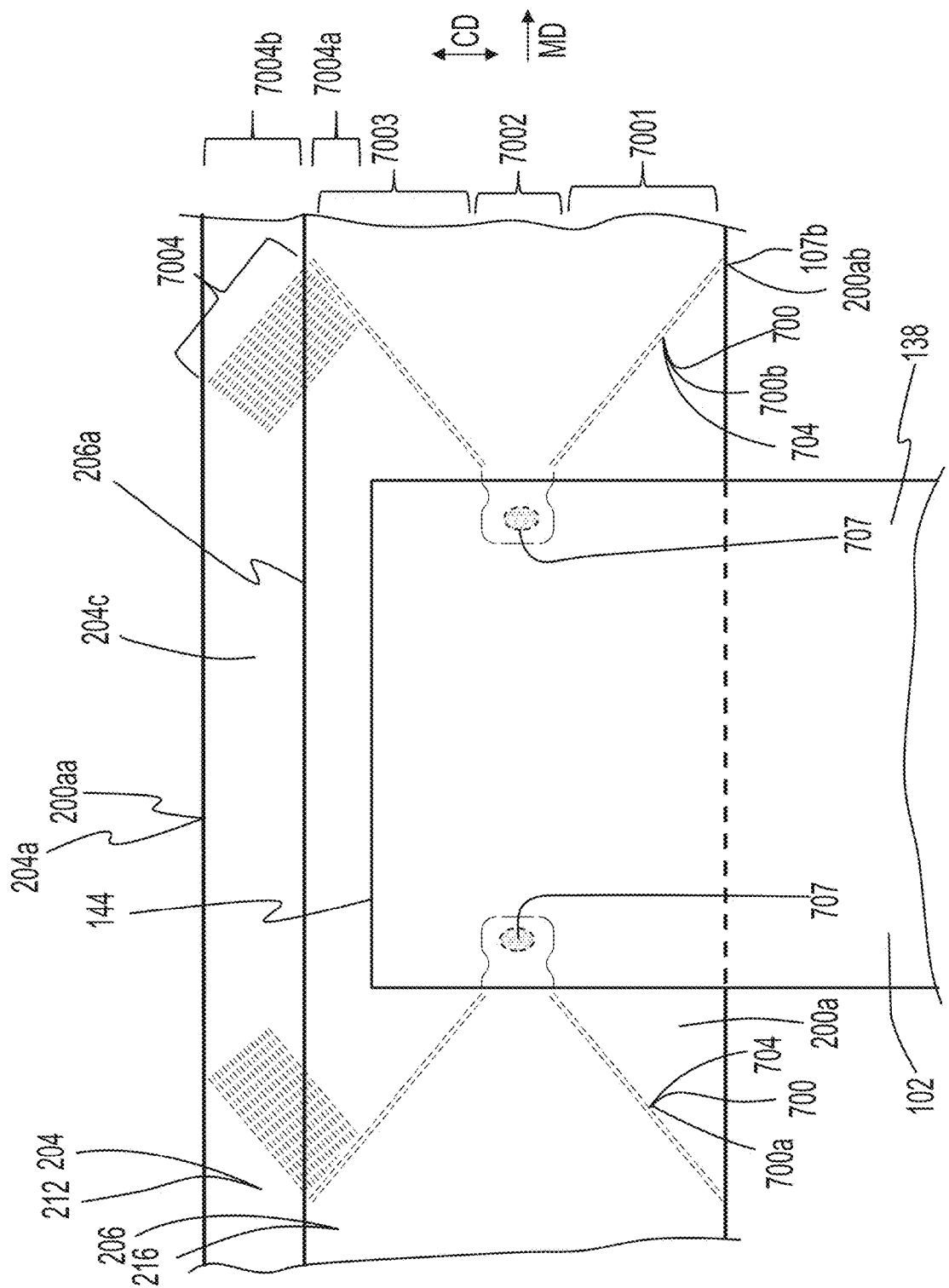
FIG. 14C is a side view of the elastic laminate of FIG. 14B after chassis combing operations.

As discussed above, frangible pathways 700 may be positioned in various locations on the first elastic laminate 200*a* and/or the second elastic laminate 200*b* relative to other features and/or elements formed in other process operations, such as for example: chassis-belt combining operations. For example, FIG. 14C illustrates an example of a chassis 102 positioned on the first elastic laminate 200*a* after chassis combining operations, such as described above with reference to FIGS. 6, 6C1, 6C2, and 6D1. As shown in FIG. 14C, the chassis 102 may be positioned between the first frangible pathway 700*a* and the second frangible pathway 700*b*. In addition, portions of the first frangible pathway 700*a* and the second frangible pathway 700*b* may overlap with the chassis 102. For example, the second regions 7002 of the first frangible pathway 700*a* and the second frangible pathway 700*b* may be located relative the chassis 102 such that the fastening elements 707 are sandwiched between the first elastic laminate 200*a* and the chassis 102. In a particular example, the fastening elements 707 may be sandwiched between the first elastic laminate second surface 216 of the second substrate 206 and the backsheet 134 of the chassis 102.

FIGS. 14D1 and 14D2 show an example of the chassis 102 and first elastic laminated 200*a* after being subjected to waist edge folding operations, such as discussed above with reference to FIGS. 6D1 and 6D2. As illustrated, when the extended portion 204*c* is folded along the fold line 200*h*, the folded portion 204*g* of the first elastic laminates 200*a* are folded so as to overlap the first laterally extending end edge 144 of the chassis 102. In addition, the second subregions 7004*b* of the fourth regions 7004 of first and second frangible pathways 700*a*, 700*b* are positioned on the folded portion 204*g*, as shown in FIG. 14D1. And the first subregions 7004*a* of the fourth regions 7004 of first and second frangible pathways 700*a*, 700*b* are positioned adjacent the fold line 200*h*, as shown in FIG. 14D2. Further, as shown in FIGS. 14D1 and 14D2, a plurality of the lines of weakness 704 of the fourth region 7004 may generally align with the lines of weakness 704 of the third region 7003. Because the fourth region 7004 comprises a cluster of lines of weakness 704, highly exact alignment of the lines of weakness 704 of the third and fourth regions 7003, 7004 may not be required during waist edge folding operations.

Figure 15B:
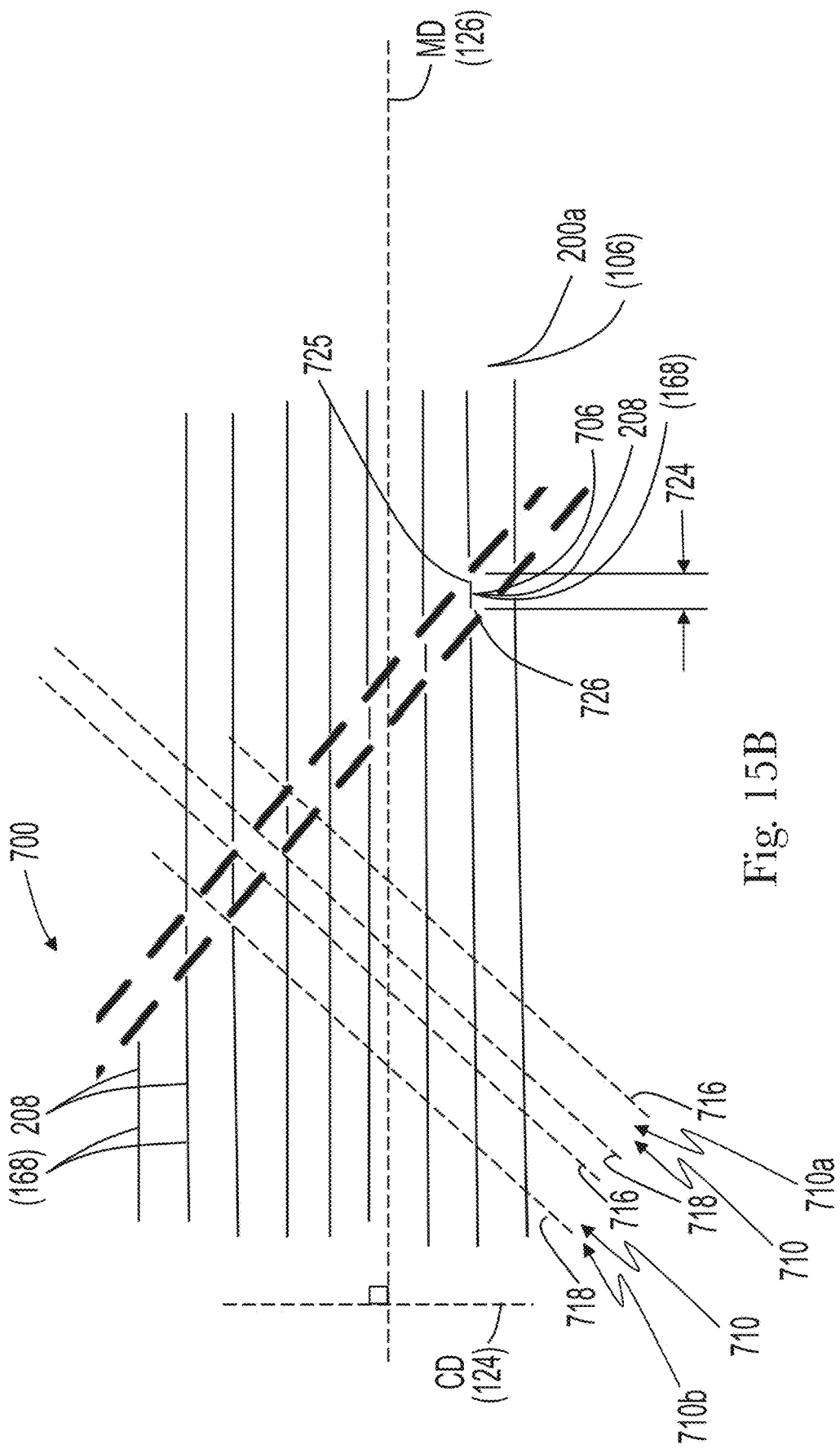
FIG. 15B is a detailed view of a portion of the frangible pathway of FIG. 15A showing details of lines of weakness and severed elastic strands therein.

As discussed above, the frangible pathways 700 may include lines of weakness 704 that may be sized, shaped, oriented, arranged, and/or positioned in various different ways and/or so as to define various patterns. FIGS. 15A and 15B show detailed views of lines of weakness 704 of a portion of a frangible pathway 700 such as discussed above, for example, in FIG. 14B as may be applied in the first belt 106 and the second belt of the pant diaper 100P as described above. As shown in FIGS. 15A and 15B, the lines of weakness 704 in the frangible pathway 700 cut and separate the elastic strands 208 (168) at least once. The lines of weakness 704 in the frangible pathway 700 may also cut and separate the elastic strands into discrete pieces 706. For the purposes of clarity, the elastic strands 208 (168) and the discrete pieces 706 of elastic strands 208 (168) are not shown in FIG. 15A. The lines of weakness 704 are faded in FIG. 15B to accentuate the visibility of the elastic strands 208 (168) and the discrete pieces 706 of elastic strands 208 (168). In some configurations, the lines of weakness 704 penetrate through the elastic strands 208 (168), the first substrate 204, and the second substrate 164. In some configurations, the lines of weakness 704 may penetrate through the elastic strands 208 (168) and only one of the first substrate 204 (162) and the second substrate 206 (164). In some configurations, the lines of weakness 704 may penetrate through the elastic strands 208 (168) bond the first substrate 204 (162) with the second substrate 206 (164).

It is to be appreciated that the descriptions provided with respect to details relating to the frangible pathways 700 and lines of weakness 704 described with reference to FIGS. 15A and 15B are also applicable to the frangible pathways 700 shown in other Figures described herein. When applying the descriptions of the frangible pathways 700 of the elastic laminate 200*a* in FIGS. 15A and 15B to the frangible pathways 700 and the lines of weakness 704 in Figures showing assembled diaper pants 100P, the orientations of the frangible pathways 700 and the lines of weakness 704 relative to the machine direction MD and cross direction CD, may be also taken relative to the lateral axis 126 and longitudinal axis 124, respectively, of the first belt 106 of an assembled diaper pant 100P.

It is to be appreciated that the lines of weakness 704 may be arranged in various orientations and sizes. For example, as shown in FIG. 15A the lines of weakness may be oriented to define an offset angle 708 relative to the machine direction MD. The size of the offset angle 708 may be configured to help minimize or prevent the separation of opposing sides 704*a*, 704*b* of the lines of weakness 704 when the elastic laminate 200*a* (108) is subjected to opposing forces in the machine directions or lateral directions, such as when the elastic belts 106, 108 are stretched laterally. In some configurations, offset angles 708 may be greater than 0 degrees and less than 90 degrees.

With continued reference to FIG. 15A, the lines of weakness 704 may be arranged in rows 710 comprising at least a first row 710*a* and a second row 710*b* neighboring the first row 710*a*. The lines of weakness 704 in the first row 710*a* and the second row 710*b* may extend for a length 712 from a first end 704*c* to a second end 704*d*. In some configurations, the length 712 of each line of weakness 704 in the first row 710*a* and the second row 710*b* may be from about 1 mm to about 50 mm, specifically reciting all 0.1 mm increments within the above-recited range and all ranges formed therein or thereby. In some configurations, the lines of weakness 704 in the first row 710*a* and the lines of weakness 704 in the second row 710*b* are parallel to each other. The lines of weakness 704 in the first row 710*a* and/or second row 710*b* may be separated from each other by a cut line gap distance 714. In some configurations, the cut line gap distance 714 may be from about 1 mm to about 50 mm, specifically reciting all 0.1 mm increments within the above-recited range and all ranges formed therein or thereby. The first ends 704*c* of cut lines 704 in the first row 710*b* and the first ends 704*c* of lines of weakness 704 in the second row 710*b* may be aligned along first reference lines 716 that are oriented to define a row angle relative 720 to the lateral axis 126. In some configurations, the row angle 720 may be from about 0 degrees to about 90 degrees, specifically reciting all 1 degree increments within the above-recited range and all ranges formed therein or thereby. As shown in FIG. 15A, the second ends 704*d* of lines of weakness 704 in the first row 710*a* and the second ends 704*d* of lines of weakness 704 in the second row 710*b* may be aligned along second reference lines 718. In some configurations, the second reference 718 lines are parallel to the first reference lines 716. In addition, the second reference line 718 of the first row 710*a* may be separated from the first reference line 716 of the second row 710*b* by a row gap distance 722. When the second reference line 718 of the first row 710*a* is positioned downstream in the machine direction MD of the first reference line 716 of the second row 710*b*, the row gap distance 722 may be expressed as a positive number. When the second reference line 718 of the first row 710*a* is positioned upstream in the machine direction MD of the first reference line 716 of the second row 710*b*, the row gap distance 722 may be expressed as a negative number. In some configurations, the row gap distance 722 may be about −10 mm to about 10 mm, specifically reciting all 0.1 mm increments within the above-recited range and all ranges formed therein or thereby.

As previously mentioned, the lines of weakness 704 in the frangible pathways 700 may cut some of the elastic strands 208 (168) once and may cut some of the elastic strands 208 (168) more than once to separate some of the elastic strands 208 (168) into discrete pieces 706. As shown in FIG. 15B, the discrete pieces 706 of elastic strands (208) 168 extend for an elastic piece length 724 between a first end 725 and a second end 726. In some configurations, the first elastic piece length 722 of the discrete pieces 706 may be defined by a distance extending may be defined by a distance extending laterally between lines of weakness 704 in the first row 710*a* and lines of weakness 704 in the second row 710*b*. As previously mentioned, the elastic strands 168 may be continuously bonded with at least one of the first substrate 204 (162) and the second substrate 206 (164) or may be intermittently bonded with at least one of the first substrate 204 (162) and the second substrate 206 (164). As such, the discrete pieces 706 of elastic strands 208 (168) may be continuously bonded with at least one of the first substrate 204 (162) and the second substrate 206 (164) or may be intermittently bonded with at least one of the first substrate 204 (162) and the second substrate 206 (164). It is also to be appreciated that the elastic strands 208 (168) and the discrete pieces 706 of elastic strands 208 (168) may be bonded with adhesive applied to at least one of the first substrate 204 (162), the second substrate 206 (164), and the elastic strands 208 (168).

Figure 16:
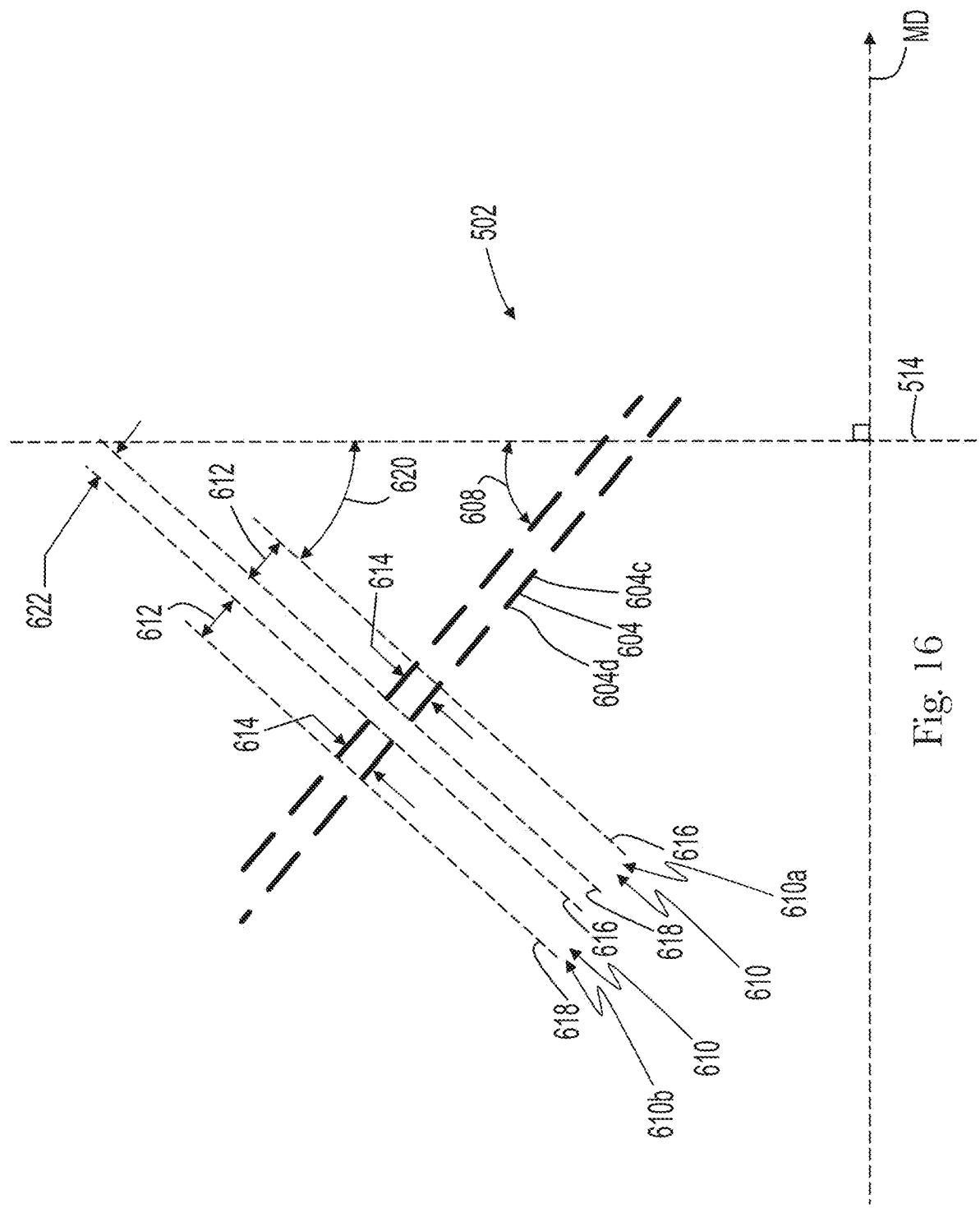
FIG. 16 is a detailed view of a another cutting device configuration showing details of blades thereon.

As mentioned above, the knife roll 502 may include blades 510 extending radially outward to blade edges 604 adapted to rotate about the axis 514. As such, the blade edges 604 may be oriented to cut the elastic strands 208 on the first substrate 200a to frangible pathways 700 in the elastic laminate 200a with corresponding lines of weakness 704 and discrete elastic pieces 706 such as described above with reference to FIGS. 15A and 15B. FIG. 16 shows an example orientation of a portion of a group of blade edges 604 on a knife roll 502. It is to be appreciated that the knife roll 502 may be configured to rotate at a variable angular velocity or a constant angular velocity and may be driven by a servo motor.

It is to be appreciated that the blade edges 604 may be arranged in various orientations and sizes. For example, as shown in FIG. 16 the blade edges 604 may be oriented to define an offset angle 608 relative to the rotation axis 514. In some configurations, offset angles 608 may be from about 0 degrees to about 90 degrees, specifically reciting all 1 degree increments within the above-recited range and all ranges formed therein or thereby. With continued reference to FIG. 13, the blade edges 604 may be arranged in rows 610 comprising at least a first row 610a and a second row 610b neighboring the first row 610a. The blade edges in the first row 610a and the second row 610b may extend for a length 612 from a first end 604c to a second end 604d. In some configurations, the length 612 of each blade edge 604 in the first row 610a and the second row 610b may be from about 1 mm to about 50 mm, specifically reciting all 0.1 mm increments within the above-recited range and all ranges formed therein or thereby. In some configurations, the blade edges 604 in the first row 610a and the blade edges 604 in the second row 610b are parallel to each other. The 604 blade edges in the first row 610a and/or second row 610b may be separated from each other by a blade edge gap distance 614. In some configurations, the blade edge gap distance 614 may be from about 1 mm to about 50 mm, specifically reciting all 0.1 mm increments within the above-recited range and all ranges formed therein or thereby. The first ends 604c of blade edges 604 in the first row 610b and the first ends 604c of blade edges 604 in the second row 610b may be aligned along first reference lines 616 that are oriented to define a row angle 620 relative to the rotation axis 514. In some configurations, the row angle 620 may be from about 0 degrees to about 90 degrees, specifically reciting all 1 degree increments within the above-recited range and all ranges formed therein or thereby. As shown in FIG. 16, the second ends 604d of blade edges 604 in the first row 610a and the second ends 604d of blade edges 604 in the second row 610b may be aligned along second reference lines 618. In some configurations, the second reference 618 lines are parallel to the first reference lines 616. In addition, the second reference line 618 of the first row 610a may be separated from the first reference line 616 of the second row 610b by a row gap distance 622. When the second reference line 618 of the first row 610a is positioned upstream in the machine direction MD of the first reference line 616 of the second row 610b, the row gap distance 622 may be expressed as a positive number. When the second reference line 618 of the first row 610a is positioned downstream in the machine direction MD of the first reference line 616 of the second row 610b, the row gap distance 622 may be expressed as a negative number. In some configurations, the row gap distance 622 may be about −10 mm to about 10 mm, specifically reciting all 0.1 mm increments within the above-recited range and all ranges formed therein or thereby.

Figure 17C:
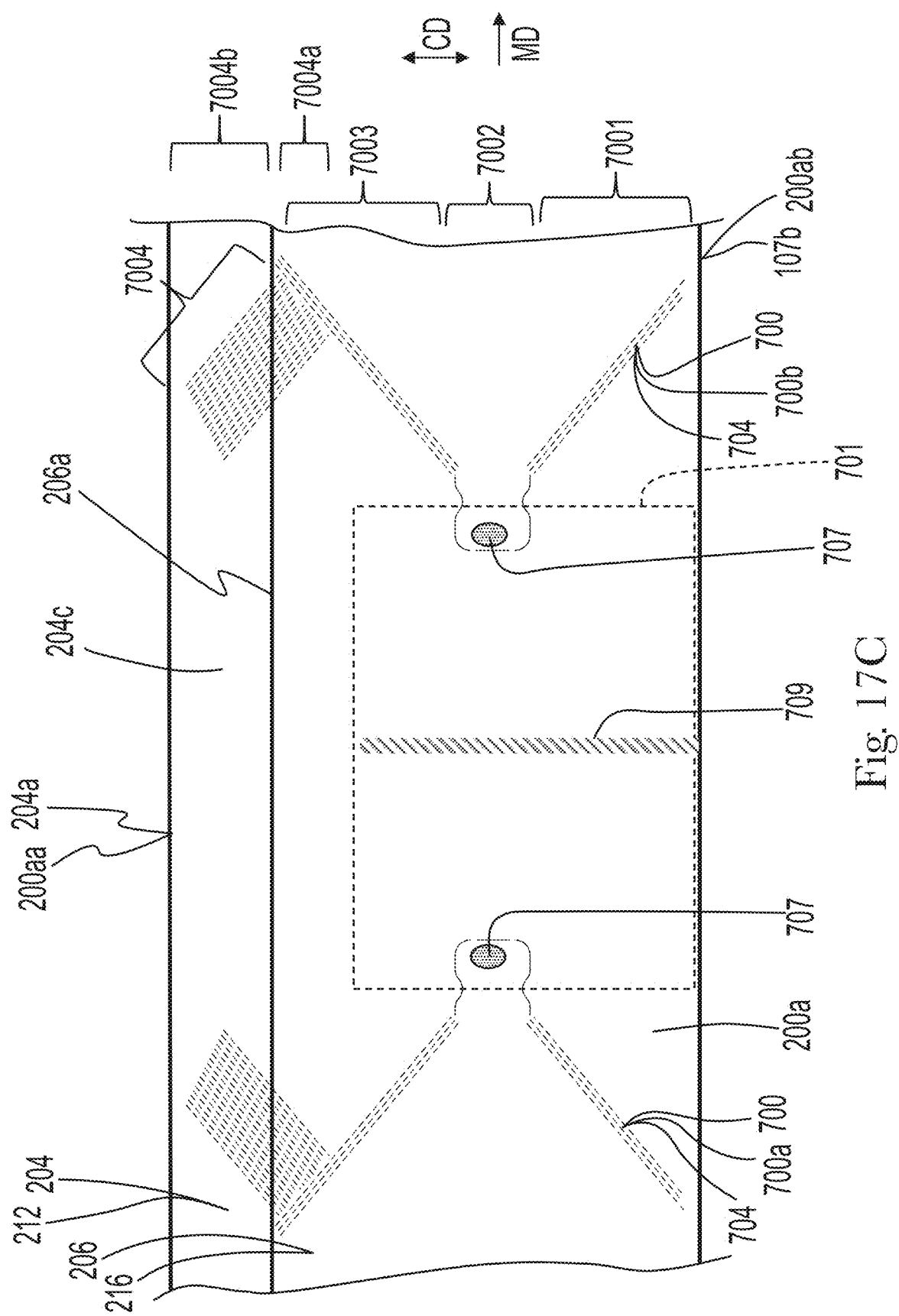
FIG. 17C is a side view of fourth configurations of frangible pathways on the elastic laminate of FIG. 14A.

FIGS. 17A-17E illustrate additional variations and configurations of frangible pathways described above with reference to FIGS. 14B-14D2. For example, as shown in FIG. 17A, the frangible pathways 700 of FIG. 14B may be altered such that the first regions 7001 includes a first subregion 7001a and a second subregion 7001b, wherein the first subregion 7001a extends at different angle relative to the machine direction than the second subregion 7001b. In addition, the third regions 7003 may include a first subregion 7003a and a second subregion 7003b, wherein the first subregion 7003a extends at different angle relative to the machine direction MD than the second subregion 7003b. For example, in some configurations, the first subregion 7003a may extend at an angle relative to the machine direction MD of about 20 degrees and the second subregion 7003b may extend at an angle relative to the machine direction MD from about 0 degrees to about 90 degrees, specifically reciting all 1 degree increments within the above-recited range and all ranges formed therein or thereby.

In yet another example, the second region 7002 may comprise single discrete lines of weakness 704 that define a perimeter extending partially around the fastener component 707. In some configurations, the lines of weakness 704 of the second region 7002 may comprise slits or cuts that extend entirely through the first elastic laminate 200a. Such slits or cuts may help provide a relatively easier way to begin tearing the elastic belt and/or help provide relatively easier access to the fastener component 707 during use of an assembled absorbent article 100P. In some configurations, the fastener component 707 may be sized relative the second region 7002 such that the lines of weakness 704 also penetrate through portions of the fastener component 707, such as shown for example, in FIG. 17B.

As discussed above with reference to the frangible pathways 700 with reference to FIGS. 14B, 15B, and 15C, the rows 710 may include more than two lines of weakness 704. For example, FIG. 17C shows a frangible pathway wherein the rows 710 in the first region 7001 and the third region 7003 may include three lines of weakness 710. In yet another variation shown in FIGS. 17D1 and 17D2, the second region 7002 of the frangible pathway 700 may comprise single discrete lines of weakness 704 in combination with a plurality of lines weakness 704 that define a perimeter extending partially around the fastener component 707.

As discussed above, absorbent articles 100, such as diaper pants 100P, may be configured with frangible pathways 700 comprising lines of weakness 704 arranged in various ways to help improve a caregiver's ability to remove a soiled diaper pant 100P from a wearer without having to remove a soiled diaper pant from a wearer by sliding the soiled diaper pant down the wearer's legs. As discussed above, the frangible pathways 700 may be configured to allow the first elastic belt 106 and/or the second elastic belt 108 to be relatively easily torn along the frangible pathway 700, such as when removing the diaper pant 100P from a wearer. In addition, the frangible pathways 700 may also be configured to provide access to fastening components 707 that may be used to help hold a soiled product in a disposal configuration. The following provides a discussion additional example implementations of frangible pathways 700 on diaper pants 100P in the context of the above description of various details of absorbent articles 100, fastening components 707, frangible pathways 700, and lines weakness 704. It is to be appreciated that discussion of frangible pathways 700 in the first elastic belt 106 may also apply to frangible pathways 700 in the second elastic belt 108.

It is to be appreciated that the fastener components 707 may be positioned in various locations and/or orientations relative to other components of the absorbent article 100. As shown in FIGS. 18B and 18D1, the fastener components 707 may comprise a lateral centerline 126*d* oriented substantially parallel to the lateral centerline 126*a* of the first elastic belt 106 and/or the lateral centerline 126*b* of the second elastic belt 108 and/or the lateral centerline 126*c* of the chassis 102. The fastener components 707 may comprise a longitudinal centerline 124*d* oriented substantially parallel to the longitudinal centerline 124*a* of the first elastic belt 106 and/or the longitudinal centerline 124*b* of the second elastic belt 108 and/or the longitudinal centerline 124*c* of the chassis 102. In some configurations, fastener components 707 may be positioned on and connected with the wearer-facing surface of the first elastic belt 106 and/or the second elastic belt 108 in a region where the first elastic belt 106 and/or second elastic belt 108 overlaps the chassis 102. In some configurations, the fastener component 707 may be sandwiched between the second substrate 164 of the first elastic belt 106 or the second elastic belt 108 and the backsheet 134 of the chassis 102. To help prevent contact of the fastener component 707 with a wearer's skin while wearing the diaper pant 100P, the fastener component 707 may be positioned at least about 25 mm or at least about 50 mm longitudinally inboard from the front belt waist edge 121 (or rear belt waist edge 122), specifically reciting all 0.1 mm increments within the above-recited range and all ranges formed therein or thereby. In some configurations, the fastener component 707 may be positioned at least about 20 mm or at least about 80 mm laterally inboard from the first longitudinal edge 128 and/or the second longitudinal edge 130 of the chassis 102, specifically reciting all 0.1 mm increments within the above-recited range and all ranges formed therein or thereby. In some configurations, the fastener component 707 is positioned approximately equidistant from both the outer laterally extending edge 107*a* and the inner laterally extending edge 107*b* of the first elastic belt 106 and/or both the outer laterally extending edge 109*a* and the inner laterally extending edge 109*b* of the second elastic belt 108.

As described above, the center chassis 102 is connected or bonded to each elastic belt 106, 108 to form a pant diaper 100P. As shown in FIGS. 18B and 18D1, the elastic belt 106, 108 may include a separable area 800 configured to separate from the center chassis 102 under relatively low forces applied by a caregiver. The separable area 800 may include at least a portion of the fastener component 707 as well as belt material adjacent fastener component 707. In some configurations, the separable area 800 may extend a distance from about 8 mm to about 40 mm outward from the perimeter of the fastener component 707, specifically reciting all 0.1 mm increments within the above-recited range and all ranges formed therein or thereby. The separable area 800 may be substantially adhesive-free or may comprise a relatively weak adhesive bond than the remainder of the belt area bonded to the chassis 102. A relatively weaker adhesive bond may be formed in various ways, such as for example, with: a reduced adhesive amount; a geometric pattern of adhesive, such as a relatively lower coverage area of adhesive; an adhesive having a relatively lower adhesive force; or a frangible adhesive. If a lower adhesive force adhesive is used, the adhesive may be applied to the entirety of the elastic belt 106, 108 in the region overlapping the chassis 102, as such a region may include both types of adhesives.

To help provide a caregiver relatively easier access the fastener component 707 with a finger or thumb, an accessibility opening 802 may be located in the elastic belt 106, 108 adjacent the fastener component 707. The accessibility opening 802 may be defined in some or all of the layers of the elastic belt 106, 108. The accessibility opening 802 may be located at least partially in a region of the elastic belt 106, 108 that includes the fastener component 707. In some configurations, the accessibility opening 802 may be positioned adjacent an edge 707*c* of the fastener component 707 or in a region of the elastic belt 106, 108 surrounding the fastener component 707 extending about 5 mm or less inboard or outboard from the edge 707*c* of the fastener component 707, specifically reciting all 0.1 mm increments within the above-recited range and all ranges formed therein or thereby. The accessibility opening 802 may comprise one or more components 804, such as linear slits and/or curved openings. The accessibility opening 802 may be disposed only in a vicinity of least a portion of the longitudinally and/or laterally inboard edge of the fastener component 707 or may be disposed in a vicinity of at least a portion of one of such edges and at least a portion of the longitudinally outboard edge of the fastener component 707. The accessibility opening 802, or components 804 thereof, may have a length dimension in the range of about 5 mm to about 50 mm, specifically reciting all 0.1 mm increments within the above-recited range and all ranges formed therein or thereby. In configurations wherein the accessibility opening 802 comprises two or more components 804, the spacing between each component 804 and a nearest neighbor may be greater than zero and no greater than about 3 mm.

In some configurations, the accessibility opening 802 may be located at least partially in a region of the elastic belt 106, 108 that may penetrate through the thickness of at least a portion of the fastener component 707. For example, as shown in FIG. 18D2, a first portion 707*a* of the fastener component 707 at least partially surrounded by components 804 may be separated from a second portion 707*b* of the fastener component 707. In some configurations, the first portion 707*a* of the fastener 707 may comprise a lateral centerline 126*d*1 parallel with the lateral centerline 126*d* of the fastener component 707 and/or may comprise a longitudinal centerline 124*d*1 parallel with the longitudinal centerline 124*d* of the fastener component 707. In some configurations, the first portion 707*a* of the fastener component 707 may comprise a lateral width of about 35 mm or between about 10 mm and about 50 mm, specifically reciting all 0.1 mm increments within the above-recited range and all ranges formed therein or thereby. In some configurations, the first portion 707*a* of the fastener component 707 may comprise a longitudinal length of about 25 mm or between about 10 mm and about 50 mm, specifically reciting all 0.1 mm increments within the above-recited range and all ranges formed therein or thereby.

Figure 18A:
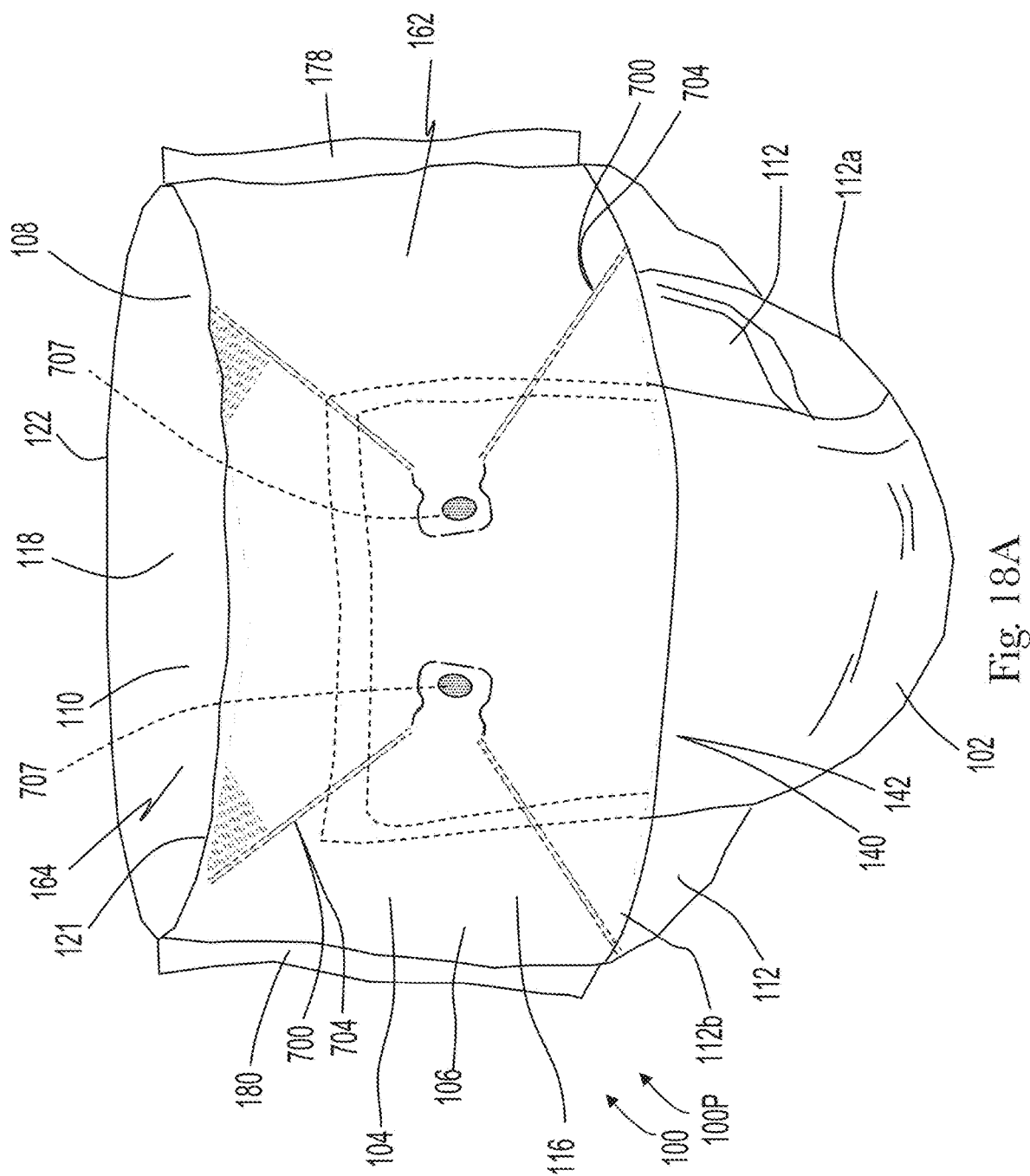
FIG. 18A is a perspective view of a diaper pant with frangible pathways.

As shown in FIGS. 18A and 18B, the frangible pathway 700 may extend from an operable vicinity of the accessibility opening 802 to an operable vicinity of both the outer laterally extending edge 107*a* and the inner laterally extending edge 107*b* of the first elastic belt 106. The term "operable vicinity" refers to a distance across which a tear will propagate reliably in an intended direction, under reasonable forces a caregiver would apply, from one line of weakness to another. When removing and disposing of a soiled pant, the caregiver may access the fastener component 707 through the accessibility opening 802; grasp at least a portion of the fastener component 707; pull the fastener component away from the remainder of the elastic belt 106; and open the elastic belt 106 by continuing to pull the fastening component 707 as tears simultaneously propagate away from both longitudinally inboard and outboard edges of the accessibility opening 802 and fastening component 707 until the tears reach the outer laterally extending edge 107a and the inner laterally extending edge 107b of the first elastic belt 106, thus completely separating the elastic belt 106 into multiple discrete sections at a distal terminus 808 and proximal terminus 810. The portion of the fastening component 707 that is separated from the remainder of the elastic belt 106 as a result of the tearing operation, such as the first portion 707a discussed above, may be referred to herein as a disposal fastener 806. In some configurations, the tears may reach and breach the outer laterally extending edge 107a and the inner laterally extending edge 107b of the first elastic belt 106 at approximately the same moment in time. The distal terminus 808 and/or the proximal terminus 810 of the frangible pathway 700 may be positioned in various locations laterally along the outer laterally extending edge 107a and the inner laterally extending edge 107b, respectively, of the first elastic belt 106. In some configurations, the distal terminus 808 and/or the proximal terminus 810 of the frangible pathway 700 may be positioned a lateral distance from the side seam 178, 180 of about 0 mm to about 100 mm, specifically reciting all 0.1 mm increments within the above-recited range and all ranges formed therein or thereby.

Figure 18C:
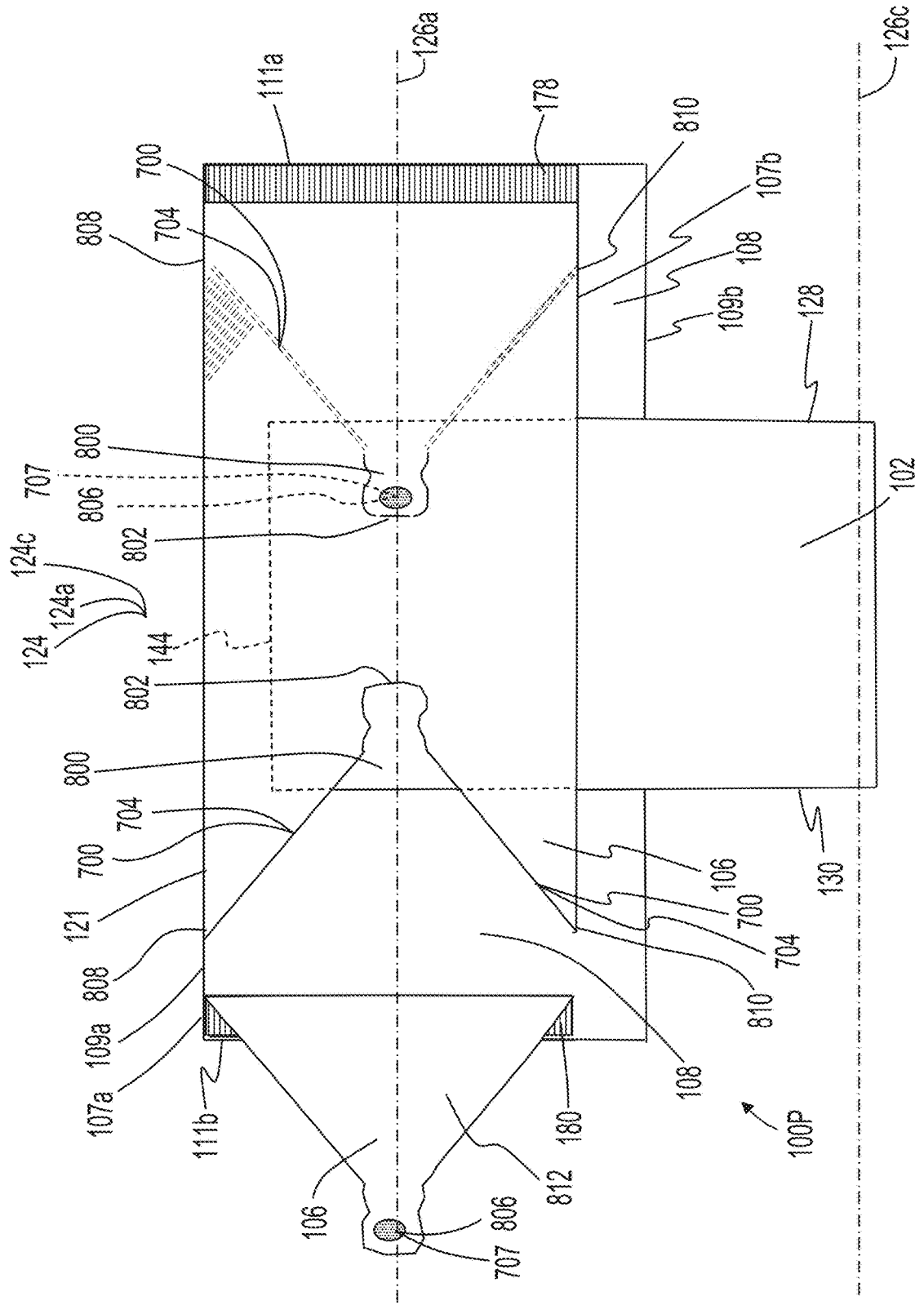
FIG. 18C shows a front plan view of the diaper pant of FIG. 18B after one frangible pathway has been torn away.

As shown in FIG. 18C, once the tearing operation described above is completed, a disposal ear region 812 of the elastic belt 106 may be bounded by the accessibility opening 802, frangible pathway 700, and the side seam 178, 180, and also including the disposal fastener 806. As previously described, for the purpose of removing the pant from the wearer, the caregiver may access at least a portion of the disposal fastener 806 through the accessibility opening 802. The caregiver may grasp the fastening component 707 and pull away from the remainder of the elastic belt 106, tearing the belt 106 in the process of this action along the entirety of the frangible pathway 700 and through the outer laterally extending edge 107a and the inner laterally extending edge 107b of the first elastic belt 106, freeing the disposal ear region 812 for use in disposal of the diaper pant 100P. The caregiver may then remove the remainder of the diaper pant 100P from the wearer, roll and wrap the chassis 102, including the pant leg openings, inside the belt 106 including the disposal ear region 812, and use the disposal fastener 806 to secure the rolled pant for easy and hygienic disposal, such discussed above for example with reference to FIGS. 5A-5E. To facilitate this functionality, the entirety of the frangible pathway 700 is disposed in the separable area 800 of the belt 106 and a region of the belt 106 disposed laterally outboard the chassis 102. It is to be appreciated that the frangible pathways 700 and belt 106 may be configured to define various sizes and shapes of the disposal ear region 812. In some configurations, the disposal ear region 812 may have a lateral dimension of between about 100 mm and about 200 mm, specifically reciting all 0.1 mm increments within the above-recited range and all ranges formed therein or thereby, as measured from the side seam 178, 180 to an edge of the disposal ear region 812 closest to the longitudinal centerline 124c of the chassis 102 prior to separation of the frangible pathway 700. In configurations wherein the fastener component 707 is positioned relatively closer to the longitudinal centerline 124c of the chassis 102, a relatively longer disposal ear region 812 may be provided, which may help a caregiver more easily fully wrap, and close the leg openings of, a soiled pant following removal.

As discussed above with reference to FIGS. 10-17D2, the frangible pathways 700 herein may include one or more regions 7000 (such as 7001, 7002, . . . , 700n) comprising different types, quantities, sizes, and/or orientations of lines of weakness 704. In some examples, the lines of weakness may be arranged in arrays that may have different angles or orientations with respect to the lateral centerline 126a of the belt 106. Arrays may comprise linear or curvilinear sequences, parallel lines, stepped parallel lines, herringbone patterns, and any other patterns of lines of weakness. It is to be appreciated that a region 7000 may also differ from one or more other regions in the number of layers of material involved in a perforation. In turn, the regions 7000 of the frangible pathways 700 may be configured to define different functional zones of the frangible pathways 700.

Figure 18E:
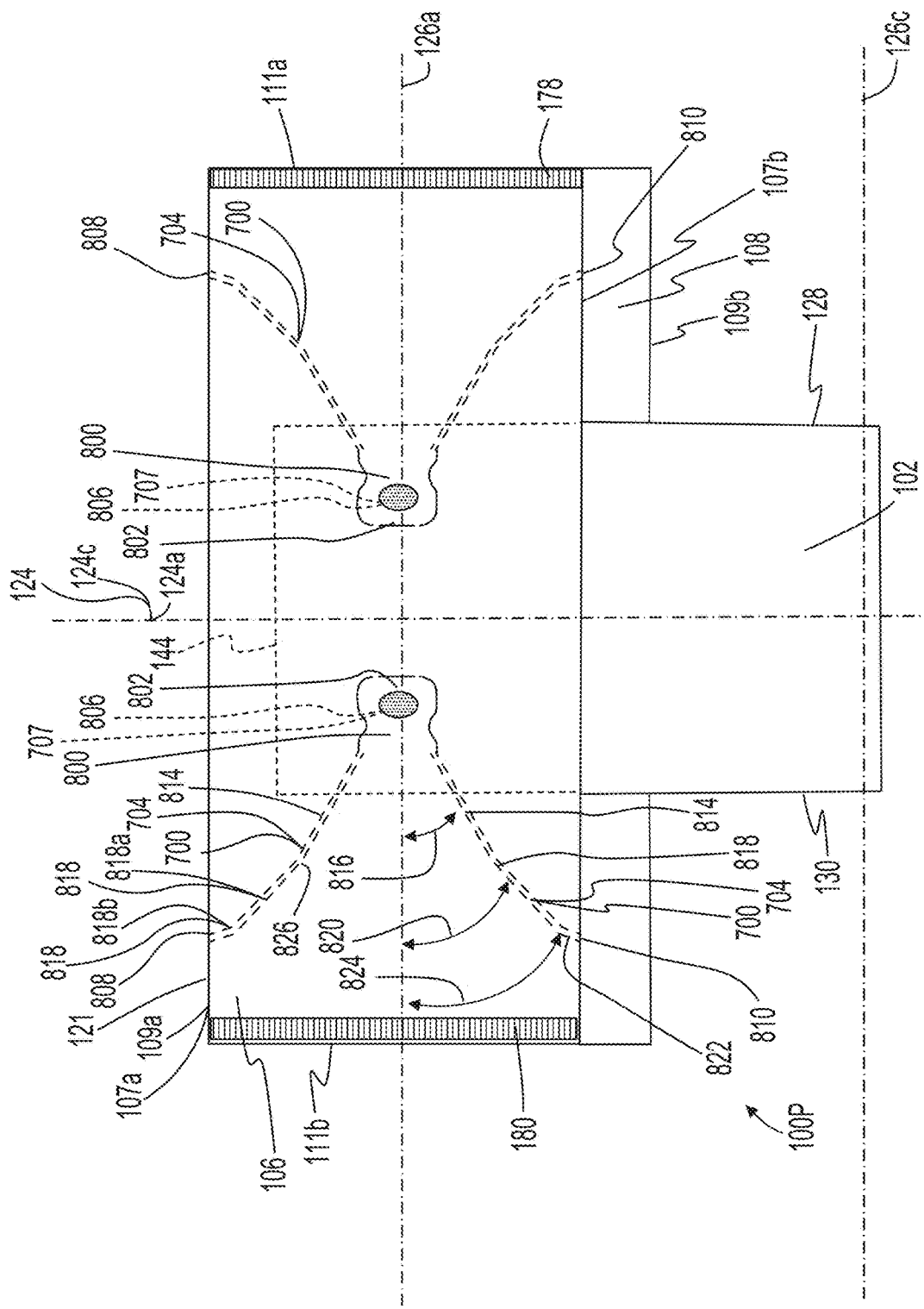
FIG. 18E shows a front plan view of the diaper pant with another configuration of frangible pathways.

For example, as shown in FIG. 18E, the frangible pathway 700 may comprise a first region referred to as an initial tear zone 814. The lines of weakness 704 in the initial tear zone 814 may be arranged such that the frangible pathway 700 defines an initial tear zone angle 816 between the frangible pathway and the lateral centerline 126a of the belt 106. In some configurations, the initial tear zone angle 816 may be in the range of 0 to 45 degrees, specifically reciting all 1 degree increments within the above-recited range and all ranges formed therein or thereby. In some configurations, a relatively smaller initial tear zone angle 816 may be used to help: minimize a required longitudinal dimension of the separable area 800 and maximize the area and mechanical integrity of the waist belt to center chassis bonding.

The lines of weakness 704 in frangible pathway 700 may be arranged in a "railroad track" pattern, wherein the frangible pathway 700 comprises two or more substantially parallel rows of lines of weakness 704 comprising, for example, individual perforations. The individual perforations may have lengths in the range of about 10 mm or less, specifically reciting all 0.1 mm increments within the above-recited range and all ranges formed therein or thereby. The angles of the individual perforations versus the lateral centerline 126a may be different from the angle of the frangible pathway 700 versus the belt lateral centerline 126a. The closest distance between perforations in parallel rows may be in the range of about 0.1 to about 5 mm, specifically reciting all 0.1 mm increments within the above-recited range and all ranges formed therein or thereby.

Figure 18F:
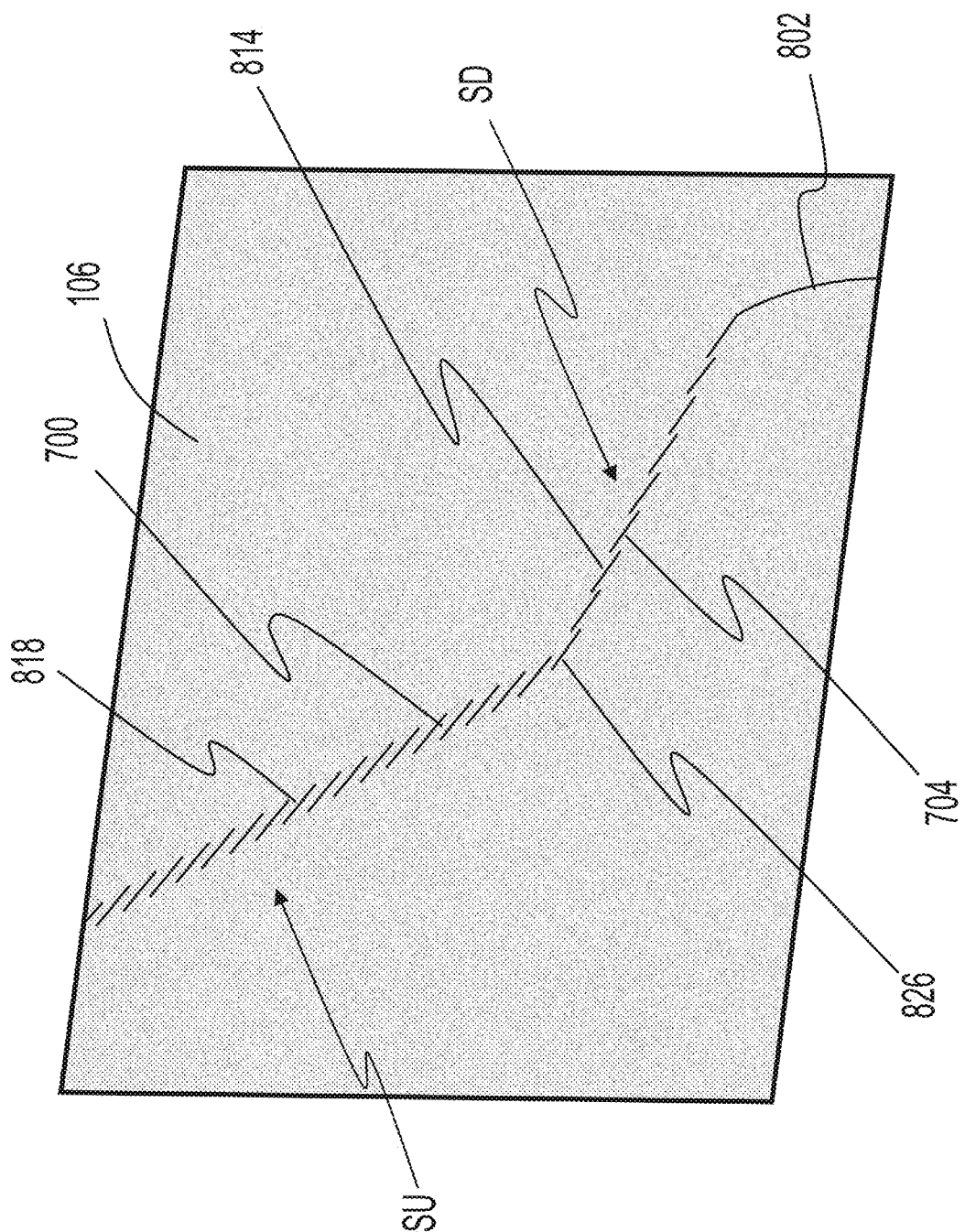
FIG. 18F shows lines of weakness arranged in shingle up and shingle down patterns.

In some configurations, the lines of weakness 704 in the initial tear zone 814 may be arranged in a "shingle down" SD stepped orientation with respect to one another, such as shown in FIG. 18F. In a "shingle down" SD configuration, each line of weakness 704 in sequence along the frangible pathway 700, such as a line of weakness immediately laterally outboard a preceding line of weakness, overlaps the preceding line of weakness in a longitudinal direction toward the lateral centerline 126d of the fastening component 707. The amount of overlap may be about 50% of the length of the preceding line of weakness and may be in the range of about 35% to about 60% of the length of the line of weakness 704.

With continued reference to FIG. 18E, the frangible pathway 700 may additionally comprise a waist tear zone 818. The lines of weakness 704 in the waist tear zone 818 may be arranged in a "railroad track" configuration as described above. The lines of weakness 704 in the waist tear zone 818 may be arranged such that the frangible pathway 700 defines a waist tear zone angle 820 between the frangible pathway and the lateral centerline 126a of the belt 106.

In some configurations, the lines of weakness 704 in the waist tear zone 814 may be arranged in a "shingle up" SU stepped orientation with respect to one another, such as shown in FIG. 18F. In a "shingle up" SU configuration, each line of weakness 704 in sequence along the frangible pathway 700, such as a line of weakness immediately laterally outboard a preceding line of weakness, overlaps the preceding line of weakness in a longitudinal direction away from the lateral centerline 126*d* of the fastening component 707. The amount of overlap may be about 30% of the length of the preceding line of weakness and may be in the range of about 10% to about 50% of the length of the line of weakness.

As discussed above, the outer longitudinal edge 107*a* of the first elastic belt 106 may be defined by a fold line 162*h*. With absorbent articles 100P comprising a folded waist belt edge 162*h*, the waist tear zone 818 may comprise a base waist zone 818*a* and a folded waist zone 818*b* disposed longitudinally outboard the base waist zone 818*a* and may be folded over and bonded to the base waist zone 818*a* in the process of forming the folded belt waist edge 162*h*. In such configurations, the lines of weakness 704 in the folded waist zone 818*b* may overlap or may be in operational vicinity of the lines of weakness 704 in the base waist zone 818*a* when in a folded and bonded configuration and may help enable the frangible pathway 700 tearing to propagate to the waist edge 107*a* and free the disposal ear region 812 for use. One of the base waist zone 818*a* and the folded waist zone 818*b* may comprise lines of weakness that may have a lateral length greater than the other to achieve overlap or operational vicinity in a folded configuration over the full range of potential manufacturing overlap tolerances, such as shown in FIGS. 14B-14D2. The frangible pathway 700 in the folded waist zone 818*b* may have a similar width versus the base waist zone 818*a* or may be larger than the base waist zone 818*a* and may have a range of widths of about 10 mm to about 50 mm, specifically reciting all 0.1 mm increments within the above-recited range and all ranges formed therein or thereby. The waist tear zone angle 820 in the base waist zone 818*a* and in the folded waist zone 818*b* may be mirror images of each other with respect to the lateral centerline 126*a* of the waist belt 106. Alternatively, the waist belt edge may be folded over and bonded to form a folded belt edge prior to forming the lines of weakness, including perforations. In these embodiments, the frangible pathway 700 does not require a mirror image angle and may proceed directly to the waist edge of the belt 121. In a finished belt state, whether having a folded waist edge or not, the absolute value of the angle of these arrays is in the range of about 15 to about 90 degrees with respect to the lateral centerline. Higher angles are preferred to maximize the robustness of the separation of the frangible pathway 700 in this region, especially when more than two nonwoven layers are involved in the tear. The force required to tear the frangible pathway 700 in the folded waist zone 818*b* may be lower than the force required to tear the frangible pathway 700 in the base waist zone 818*a*.

With continued reference to FIG. 18E, the frangible pathway 700 may also comprise a leg edge zone 822. The lines of weakness 704 in the leg edge zone 822 may be arranged such that the frangible pathway 700 defines a leg edge zone angle 824 between the frangible pathway 700 and the lateral centerline 126*a* of the belt 106. The leg edge zone angle 824 may be in a range of about 15 to about 90 degrees, specifically reciting all 1 degree increments within the above-recited range and all ranges formed therein or thereby. Relatively higher leg edge zone angles 824 may help increase the robustness of the separation of the frangible pathway 700 in the leg edge zone 822. The force required to tear the frangible pathway 700 in the leg edge zone 822 may be higher than the force required to tear the frangible pathway 700 in other regions of the belt 106 to prevent accidental tearing of the frangible pathway 700 by the wearer's leg during motions typical of a wearing activity.

In some configurations, the frangible pathway 700 may also include transition zones 826 that operatively connect zones to help facilitate the propagation of the tear along the frangible pathway 700 from zone to another zone. For example, a transition zone 826 may operatively connect the initial tear zone 814 and the base waist zone 818*a*. In another example, a transition zone may operatively connect the initial tear zone 814 or waist tear zone 818 with the leg edge zone 822. The lines of weakness in the transition zones may be of particular lengths and/or angles relative to lateral centerlines, and row spacing to help provide desired propagation of material failure when, for example, removing a product from a wearer. It is to be appreciated that the lengths, angles, and spacings in transition zones may be different from those in adjacent lines of weakness.

Figure 19:
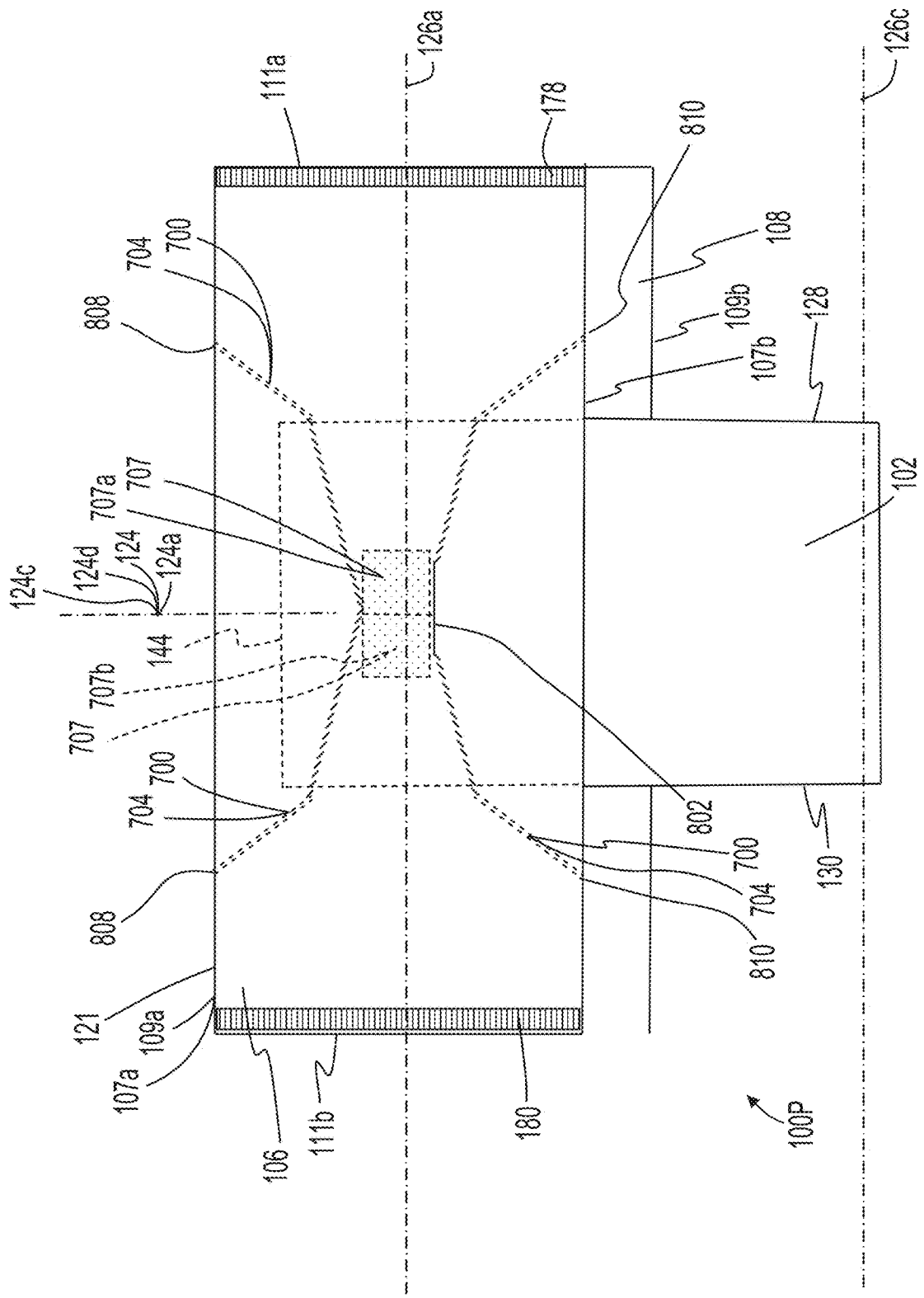
FIG. 19 shows a front plan view of a diaper with another configuration of frangible pathways.

In another configuration shown in FIG. 19, the elastic belt 106 comprises one fastener component 707 joined to the inner surface of the elastic belt 106 in a location overlapping the longitudinal centerline 124*c* of the chassis 102. The longitudinal centerline 124*d* of the fastener component 707 is coincident with, or in proximity of, the longitudinal centerline 124*c* of the chassis 102. The frangible pathway 700 may divide fastener component 707 into two disposal fasteners 707*a*, 707*b* of substantially similar size and geometry. An accessibility opening 802 may be disposed at, or in proximity of, the longitudinally inboard lateral edge of the fastener component 707. Longitudinally outboard the lateral edges of the fastener component 707, the frangible pathway 700 extends in longitudinal and lateral directions to the waist edge 121 and leg edges 107*b* of the first elastic belt 106. A caregiver may access and grasp the fastener component 707 through the accessibility opening 802 and subsequently separate the frangible pathway 700 into the two disposable ear regions 812, each comprising one of the disposal fasteners 707*a*, 707*b*. In this embodiment, an area of higher adhesion between the elastic belt 106 and chassis 102 may be disposed between the fastener component 707 and the longitudinally inboard edge 107*b* of the first elastic belt 106 to help prevent inadvertent separation of the belt edge 107*b* from the chassis 102.

Figure 20B:
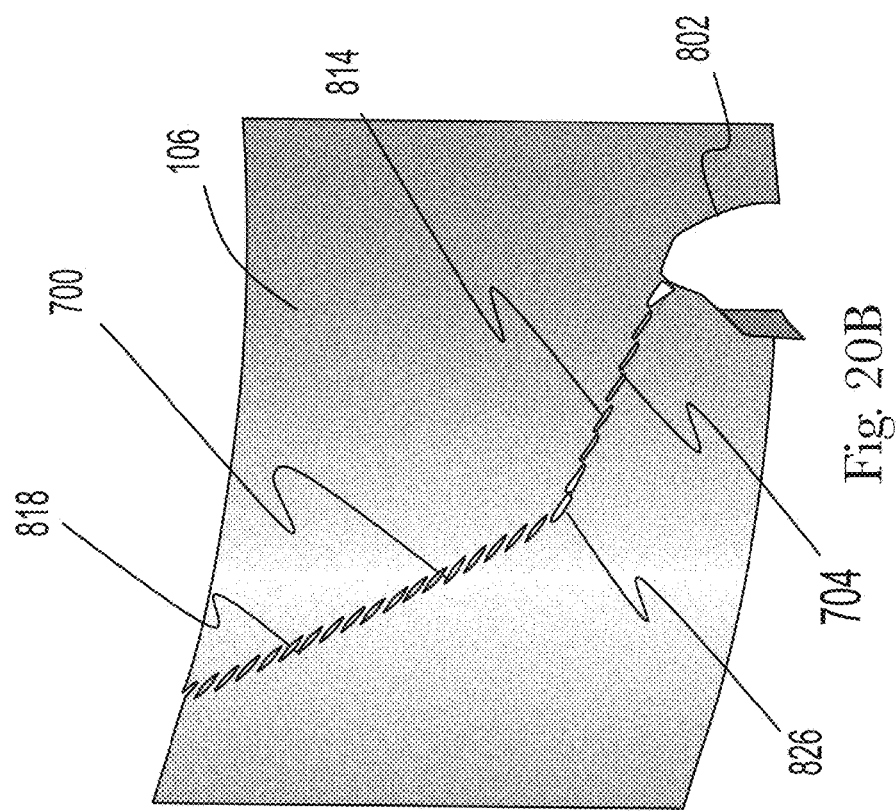
Figure 20A:
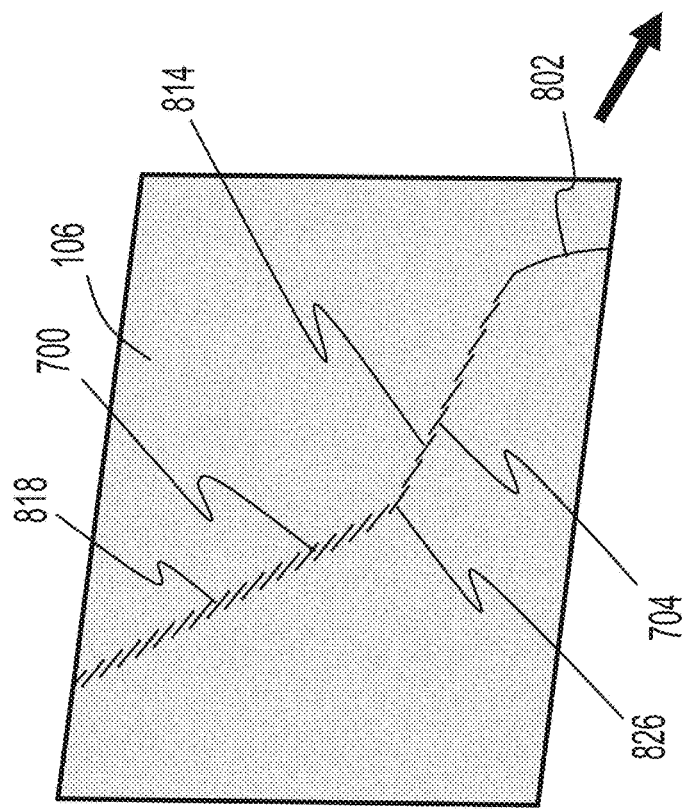

An example of a progression of the tear along the frangible pathway 700 as a caregiver pulls the disposal fastener 806 and disposal ear region 812 away from the remainder of the belt 106 is depicted in FIGS. 20A through 20F. FIG. 20A shows the frangible pathway 700 prior to opening by the caregiver. FIG. 20B shows the accessibility opening 802 in an open state and the beginning of the separation of the frangible pathway 700 in the initial tear zone 814 as the first perforation is almost open. FIG. 20C shows initial lines of weakness open and the continued propagation of the tear along the frangible pathway 700. FIG. 20D shows the initial tear zone 814 completely open. FIG. 20E shows the first perforation in the waist tear zone 818 about to open. FIG. 20F shows the continued propagation of the tear along the frangible pathway 700 in the waist tear zone 818.

In some configurations, the frangible pathway 700 includes no changes in angle between the accessibility opening 802 and either the waist edge or leg edge of the belt. In these configurations, the frangible pathway 700 comprises the initial tear zone 814, but may not comprise one of more of a waist tear zone 818, base waist zone 818*a*, folded waist zone 818*b*, leg edge zone 822, or transition zones 826.

The size and orientation of individual lines of weakness 704, including perforations, may help provide a desired pant removal experience to the caregiver. In some configurations, the length of the perforation may be from about 1 mm to about 10 mm, specifically reciting all 0.1 mm increments within the above-recited range and all ranges formed therein or thereby. In some configurations, the distance between each perforation and a closest neighbor may be between about 0.5 mm and about 5 mm, specifically reciting all 0.1 mm increments within the above-recited range and all ranges formed therein or thereby. The angle of each individual perforation versus the lateral centerline 126a of the belt 106 may be no more than about 45 degrees to help prevent unintended opening of the perforation in manufacture or use. In some configurations, the angle of each individual perforation versus the lateral centerline 126a of the belt 106 may be in the range of about 10 degrees to about 45 degrees, specifically reciting all 1 degree increments within the above-recited range and all ranges formed therein or thereby. In some configurations, the cut width of the perforation may be in the range of about 10 microns to about 200 microns, specifically reciting all 1 micron increments within the above-recited range and all ranges formed therein or thereby.

As discussed above, the frangible pathway may also be configured such that each elastic is cut along the frangible pathway 700 to help ensure a clean separation of the disposal ear region 812 from the remainder of the belt 106. Each elastic may be cut in one or more locations. That is, one or more perforations, or lines of weakness, may cross each elastic strand along the entirety of the frangible pathway 700. In some configurations, any imaginary line drawn on the belt 106 parallel to the lateral centerline 126a of the belt 126 may intersect at least one perforation or line of weakness 704 on each side of the longitudinal centerline 124c of the chassis 102.

It is to be appreciated that the number of nonwoven layers in the belt 106 may vary along the longitudinal dimension of the frangible pathway 700. For example, the initial tear zone 814 may comprise two nonwoven layers, while the folded waist zone 818b may comprise three nonwoven layers. To aid the caregiver in the understanding of the usage of the product, the outer nonwoven of the belt 106 may comprise printing or other indicia in, adjacent to, or aligned with, at least a portion of the frangible pathway 700 and/or the lines of weakness 704 comprising the frangible pathway 700.

As the disposal ear region 812 is separated from the remainder of the waist belt along the frangible pathway 700, the force required to open the frangible pathway 700 may vary over time depending on the location of the tear along the frangible pathway 700.

Average Decitex (Average-Dtex)

The Average Decitex Method is used to calculate the Average-Dtex on a length-weighted basis for elastic fibers present in an entire article, or in a specimen of interest extracted from an article. The decitex value is the mass in grams of a fiber present in 10,000 meters of that material in the relaxed state. The decitex value of elastic fibers or elastic laminates containing elastic fibers is often reported by manufacturers as part of a specification for an elastic fiber or an elastic laminate including elastic fibers. The Average-Dtex is to be calculated from these specifications if available. Alternatively, if these specified values are not known, the decitex value of an individual elastic fiber is measured by determining the cross-sectional area of a fiber in a relaxed state via a suitable microscopy technique such as scanning electron microscopy (SEM), determining the composition of the fiber via Fourier Transform Infrared (FT-IR) spectroscopy, and then using a literature value for density of the composition to calculate the mass in grams of the fiber present in 10,000 meters of the fiber. The manufacturer-provided or experimentally measured decitex values for the individual elastic fibers removed from an entire article, or specimen extracted from an article, are used in the expression below in which the length-weighted average of decitex value among elastic fibers present is determined.

The lengths of elastic fibers present in an article or specimen extracted from an article is calculated from overall dimensions of and the elastic fiber pre-strain ratio associated with components of the article with these or the specimen, respectively, if known. Alternatively, dimensions and/or elastic fiber pre-strain ratios are not known, an absorbent article or specimen extracted from an absorbent article is disassembled and all elastic fibers are removed. This disassembly can be done, for example, with gentle heating to soften adhesives, with a cryogenic spray (e.g., Quick-Freeze, Miller-Stephenson Company, Danbury, CT), or with an appropriate solvent that will remove adhesive but not swell, alter, or destroy elastic fibers. The length of each elastic fiber in its relaxed state is measured and recorded in millimeters (mm) to the nearest mm.

Calculation of Average-Dtex

For each of the individual elastic fibers f, of relaxed length L1 and fiber decitex value d; (obtained either from the manufacturer's specifications or measured experimentally) present in an absorbent article, or specimen extracted from an absorbent article, the Average-Dtex for that absorbent article or specimen extracted from an absorbent article is defined as:

$$\text{Average-}Dtex = \frac{\sum_{i=1}^{n}(L_i \times d_i)}{\sum_{i=1}^{n}L_i}$$

where n is the total number of elastic fibers present in an absorbent article or specimen extracted from an absorbent article. The Average-Dtex is reported to the nearest integer value of decitex (grams per 10 000 m).

If the decitex value of any individual fiber is not known from specifications, it is experimentally determined as described below, and the resulting fiber decitex value(s) are used in the above equation to determine Average-Dtex.

Experimental Determination of Decitex Value for a Fiber

For each of the elastic fibers removed from an absorbent article or specimen extracted from an absorbent article according to the procedure described above, the length of each elastic fiber $L_k$ in its relaxed state is measured and recorded in millimeters (mm) to the nearest mm. Each elastic fiber is analyzed via FT-IR spectroscopy to determine its composition, and its density $\rho_k$ is determined from available literature values. Finally, each fiber is analyzed via SEM. The fiber is cut in three approximately equal locations perpendicularly along its length with a sharp blade to create a clean cross-section for SEM analysis. Three fiber segments with these cross sections exposed are mounted on an SEM sample holder in a relaxed state, sputter coated with gold, introduced into an SEM for analysis, and imaged at a resolution sufficient to clearly elucidate fiber cross sections. Fiber cross sections are oriented as perpendicular as possible to the detector to minimize any oblique distortion in the measured cross sections. Fiber cross sections may vary in shape, and some fibers may consist of a plurality of individual filaments. Regardless, the area of each of the three fiber cross sections is determined (for example, using diameters for round fibers, major and minor axes for elliptical fibers, and image analysis for more complicated shapes), and the average of the three areas $a_k$ for the elastic fiber, in units of micrometers squared ($\mu m^2$), is recorded to the nearest 0.1 $\mu m^2$. The decitex $d_k$ of the kth elastic fiber measured is calculated by:

$$d_k = 10000 \text{ m} \times a_k \times \rho_k \times 10^{-6}$$

where $d_k$ is in units of grams (per calculated 10,000 meter length), $a_k$ is in units of $\mu m^2$, and $\rho_k$ is in units of grams per cubic centimeter (g/cm$^3$). For any elastic fiber analyzed, the experimentally determined $L_t$ and $d_k$ values are subsequently used in the expression above for Average-Dtex.

Average-Strand-Spacing

Using a ruler calibrated against a certified NIST ruler and accurate to 0.5 mm, measure the distance between the two distal strands within a section to the nearest 0.5 mm, and then divide by the number of strands in that section—1

$$\text{Average-Strand-Spacing} = d/(n-1) \text{ where } n>1$$

report to the nearest 0.1 mm.

Average-Pre-Strain

The Average-Pre-Strain of a specimen are measured on a constant rate of extension tensile tester (a suitable instrument is the MTS Insight using Testworks 4.0 Software, as available from MTS Systems Corp., Eden Prairie, MN) using a load cell for which the forces measured are within 1% to 90% of the limit of the cell. Articles are conditioned at 23° C.±2° C. and 50%±2% relative humidity for 2 hours prior to analysis and then tested under the same environmental conditions.

Program the tensile tester to perform an elongation to break after an initial gage length adjustment. First raise the cross head at 10 mm/min up to a force of 0.05N. Set the current gage to the adjusted gage length. Raise the crosshead at a rate of 100 mm/min until the specimen breaks (force drops 20% after maximum peak force). Return the cross head to its original position. Force and extension data is acquired at a rate of 100 Hz throughout the experiment.

Set the nominal gage length to 40 mm using a calibrated caliper block and zero the crosshead. Insert the specimen into the upper grip such that the middle of the test strip is positioned 20 mm below the grip. The specimen may be folded perpendicular to the pull axis, and placed in the grip to achieve this position. After the grip is closed the excess material can be trimmed. Insert the specimen into the lower grips and close. Once again, the strip can be folded, and then trimmed after the grip is closed. Zero the load cell. The specimen should have a minimal slack but less than 0.05 N of force on the load cell. Start the test program.

From the data construct a Force (N) verses Extension (mm). The Average-Pre-Strain is calculated from the bend in the curve corresponding to the extension at which the nonwovens in the elastic are engaged. Plot two lines, corresponding to the region of the curve before the bend (primarily the elastics), and the region after the bend (primarily the nonwovens). Read the extension at which these two lines intersect, and calculate the % Pre-Strain from the extension and the corrected gage length. Record as % Pre-strain 0.1%. Calculate the arithmetic mean of three replicate samples for each elastomeric laminate and Average-Pre-Strain to the nearest 0.1%.

Combinations

A1. An absorbent article comprising: a chassis comprising a topsheet, a backsheet, and an absorbent core positioned between the topsheet and the backsheet, the chassis further comprising a first end region and a second end region longitudinally separated from the first end region by a crotch region; a first belt connected with the first end region of the chassis; a second belt connected with the second end region of the chassis, wherein laterally opposing end portions of the second belt are connected with laterally opposing end portions of the first belt to form a waist opening; wherein the first belt comprises: a proximal edge and a distal edge; elastic strands positioned between and connected with a first substrate and a second substrate; and a first frangible pathway in the first belt extending between the proximal edge and the distal edge, the first frangible pathway comprising lines of weakness, wherein all elastic strands extending through the first frangible pathway are cut at the lines of weakness such that a first plurality of the elastic strands are cut only once and such that a second plurality of the elastic strands are cut more than once.

A2. The absorbent article of paragraph A1, further comprising a second frangible pathway in the first belt laterally separated from the first frangible pathway.

A3. The absorbent article of paragraph A2, wherein the first end region of the chassis is positioned between the first frangible pathway and the second frangible pathway.

A4. The absorbent article of either paragraphs A2 or A3, wherein the first end region of the chassis overlaps portions of the first frangible pathway and the second frangible pathway.

A5. The absorbent article of any of paragraphs A1-A4, further comprising a low-stretch zone in the first belt, wherein the first end region of the chassis overlaps the low-stretch zone.

A6. The absorbent article of any of paragraphs A1-A5, wherein the first frangible pathway comprises a first region and a second region; and wherein a portion of the first substrate is folded onto the second substrate and the first end region of the chassis such that the first region of the first frangible pathway overlaps the second region of the first frangible pathway.

A7. The absorbent article of any of paragraphs A1-A6, further comprising a fastener component positioned between the first belt and the backsheet.

A8. The absorbent article of paragraph A7, wherein the first frangible pathway comprises a first region and a second region longitudinally separated from the first region by a third region, and wherein the fastener component is positioned adjacent the third region of the frangible pathway.

A9. The absorbent article of either paragraph A7 or A8, further comprising a slit in the third region adjacent the fastening component.

A10. The absorbent article of any of paragraphs A7-A9, wherein the fastener component comprises hooks that are refastenably attachable with an outer surface of at least one of the chassis, the first belt, and the second belt.

A11. The absorbent article of any of paragraphs A1-A10, wherein the lines of weakness comprise discrete cut lines.

A12. The absorbent article of any of paragraphs A1-A11, wherein the first substrate and the second substrate comprise nonwovens and wherein the lines of weakness comprise discrete bonds wherein materials of the nonwovens are fused together.

A13. The absorbent article of any of paragraphs A1-A12, wherein the first frangible pathway extends for a first frangible pathway total length from an outermost edge of a line of weakness nearest the proximal edge of the first belt to an outermost edge of a line of weakness nearest the distal edge of the first belt.

A14. The absorbent article of paragraph A13, wherein the first belt comprises a first belt length defined by a longitudinal distance between the proximal edge and the distal edge, and the first frangible pathway total length is equal to or less than the first belt length.

A15. The absorbent article of paragraph A13, wherein the first belt comprises a first belt length defined by a longitudinal distance between the proximal edge and the distal edge, and wherein the first frangible pathway total length is greater than the first belt length.

A16. The absorbent article of paragraph A13, wherein lines of weakness extend for a length from a first end to a second end, and wherein a sum of the all the lengths of lines of weakness in the first frangible pathway is greater than the first frangible pathway total length.

B1. A method for assembling absorbent articles, the method comprising steps of: providing a first elastic laminate, the first elastic laminate comprising elastic strands positioned between and connected with a first substrate and a second substrate, the elastic strands extending in a machine direction, the first elastic laminate further comprising a first edge separated from a second edge in a cross direction, wherein the first elastic laminate comprises a first laminate width defined by a distance extending in the cross direction between the first edge and the second edge; advancing the first elastic laminate in the machine direction; and forming a first frangible pathway in the first elastic laminate extending in the cross direction between the first edge and the second edge, the first frangible pathway comprising lines of weakness, wherein all elastic strands extending through the first frangible pathway are cut at the lines of weakness such that a first plurality of the elastic strands are cut only once and such that a second plurality of the elastic strands are cut more than once.

B2. The method of paragraph B1, further comprising a step of forming a second frangible pathway in the first elastic laminate separated from the first frangible pathway in the machine direction.

B3. The method of either paragraph B1 or B2, further comprising steps of: providing a second elastic laminate; providing a chassis that comprises a body facing surface and a garment facing surface, and an absorbent core positioned between the body facing surface and the garment facing surface, the chassis further comprising a first end region and a second end region separated in a cross direction from the first end region by the crotch region; and bonding the first end region of the chassis with the first elastic laminate and bonding the second end region of the chassis with the second elastic laminate.

B4. The method of paragraph B3, wherein the first end region of the chassis is positioned between the first frangible pathway and the second frangible pathway.

B5. The method of any of paragraphs B1-B4, wherein the first end region of the chassis overlaps portions of the first frangible pathway and the second frangible pathway.

B6. The method of any of paragraphs B1-B4, further comprising a step of forming a low-stretch zone in the first elastic laminate.

B7. The method of paragraph B6, wherein the first end region of the chassis overlaps the low-stretch zone.

B8. The method of either paragraph B6 or B7, wherein the step of forming the low-stretch zone further comprises steps of: intermittently bonding the elastic strands with the first substrate and the second substrate to form an unbonded region wherein the strands are not bonded with the first substrate and the second substrate; and cutting elastic strands in the unbonded region such that the strands retract from the unbonded region.

B9. The method of either paragraph B6 or B7, wherein the step of forming the low-stretch zone further comprises a step of cutting the elastic strands into a plurality of discrete pieces.

B10. The method of any of paragraphs B1-B9, further comprising steps of: folding the chassis in the crotch region to position the first elastic laminate in a facing relationship with the second elastic laminate; forming bonds between the first elastic laminate and the second elastic laminate, wherein the bonds are positioned between the first frangible pathway and the second frangible pathway; and cutting the first elastic laminate and the second elastic laminate in the cross direction through the bonds to form a discrete absorbent article.

B11. The method of any of paragraphs B1-B10, further comprising steps of: forming a first region of the first frangible pathway and a second region of the first frangible pathway in the first elastic laminate; subsequent to the step of forming the first and second regions of the first frangible pathway, bonding the first end region of the chassis with the first elastic laminate; and subsequent to the step of bonding the first end region of the chassis with the first elastic laminate, folding a portion of the first substrate onto the second substrate and the first end region of the chassis such that the first region of the first frangible pathway overlaps the second region of the first frangible pathway.

B12. The method of any of paragraphs B1-B10, further comprising a step of bonding a fastener component with the first elastic laminate.

B13. The method of paragraph B12, wherein the first frangible pathway comprises a first region and a second region separated in the cross direction from the first region by a third region, and wherein the fastener component is positioned adjacent the third region of the frangible pathway.

B14. The method of paragraph B12, wherein the fastener component is positioned between the first end region of the chassis and the first elastic laminate.

B15. The method of any of paragraph B11-B14, wherein the fastener component comprises hooks that are refastenably attachable with an outer surface of at least one of the chassis, the first elastic laminate, and the second elastic laminate.

B16. The method of any of paragraphs B11-B15, further comprising cutting a slit in the third region adjacent the fastening component.

B17. The method of any of paragraphs B1-B16, wherein each line of weakness is oriented to define an offset angle relative to the machine direction that is greater than 0 degrees and less than 90 degrees.

B18. The method of any of paragraphs B1-B17, wherein the step of forming the first frangible pathway further comprises cutting through the first substrate and the second substrate such that the lines of weakness comprise discrete cut lines.

B19. The method of any of paragraphs B1-B18, wherein the step of forming the first frangible pathway further comprises pressure bonding the first substrate and the second substrate together such that the lines of weakness comprise discrete bonds wherein materials of the first substrate and the second substrate are fused together.

B20. The method of any of paragraphs B1-B19, wherein the second plurality of elastics are that are cut more than once in the first frangible pathway form first discrete pieces and second discrete pieces of elastic strands, wherein the first discrete pieces of elastic strands comprise a first length and wherein the second discrete pieces of elastic strands comprise a second length, wherein the second length is greater than the first length.

B21. The method of paragraph B20, wherein the lines of weakness are arranged in a first row and a second row neighboring the first row.

B22. The method of paragraph B21, wherein the first length of the first discrete pieces of elastic strands is defined by a distance extending in the machine direction between neighboring lines of weakness in the first row.

B23. The method of paragraph B22, wherein the second length of the second discrete pieces of elastic strands is defined by a distance extending in the machine direction between lines of weakness in the first row and lines of weakness in the second row.

B24. The method of any of paragraphs B1-B23, wherein the first frangible pathway extends for a first frangible pathway total length from an outermost edge of a line of weakness nearest the first edge of the first elastic laminate to an outermost edge of a line of weakness nearest the second edge of the first elastic laminate.

B25. The method of paragraph B24, wherein the first frangible pathway total length is equal to or less than the first laminate width.

B26. The method of paragraph B24, wherein the first frangible pathway total length is greater than the first laminate width.

B27. The method of any of paragraphs B1-B26, wherein lines of weakness extend for a length from a first end to a second end, and wherein a sum of the all the lengths of lines of weakness in the first frangible pathway is greater than the first frangible pathway total length.

C1. A cutting apparatus comprising: a knife roll comprising a means for forming a frangible pathway in an elastic laminate and a means for making a low-stretch zone in the elastic laminate.

D1. A cutting apparatus comprising: a knife roll comprising a means for forming a frangible pathway in an elastic laminate and a means for cutting the elastic laminate into discrete pieces.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method for assembling absorbent articles, the method comprising steps of:
    providing a first elastic laminate, the first elastic laminate comprising elastic strands positioned between and connected with a first substrate and a second substrate, the elastic strands extending in a machine direction, the first elastic laminate further comprising a first edge separated from a second edge in a cross direction, wherein the first elastic laminate comprises a first laminate width defined by a distance extending in the cross direction between the first edge and the second edge;
    advancing the first elastic laminate in the machine direction; and
    forming a first frangible pathway in the first elastic laminate extending in the cross direction between the first edge and the second edge, the first frangible pathway comprising lines of weakness, wherein all elastic strands extending through the first frangible pathway are cut at the lines of weakness such that a first plurality of the elastic strands are cut only once and such that a second plurality of the elastic strands are cut more than once.

2. The method of claim 1, further comprising a step of forming a second frangible pathway in the first elastic laminate separated from the first frangible pathway in the machine direction.

3. The method of claim 2, further comprising steps of:
    providing a second elastic laminate;
    providing a chassis that comprises a body facing surface and a garment facing surface, and an absorbent core positioned between the body facing surface and the garment facing surface, the chassis further comprising a first end region and a second end region separated in a cross direction from the first end region by the crotch region; and
    bonding the first end region of the chassis with the first elastic laminate and bonding the second end region of the chassis with the second elastic laminate.

4. The method of claim 3, wherein the first end region of the chassis is positioned between the first frangible pathway and the second frangible pathway.

5. The method of claim 4, wherein the first end region of the chassis overlaps portions of the first frangible pathway and the second frangible pathway.

6. The method of claim 3, further comprising steps of:
    folding the chassis in the crotch region to position the first elastic laminate in a facing relationship with the second elastic laminate;
    forming bonds between the first elastic laminate and the second elastic laminate, wherein the bonds are positioned between the first frangible pathway and the second frangible pathway; and
    cutting the first elastic laminate and the second elastic laminate in the cross direction through the bonds to form a discrete absorbent article.

7. The method of claim 3, further comprising steps of:
    forming a first region of the first frangible pathway and a second region of the first frangible pathway in the first elastic laminate;
    subsequent to the step of forming the first and second regions of the first frangible pathway, bonding the first end region of the chassis with the first elastic laminate; and subsequent to the step of bonding the first end region of the chassis with the first elastic laminate, folding a portion of the first substrate onto the second substrate and the first end region of the chassis such that the first region of the first frangible pathway overlaps the second region of the first frangible pathway.

8. The method of claim 3, further comprising a step of bonding a fastener component with the first elastic laminate.

9. The method of claim 8, wherein the first frangible pathway comprises a first region and a second region separated in the cross direction from the first region by a third region, and wherein the fastener component is positioned adjacent the third region of the frangible pathway.

10. The method of claim 9, wherein the fastener component is positioned between the first end region of the chassis and the first elastic laminate.

11. The method of claim 10, wherein the fastener component comprises hooks that are refastenably attachable with an outer surface of at least one of the chassis, the first elastic laminate, and the second elastic laminate.

12. The method of claim 9, further comprising cutting a slit in the third region adjacent the fastening component.

13. The method of claim 2, further comprising a step of forming a low-stretch zone in the first elastic laminate.

14. The method of claim 13, wherein the first end region of the chassis overlaps the low-stretch zone.

15. The method of claim 13, wherein the step of forming the low-stretch zone further comprises steps of:
intermittently bonding the elastic strands with the first substrate and the second substrate to form an unbonded region wherein the strands are not bonded with the first substrate and the second substrate; and
cutting elastic strands in the unbonded region such that the strands retract from the unbonded region.

16. The method of claim 13, wherein the step of forming the low-stretch zone further comprises a step of cutting the elastic strands into a plurality of discrete pieces.

17. The method of claim 2, wherein the second length of the second discrete pieces of elastic strands is defined by a distance extending in the machine direction between lines of weakness in the first row and lines of weakness in the second row.

18. The method of claim 1, wherein each line of weakness is oriented to define an offset angle relative to the machine direction that is greater than 0 degrees and less than 90 degrees.

19. The method of claim 1, wherein the step of forming the first frangible pathway further comprises cutting through the first substrate and the second substrate such that the lines of weakness comprise discrete cut lines.

20. The method of claim 1, wherein the step of forming the first frangible pathway further comprises pressure bonding the first substrate and the second substrate together such that the lines of weakness comprise discrete bonds wherein materials of the first substrate and the second substrate are fused together.

21. The method of claim 1, wherein the second plurality of elastics are that are cut more than once in the first frangible pathway form first discrete pieces and second discrete pieces of elastic strands, wherein the first discrete pieces of elastic strands comprise a first length and wherein the second discrete pieces of elastic strands comprise a second length, wherein the second length is greater than the first length.

22. The method of claim 21, wherein the lines of weakness are arranged in a first row and a second row neighboring the first row.

23. The method of claim 22, wherein the first length of the first discrete pieces of elastic strands is defined by a distance extending in the machine direction between neighboring lines of weakness in the first row.

24. The method of claim 1, wherein the first frangible pathway extends for a first frangible pathway total length from an outermost edge of a line of weakness nearest the first edge of the first elastic laminate to an outermost edge of a line of weakness nearest the second edge of the first elastic laminate.

25. The method of claim 24, wherein the first frangible pathway total length is equal to or less than the first laminate width.

26. The method of claim 24, wherein the first frangible pathway total length is greater than the first laminate width.

* * * * *